(12) United States Patent
Agrawal et al.

(10) Patent No.: US 12,166,890 B2
(45) Date of Patent: Dec. 10, 2024

(54) LEVERAGING MULTIPLE DEVICES TO ENHANCE SECURITY OF BIOMETRIC AUTHENTICATION

(71) Applicant: Visa International Service Association, San Francisco, CA (US)

(72) Inventors: Shashank Agrawal, Sunnyvale, CA (US); Saikrishna Badrinarayanan, Los Angeles, CA (US); Payman Mohassel, San Jose, CA (US); Pratyay Mukherjee, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/852,034

(22) Filed: Jun. 28, 2022

(65) Prior Publication Data
US 2022/0353083 A1 Nov. 3, 2022

Related U.S. Application Data

(63) Continuation of application No. 17/282,615, filed as application No. PCT/US2019/054666 on Oct. 4, 2019, now Pat. No. 11,411,738.

(Continued)

(51) Int. Cl.
*H04L 29/06* (2006.01)
*G06F 21/32* (2013.01)
(Continued)

(52) U.S. Cl.
CPC ............ *H04L 9/3231* (2013.01); *G06F 21/32* (2013.01); *H04L 9/008* (2013.01); *H04L 9/0861* (2013.01);
(Continued)

(58) Field of Classification Search
CPC ..... H04L 9/3231; H04L 9/008; H04L 9/0861; H04L 9/0894; H04L 9/30; H04L 9/3218;
(Continued)

(56) References Cited

U.S. PATENT DOCUMENTS 6,697,947 B1   2/2004   Matyas, Jr. et al.
9,608,819 B1 *  3/2017   Mandal .................. H04L 9/304
(Continued)

FOREIGN PATENT DOCUMENTS

KR   101528112   6/2015

OTHER PUBLICATIONS

U.S. Appl. No. 17/282,615, Final Office Action, Mailed on Dec. 30, 2021, 20 pages.
(Continued)

*Primary Examiner* — Wasika Nipa
*Assistant Examiner* — Leynna Truvan
(74) *Attorney, Agent, or Firm* — Kilpatrick Townsend & Stockton LLP

(57) ABSTRACT

Systems, methods, and apparatuses of using biometric information to authenticate a first device of a user to a second device are described herein. A method includes storing, by the first device, a first key share of a private key and a first template share of a biometric template of the user. The second device stores a public key, and one or more other devices of the user store other key shares and other template shares. The first device receives a challenge message from the second device, measures biometric features of the user to obtain a measurement vector, and sends the measurement vector and the challenge message to the other devices. The first device receives partial computations, generated using a respective template share, key share, and the challenge (Continued)

message, from the other devices, uses them to generate a signature of the challenge message and send the signature to the second device.

20 Claims, 8 Drawing Sheets

Related U.S. Application Data

(60) Provisional application No. 62/741,431, filed on Oct. 4, 2018.

(51) Int. Cl.
*H04L 9/00* (2022.01)
*H04L 9/08* (2006.01)
*H04L 9/30* (2006.01)
*H04L 9/32* (2006.01)

(52) U.S. Cl.
CPC .............. *H04L 9/0894* (2013.01); *H04L 9/30* (2013.01); *H04L 9/3218* (2013.01); *H04L 9/3247* (2013.01); *H04L 9/3271* (2013.01)

(58) Field of Classification Search
CPC ..... H04L 9/3247; H04L 9/3271; H04L 9/085; H04L 9/08; H04L 9/0802; H04L 9/0816; H04L 9/0819; H04L 9/0825; H04L 9/0838; H04L 9/0844; H04L 9/32; H04L 15/06; H04L 29/06721; H04L 63/0442; H04L 63/061; H04L 63/062; H04L 63/064; H04L 63/18; G06F 21/32; G06F 21/33; G06F 2211/008; G06F 2221/0751; H04H 60/23; G06Q 20/40145; G06V 40/50; G06V 40/70; G06V 10/781; G06V 30/19013; G07C 9/25; G07C 9/37; G07C 2209/12; G05B 2219/23025; G05B 2219/36542; G07B 2017/00758; G07B 2017/00854; G07B 2017/00895; G11B 20/00217; G11B 20/00282; G06K 19/0718; G06K 9/6202; G06K 9/685; G07D 7/2058; G07D 7/206; G06B 2219/24162; F41A 17/066; H04N 1/442; H04N 21/4415; H04N 21/26613; H04N 21/6334; H04N 21/63345; H04W 12/0401; H04W 12/04031; H04W 12/04033; H04W 12/04071; H04W 12/041; H04W 12/0433; H04W 12/0471
See application file for complete search history.

(56) References Cited

U.S. PATENT DOCUMENTS

| | | | |
|---|---|---|---|
| 10,503,915 B2 * | 12/2019 | Isshiki | G06F 21/32 |
| 2009/0177894 A1 | 7/2009 | Orsini et al. | |
| 2010/0119061 A1 | 5/2010 | Kawale | |
| 2012/0254689 A1 * | 10/2012 | Resch | H04L 9/0891 |
| | | | 714/763 |
| 2014/0372769 A1 | 12/2014 | Kerschbaum et al. | |
| 2014/0380040 A1 | 12/2014 | Albahdal et al. | |
| 2015/0046989 A1 | 2/2015 | Oberheide et al. | |
| 2015/0270977 A1 | 9/2015 | Martins et al. | |
| 2016/0337131 A1 | 11/2016 | de Andrada et al. | |
| 2017/0173262 A1 * | 6/2017 | Veltz | G16H 20/17 |
| 2018/0129797 A1 | 5/2018 | Rush et al. | |
| 2020/0259638 A1 | 8/2020 | Carmignani et al. | |

OTHER PUBLICATIONS

U.S. Appl. No. 17/282,615, Non-Final Office Action, Mailed on Aug. 16, 2021, 16 pages.
U.S. Appl. No. 17/282,615, Notice of Allowance, Mailed on Mar. 31, 2022, 10 pages.
Application No. EP19869144.6, Extended European Search Report, Mailed on Nov. 2, 2021, 10 pages.
Mustafa et al., "Frictionless Authentication System: Security & Privacy Analysis and Potential Solutions", Cornell University Library NY 14853, Feb. 2018, pp. 1-11.
Application No. PCT/US2019/054666, International Preliminary Report on Patentability, Mailed on Apr. 15, 2021, 6 pages.
Application No. PCT/US2019/054666, International Search Report and Written Opinion, Mailed on Jan. 22, 2020, 9 pages.
Application No. SG11202103355T, Written Opinion, Mailed on Feb. 2, 2023, 10 pages.
Application No. KR10-2021-7009327, Office Action, Mailed on Mar. 12, 2024, 10 pages.
Application No. SG11202103355T, Notice of Decision to Grant, Mailed on Jan. 3, 2024, 4 pages.
Application No. EP19869144.6, Office Action, Mailed on Feb. 8, 2024, 4 pages.

* cited by examiner

FIDO UAF

Registration

Authentication $\text{Real}_\mathcal{A}(1^\kappa, n, t, \text{TS}, q, \ell, d, \mathcal{W}, \vec{U})$

*Initialization.*
- Run $([\text{sk}, \vec{w}]_{[n]}, \text{pp}, \text{vk}) \leftarrow \text{Registration}(1^\kappa, n, t, \text{TS}, q, \ell, \mathcal{W}, d)$ and $(\text{pp}_{\text{setup}}, s_1, \ldots, s_n) \leftarrow \text{Setup}()$. Give $(\text{pp}, \text{vk}, \text{pp}_{\text{setup}})$ to $\mathcal{A}$.
- $\mathcal{A}$ outputs a corrupt set $C \subset [n]$ where $|C| \leq t-1$ and a sequence $((m_1, j_1, S_1), \ldots, (m_h, j_h, S_h))$ where $S_i \subseteq [n]$, $|S_i| = t$ and $j_i \in S_i \setminus C$ for $i \in [h]$. Give $\{(\text{sk}_i, \vec{w}_i, s_i)\}_{i \in C}$ to $\mathcal{A}$. Give $\text{in}_i := (\text{pp}, \text{sk}_i, \vec{w}_i, \text{pp}_{\text{setup}}, s_i)$ to party $i \in [n] \setminus C$.

*Evaluation.*
- $\mathcal{A}$ can run any number of SignOn sessions with the honest parties.
- $\mathcal{A}$ can also output an integer $i \in [h]$ indicating that the honest party $j_i$ initiate a SignOn session with inputs $(m_i, \vec{u}_i, S_i)$.

---

$\mathcal{F}_{\text{DiFuz}}(1^\kappa, n, t, \text{TS}, q, \ell, d, \mathcal{W}, \vec{U})$

*Initialization.*
- Run $([\text{sk}, \vec{w}]_{[n]}, \text{pp}, \text{vk}) \leftarrow \text{Registration}(1^\kappa, n, t, \text{TS}, q, \ell, \mathcal{W}, d)$ and give $(\text{pp}, \text{vk})$ to $\mathcal{S}$.
- On message $(\text{INIT}, (\text{pp}_{\text{setup}}, s_1, \ldots, s_n), C, ((m_1, j_1, S_1), \ldots, (m_h, j_h, S_h)))$ from $\mathcal{S}$, where $C \subset [n]$, $|C| \leq t-1$, $S_i \subseteq [n]$, $|S_i| = t$ and $j_i \in S_i \setminus C$ for $i \in [h]$, give $\{(\text{sk}_i, \vec{w}_i)\}_{i \in C}$ to $\mathcal{S}$ and $\text{in}_i := (\text{pp}, \text{sk}_i, \vec{w}_i, \text{pp}_{\text{setup}}, s_i)$ to every party $i \in [n] \setminus C$.

*Evaluation.*
- On message $(\text{SignOn-Corrupt}, m, \vec{u}, j, S)$ where $\vec{u} \in \mathbb{Z}_q^\ell$, $S \subseteq [n]$, $|S| = t$ and $j \in S \cap C$, give $(m, j, S)$ to every party $i \in S \setminus C$. If $\text{Dist}(\vec{w}, \vec{u}) = 1$, then give $\text{Sign}(\text{sk}_i, m)$ for all $i \in S \setminus C$ to $\mathcal{S}$.
- On message $(\text{SignOn-Honest}, sid, i)$ where $i \in [h]$, give $(m_i, j_i, S_i)$ to every party $i \in S \setminus C$ and store $(sid, m_i, \vec{u}_i, j_i, S_i)$.
- On message $(\text{ABORT}, sid)$, check if there is a tuple of the form $(sid, m, \vec{u}, j, S)$. If there is, give $\perp$ to party $j$. Delete the tuple.
- On message $(\text{COMPLETE}, sid)$, check if there is a tuple of the form $(sid, m, \vec{u}, j, S)$. If there is, then compute $\sigma_i := \text{Sign}(\text{sk}_i, m)$ for $i \in S$ and $\sigma := \text{Comb}(\{\sigma_i\}_{i \in S})$. If $\text{Dist}(\vec{w}, \vec{u}) = 1$, then give $\sigma$ to party $j$. Delete the tuple.

FIG. 5

Inputs:
- Party $P_i \in S$ has input $(\tilde{w}_i, sk_i^{TS})$.
- Party $P^* \in S$ additionally also has input $(\tilde{u}, m)$.

Computation:
- Compute $\tilde{w} = \text{Recon}(\{\tilde{w}_i\}_{i \in S})$. Output $\bot$ to $P^*$ if the reconstruction fails.
- If $\text{Dist}(\tilde{u}, \tilde{w}) < d$, output $\bot$ to $P^*$.
- Compute $\text{Token}_i = \text{TS.Sign}(sk_i^{TS}, m)$ using some randomness.
- Output $\{\text{Token}_i\}_{i \in S}$ to party $P^*$.

FIG. 6

Hardwired values: $(a, b, c, d, p, q, r_2, \text{Pad}, d^2)$.*
Inputs: $(x_1, x_2, y_1, y_2, z_1, z_2)$.

Computation:
- Abort if any of the following occur:
  * $x_2 \neq (a \cdot x_1 + b)$ (or)
  * $y_2 \neq (c \cdot y_1 + d)$ (or)
  * $z_2 \neq (p \cdot z_1 + q)$
- Compute $IP = (z_1 - r_2) + x_1$
- If $IP^2 > (d^2 \cdot y_1)$, output Pad. Else, output $\perp$.

*Recall that $d$ is the threshold value for Cosine Similarity.

FIG. 7

LEVERAGING MULTIPLE DEVICES TO ENHANCE SECURITY OF BIOMETRIC AUTHENTICATION

CROSS-REFERENCE TO RELATED APPLICATIONS

This application is a Continuation of U.S. patent application Ser. No. 17/282,615 filed Apr. 2, 2021, which is a 371 Application based on PCT/US2019/054666 filed Oct. 4, 2019, which claims priority to U.S. Provisional Patent Application No. 62/741,431 filed on Oct. 4, 2018, all of which are hereby incorporated by reference in their entirety for all purposes.

BACKGROUND

User authentication is a critical component of today's Internet applications. Users login to email applications to send/receive emails and increasingly to enable a second authentication factor for other applications; to bank websites to check balances and execute transactions; and to payment apps to transfer money between family and friends. User authentication is also an integral part of any enterprise access control mechanism that administers access to sensitive data, services and resources.

For the last three decades, password-based authentication has been the dominant approach for authenticating users, by relying on "what users know". But this approach can have security and usability issues. First, in password-based authentication, the servers store a function of all passwords and hence can be susceptible to breaches and offline dictionary attacks. Indeed, large-scale password breaches in the wild are extremely common. Moreover, password-based authentication is more susceptible to phishing as the attacker only needs to capture the password which serves as a persistent secret credential in order to impersonate users.

Passwords can also pose challenging usability problems. High entropy passwords are hard to remember by humans, while low entropy passwords provide little security, and research has proven that introducing complex restrictions on password choices can backfire. Passwords may also be inconvenient and slow to enter, especially on mobile and Internet of Things devices that dominate user activities on the Internet.

There are major ongoing efforts in the industry to address some of these issues. For example, "unique" biometric features such as finger-print (e.g. Google Pixel's fingerprint [1]), facial scans (e.g. Face-ID used in Apple iPhone [2]), and iris scans (e.g. Samsung Galaxy phones) are increasingly popular first or second factor authentication mechanisms for logging into devices, making payments and identifying to the multitude of applications on consumer devices Studies show that biometrics are much more user-friendly, particularly on mobile devices as users may not have to remember or enter any secret information.

Moreover, the industry is shifting away from transmitting or storing persistent user credentials/secrets on the server-side. This can significantly reduce the likelihood of scalable attacks such as server breaches and phishing. For example, biometric templates and measurements can be stored and processed on the client side where the biometric matching also takes place. A successful match then unlocks a private signing key for a digital signature scheme (i.e. a public key credential) that is used to generate a token on various information such as a fresh challenge, the application's origin and some user information. Only a one-time usable digital signature is transmitted to the server who stores and uses a public verification key to verify the token and identify the user.

This is the approach taken by the FIDO Alliance [3], the world's largest industry-wide effort to enable an interoperable ecosystem of hardware-, mobile- and biometrics-based authenticators that can be used by enterprises and service providers. The framework is also widely adopted by major Internet players and built-into all browser implementations such as most recent versions of Chrome, Firefox, and Edge in form of a W3C standard WebAuthn API.

With biometrics and private keys stored on client devices, a primary challenge is to securely protect them. This is particularly crucial with biometrics since unlike passwords they are not replaceable. The most secure approach for doing so relies on hardware solutions such as secure enclaves and trusted execution environments that provide both physical and logical separation between various applications and the secrets. But hardware solutions are not always available on devices (e.g. not all mobile phones or IoT devices are equipped with secure elements), or can be costly to support at scale. Moreover, they provide very little programmability to developers and innovators. For example, programming a new biometric authentication solution into a Secure Element uses support from all parties involved such as OEMs and OS developers.

Software-based solutions such as white-box cryptography are often based on ad-hoc techniques that are regularly broken. The provably secure alternative, i.e. cryptographic obfuscation, is extremely inefficient and the community's confidence on its mathematical foundation is lacking. An alternative approach is to apply the "salt-and-hash" techniques often used to protect passwords to biometric templates before storing them on the client device. A naive salt-and-hash solution can fail since biometric matching is often a fuzzy match that checks whether the distance between two vectors is above a threshold or not.

A better way of implementing the hash-and-salt approach is via a powerful primitive known as fuzzy extractor [4]. Unfortunately, this is still susceptible to offline dictionary attacks on the biometric (trying different biometric measurements until we find one that generates the correct public key), and does not solve the problem of protecting the signing key which is reconstructed in memory during each authentication session. Moreover, existing fuzzy extractor solutions do not support the wide range of distance metrics (e.g. cosine similarity, Euclidean distance, etc.) and the necessary accuracy level needed in today's practical biometric matching.

Embodiments of the present disclosure address these and other issues individually and collectively.

BRIEF SUMMARY

Some embodiments of the present disclosure are directed to methods of using biometric information to authenticate a first electronic device of a user to a second electronic device. The first electronic device can store a first key share of a private key, wherein the second electronic device stores a public key associated with the private key, and wherein one or more other electronic devices of the user store other key shares of the private key. The first device can store a first template share of a biometric template of the user, wherein the one or more other electronic devices of the user store other template shares of the biometric template. When the first device receives a challenge message from the second electronic device, it can measure, by a biometric sensor, a set of biometric features of the user to obtain a measurement vector comprised of measured values of the set of biometric features, wherein the biometric template includes a template vector comprised of measured values of the set of biometric features previously measured from the user. The first device can send the measurement vector and the challenge message to the one or more other electronic devices. The first device can generate a first partial computation using the first template share, the first key share, and the challenge message and receive at least T other partial computations from the one or more other electronic devices, wherein each of the at least T other partial computations are generated using a respective template share, a respective key share, and the challenge message. The first device can generate a signature of the challenge message using the first partial computation and the at least T other partial computations and send the signature to the second electronic device.

Some embodiments of the invention are directed to generating partial computations with particular distance measures, while another embodiment is directed to generating partial computations with any suitable distance measure.

Other embodiments of the invention are directed to systems and computer readable media associated with the above-described methods.

These and other embodiments of the invention are described in further detail below with reference to the Figures and the Detailed Description.

BRIEF DESCRIPTION OF THE DRAWINGS

FIG. 5 shows functionality $\mathcal{F}_{DiFuz}$ according to some embodiments.

FIG. 6 shows a circuit according to embodiments of the present invention.

FIG. 7 shows another circuit according to embodiments of the present invention.

DETAILED DESCRIPTION

Figure 1A:
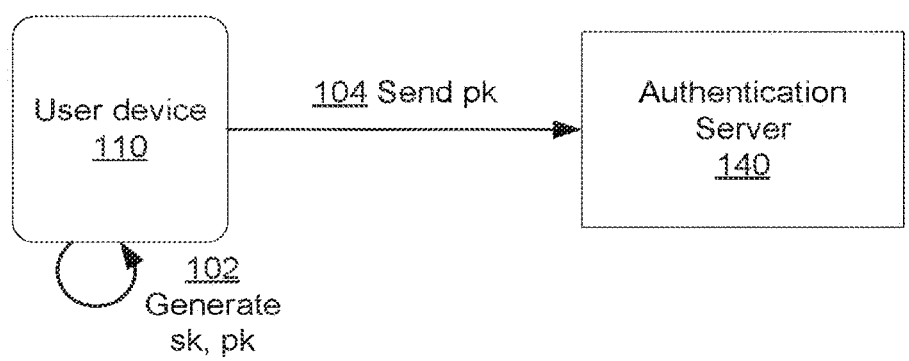
FIG. 1A and 1B show an overview of the FIDO Universal Authentication Framework flow.

Embodiments of the disclosure can be motivated by the fact that most users own and carry multiple devices, such as their laptop, smartphone, and smartwatch, and have other Internet of Things devices around when authenticating such as their smart TV or smart-home appliances. Embodiments provide a new framework for client-side biometric-based authentication with the goal of distributing both the biometric templates as well as the secret signing key among multiple devices who collectively perform the biometric matching and signature generation without ever reconstructing the template or the signing key on one device. This framework may be referred to as Fuzzy Threshold Token Generation (FTTG). FTTG can also be used to protect biometric information on the server-side by distributing it among multiple servers who perform the matching and token generation (e.g. for a single sign-on authentication token) in a fully distributed manner.

We initiate a formal study of FTTG and introduce a number of concrete protocols secure within the framework. In protocols according to embodiments, during a one-time registration phase, both the template and the signing key are distributed among n devices, among which any t of them can generate tokens. The exact values of n and t are parameters of the scheme and vary across different protocols. Then, during each authentication session, the initiating device obtains the biometric measurement and exchanges a constant number of messages with t−1 other devices in order to verify that the biometric measurement is close enough, with respect to some distance measure, to the secret shared template and if yes, obtain a token, which may also be referred to as a digital signature, on a message chosen by the initiating parties.

We formally define Fuzzy Threshold Token Generation schemes. We provide a unified definition that captures both privacy of biometrics and unforgeability of tokens in the distributed setting against a malicious adversary. Our definitions follow the real-ideal paradigm but may use a stand-alone setting for efficiency and simplicity.

We propose a four round protocol for any distance function based on any two-round UC-secure multi-party computation protocol that may use a broadcast channel (for example [5, 6, 7, 8, 9]). This protocol works for any n and $t(\leq n)$ and tolerates up to t−1 malicious corruptions. Note that a generic application of constant-round MPC protocols may not meet the important consideration that every contacted party only needs to exchange messages with the single initiating party. This protocol is a feasibility result as the resulting protocol is not black-box. To obtain protocols with concrete efficiency, embodiments can address the most popular distance functions used for biometric authentication, including Hamming distance (used for iris scans), cosine similarity and Euclidean distance (both of which are used for face recognition).

For cosine similarity, embodiments can include a very efficient four round protocol which supports any n with threshold t=3 and is secure against the corruption of one party. The protocol can combine techniques such an additively homomorphic encryption (AHE) scheme and associated NIZKs, with garbled circuit techniques to obtain a hybrid protocol wherein arithmetic operations (e.g. inner products) are performed using the AHE and non-arithmetic operations (e.g. comparison) take place in a small garbled circuits. The same construction easily extends to one for Euclidean distance.

I. Introduction

A. FIDO Universal Authentication Framework

Let us now take a closer look into FIDO Alliance architecture [3] that proposes a way to authenticate a device to an authentication server. FIG. 1A shows a high level flowchart for typical device registration.

In step 102, a user device 110 can generate a public key and a secret key for an asymmetric encryption scheme. Alternatively, the public key and the secret key may be provisioned to the user device 110.

In step 104, the user's device 110 can send the public key to an authentication server 140. The authentication server 140 can store the user's public key and register the device. The user's device 110 may securely store the secret key, such as on a hardware security module. The user device 110 may secure the secret key with additional protections, such as with a previously entered biometric (e.g., a fingerprint of the user, a facial scan of the user).

Figure 1B:
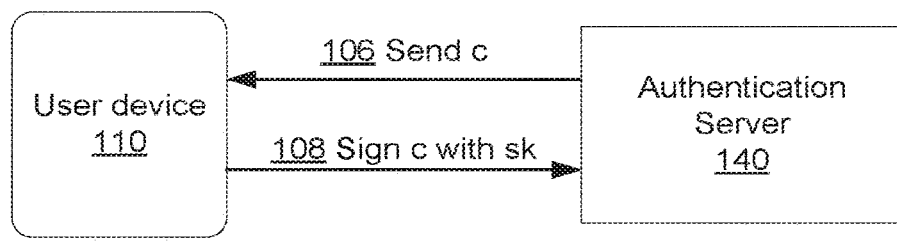

FIG. 1B shows a high level flowchart for subsequent authentication of a registered device. The protocol may be initiated when the user's device 110 attempts to access a secure or protected resource. For example, the authentication server 140 may control access to a secure database. As another example, the authentication server 140 may authenticate the user before initiating a transaction.

In step 106, the authentication server 140 can send a challenge to the user device 110. The challenge may be a message, and may be sent in response to the user device 110 initiating an access attempt.

In step 108, the user's device 110 can sign the challenge using the secret key and send the signed challenge back to the authentication server 140. For example, the user device 110 may sign the challenge by encrypting the challenge message with the secret key. As another example, the user device 110 may generate a cryptogram comprising information in the challenge and the secret key. The authentication server 140 can use the previously provided public key to verify the challenge. For example, the authentication server 140 can use the public key to decrypt the signed message and determine if the decrypted message matches the challenge. If the signature is valid, then the user may be allowed access to the resource.

The user can make this process more secure with the use of a biometric. During the registration phase the user can enter biometric data into the user device 110. For example, the user may use a camera of the user device 110 to take a picture of their face. A biometric template (e.g., a facial scan) can be extracted from the biometric data and stored "securely" inside the user device 110. At the same time, the secret key/public key pair can be generated. The public key can be communicated with the authentication server 140 whereas the secret key is securely stored in the user device 110. The secret key is virtually "locked" with the template. Later, during sign-on, a candidate template is used to unlock the secret key, which can then used in a standard identification protocol.

FIDO specification emphasizes that during sign-on approximate matching takes place inside the device "securely". One popular way to instantiate that is to use secure elements (for example Apple iPhones [2]): the template is stored inside the secure elements (SE) (for example hardware security modules) at all times along with other sensitive data. On input a candidate template, an approximate matching is performed inside the SE. However using SE has a number of drawbacks: SEs are usually expensive, platform-specific, offers limited programmability and are not easily updatable (as updating may require changes in hardware). Furthermore they are subject to side-channel attacks, which can be executed on (for example) a stolen device. Therefore providing an efficient, provably secure, flexible, software-only solution is very important.

B. Security Considerations

There are certain security constraints that are relevant to the invention. The biometric template should not ever be fully reconstructed, so that if any device is compromised the template is not revealed. The secret key also should never be fully reconstructed, for similar reasons. The distributed matching should work as long as more than a certain threshold of devices in the network are not compromised.

The secondary devices also should not learn if the biometric matching was successful. This increases security because if the other devices do not learn the result of the biometric matching, they may not be able to leak information, or have information to leak. Say if one of the other devices is compromised, a malicious party cannot use the information about the biometric matching. The secondary devices also don't learn if signature generation was successful. For example, if a device has been compromised but can still participate in the authentication, the hacker would not be able to learn if the information that they have about the biometric template or the secret share is accurate or valid.

It is important to note that other participating devices need not be required to talk to each other or even know each other (all messages are exchanged between the initiating device and other participants). In a typical usage scenario, one or two primary user devices (e.g. a laptop or a smartphone) play the role of the initiating device and all other devices are only paired/connected to the primary device and may not even be aware of the presence of other devices in the system. This makes the design of efficient and constant-round FTTG protocol significantly more challenging. We assume that devices that are connected, have established a point-to-point authenticated channel (but not a broadcast channel).

C. Overview

1. Device Registration

Figure 2:
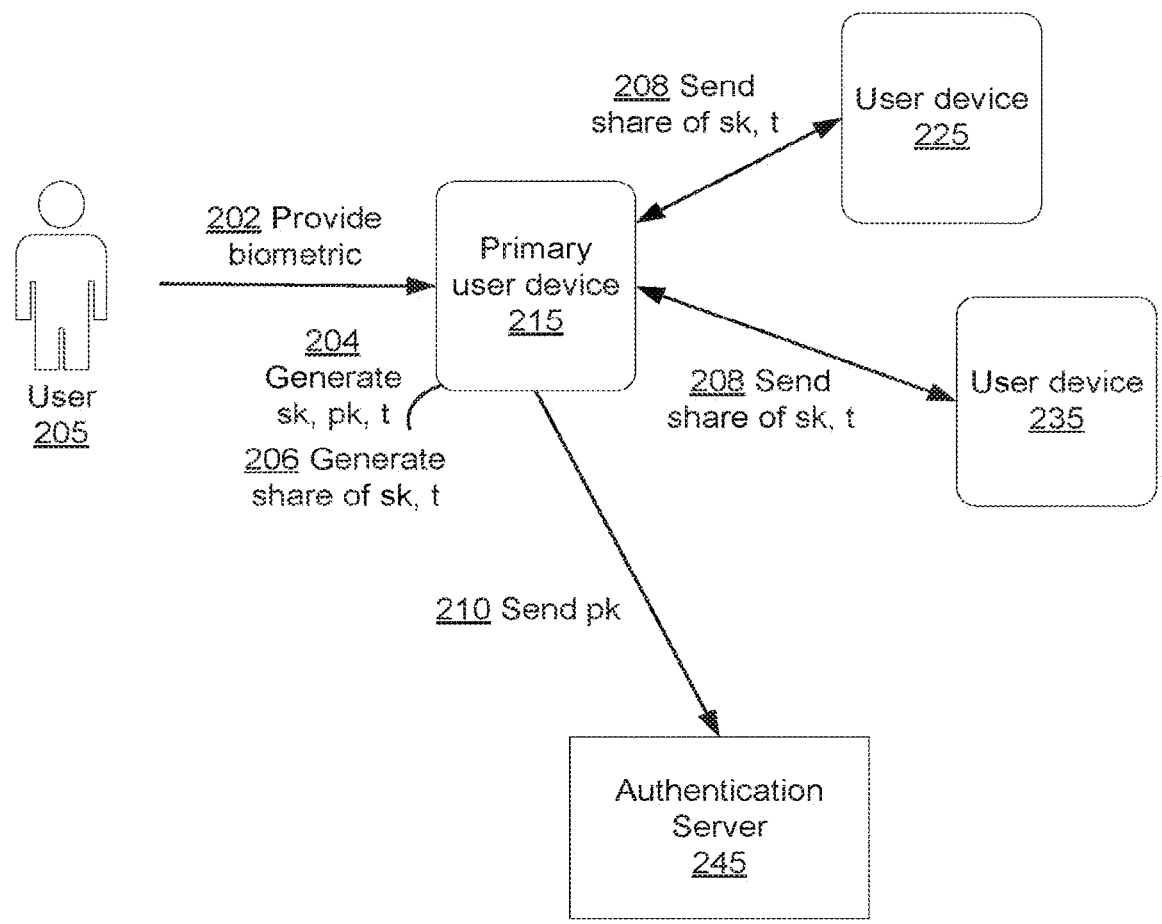
FIG. 2 shows high-level device registration flow according to some embodiments

FIG. 2 shows a general overview of a device registration process with a distributed biometric according to embodiments.

In step 202, a user 205 can enter a biometric measurement into a primary user device 215. A biometric sensor of the primary user device 215 (e.g., a camera, a microphone, a fingerprint sensor) to measure a set of biometric features of the user 205. For example, the user 205 can use a camera of the primary user device 215 to take a picture of their face for a facial scan. Other examples of biometric measurements may include voice recordings, iris scans, and fingerprint scans. The role of the primary device may also performed by any trusted authority which may not be a device of the user. As an example, the primary device may be a computer of an authentication system.

In step 204, the primary user device 215 can generate a public key and a private key for an asymmetric encryption scheme. The primary user device 215 can also use the biometric measurement to create a biometric template. The biometric template may include a template vector, and the template vector may comprise measured values of the set of biometric features of the user. For example, the primary user device 215 may compute distances between facial features identified in the picture of the user's face. The computed distances may comprise the template vector of the biometric template.

In step 206, the primary user device 215 can generate shares of the private key and the template, as well as any other parameters that might be needed for later authentication. The primary user device 215 can then store a first key share of the private key. The user device may also store a first template share of the biometric template.

In step 208, the primary user device 215 can send other key shares of the private key, other template shares of the template, and other parameters to each of a plurality of the user's other user devices 225, 235. Other devices of the user may include, for example, laptops, smartphones, wearable devices, smart TVs, IoT connected devices, etc. Two other devices are shown in FIG. 2, however, embodiments may comprise more or fewer devices associated with the primary user device 215. Each of the other user devices 225, 235 may store the key share of the private key, the template share of the template, and the other parameters. The other user devices 225, 235 may or may not store the received information in secure storage.

In step 210, the primary user device 215 can send the public key to an authentication server 245 The authentication server 245 can securely store the public key. The public key may be stored with an identifier of the user 205 and/or the primary user device 215. The primary user device 215 may now be registered.

2. Device Authentication

Figure 3:
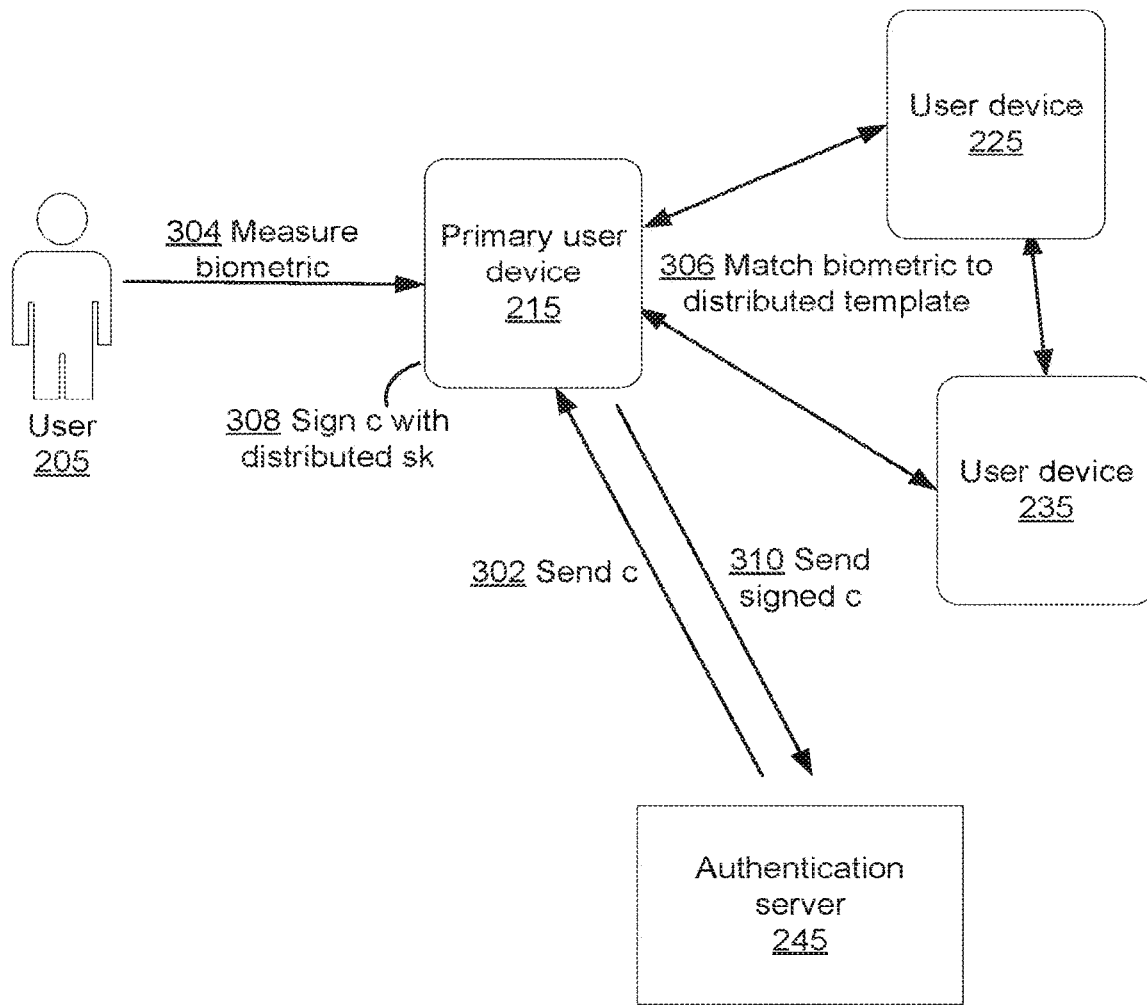
FIG. 3 shows high-level device authentication flow according to some embodiments

FIG. 3 shows a general overview of device authentication with a distributed biometric when the primary user device 215 attempts to access a secure or protected resource. For example, the primary user device 215 can attempt to access a secure database controlled by the authentication server 245.

In step 302, the authentication server 245 can send a challenge message to the primary user device 215. The challenge message may be a vector.

In step 304, the user 205 can enter a biometric measurement into the primary user device 215. A biometric sensor of the primary user device 215 (e.g., a camera, a microphone, a fingerprint sensor) to measure a set of biometric features of the user 205. For example, the user 205 may use a camera of the primary user device 215 to take a picture of their face to be used in a facial scan. As another example, the user 205 may use a sensor of the primary user device 215 to scan their fingerprint. The primary user device 215 may then generate a measurement vector that comprises measured values of the set of biometric features. For example, the measured values may be computed distances between facial features of the user.

In step 306, the primary user device 215 and other user devices 225, 235 can match the previously distributed biometric template with the new biometric measurement. The primary user device 215 can send the measurement vector and the challenge message to the other devices. Each user device 215, 225, 235 may generate a partial computation with their template share and the measurement vector. For example, an inner product may be computed between the template share and the measurement vector. In embodiments steps 306 and 308 may occur concurrently.

In step 308, the primary user device 215 and other user devices 225, 235 can sign the challenge message with the key shares of the secret key. Each user device 215, 225, 235 may generate a partial computation with the challenge message and a respective key share. The partial computation may be, for example, a partial encryption of the challenge message with the respective key share. The partial computation may also be generated with the result of the partial computation from the respective template share and the measurement vector. After generating each partial computation, each user device 225, 235 can send the partial computation to the primary user device 215. After receiving the partial computations, the primary user device 215 can generate a signature of the challenge message using the partial computations. The primary user device 215 may need to receive partial computations from a threshold number, T, of other devices. A first partial computation generated by the primary user device 215 may be one of the at least T partial computations. For example, the primary user device 215 may need to receive at least three partial computations, and may receive the partial computations from two other devices. The threshold may be lower than the total number of other devices that received key shares and template shares, so that a signature can still be generated if one or more of the other devices are compromised.

In step 310, the primary user device 215 can send the signature to the authentication server 245. The primary user device 215 may also send the challenge message to the authentication server. If a valid signature is generated, then the authentication server 245 will be able to use the previously provided public key to verify the signature and allow the user access to the resource. If a valid signature is not generated then the device will not be authenticated and the user will not gain access to the resource.

II. Technical Overview

We first briefly describe the notion of a Fuzzy Threshold Token Generation scheme.

Consider a set of n parties and a distribution $\mathcal{W}$ over vectors $\in \mathbb{Z}_q^\ell$. Let's denote Dist to be the distance measure under consideration. Initially, in a registration phase, a biometric template $\vec{w} \in \mathbb{Z}_q^\ell$ is sampled and secret shared amongst all the parties. Also, the setup of an unforgeable threshold signature scheme is implemented and the signing key is secret shared amongst the n parties. This is followed by a setup phase where suitable public and secret parameters are sampled by a trusted party and distributed amongst the n parties. Then, in the online authentication session (or sign-on phase), any party P* with input vector that wishes to generate a token on a message m can interact with any set $\mathcal{S}$ consisting of t parties (including itself) to generate a token (signature) on the message m using the threshold signature scheme. Note that P* gets a token only if $\text{Dist}(\vec{u}, \vec{w}) > d$ where d is parameterized by the scheme. We recall that in this phase, the parties in set $\mathcal{S}$ are not allowed to talk to each other. In particular, the communication model only involves party P* to interact individually with each party in $\mathcal{S}$.

The security definition for a Fuzzy Threshold Token Generation (FTTG) scheme captures two properties: privacy and unforgeability. Informally, privacy says that the long term secrets—namely, the biometric template $\vec{w}$ and the signing key of the threshold signature scheme should be completely hidden from every party in the system. In preferred embodiments, the online input vector $\vec{u}$ used in each authentication session should be hidden from all parties except the initiator. Unforgeability requires that no party should be able to generate a token on any message m without participating in an authentication session as the initiator interacting with at least t other parties, using message m and an input vector a such that $\text{Dist}(\vec{u}, \vec{w}) > d$. We formalize both these properties via a Real-Ideal security game against a malicious adversary. We refer the reader to Section V for the detailed definition including a discussion on the various subtleties involved in formally defining the primitive to achieve meaningful security while still being able to build efficient protocols.

Figure 4:
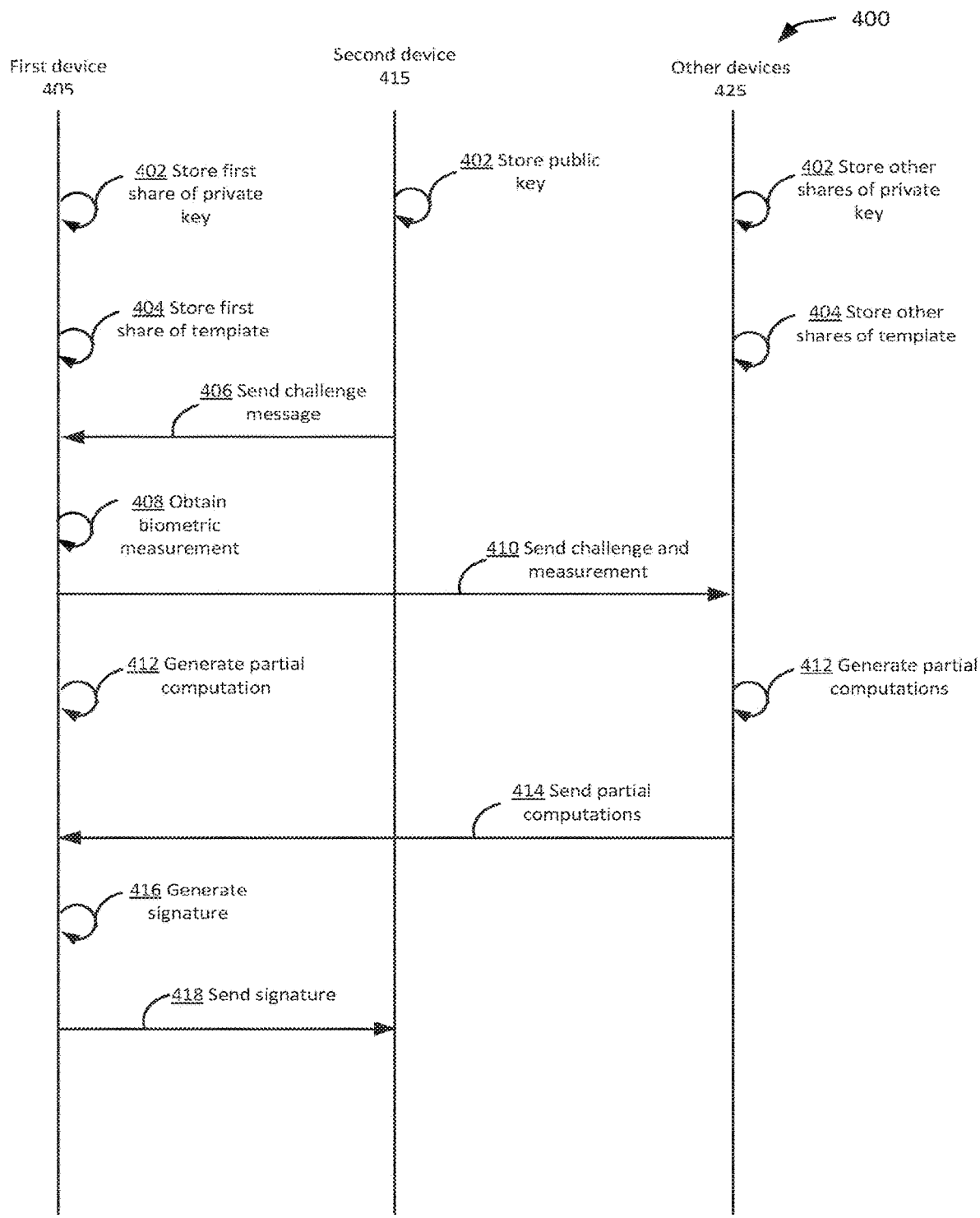
FIG. 4 shows a general flow diagram for fuzzy threshold signature generation according to some embodiments.

FIG. 4 shows a swim-lane flow diagram for a general embodiment of fuzzy threshold signature generation. FIG. 4 can be used for implementing authentication using biometric measurements, e.g., of one or more fingerprints, an eye, and the like.

In step 402, a first device 405 stores a first share of a private key, a second device 415 stores a public key associated with the private key, and other devices 425 store other shares of the private key. The private key and public key are keys can be keys generated by a trusted authority for a secret key encryption scheme. The trusted authority may be the first device. The second device may be an authorization server.

In step 404, the first device 405 stores the first share of a biometric template and the other devices 425 store other shares of the biometric template. The biometric template includes a template vector comprised of measured values of the set of biometric features previously measured from the user of the first device. The biometric template may have been generated by the trusted authority. In some embodiments, the biometric template may not be divided into shares. The first template share and the other template shares may all be the same value, and may be an encryption of the biometric template.

In step 406, the second device 415 sends a challenge message to the first device 405. This message may have been sent in response to the first device 405 requesting authentication in order to access some secure or protected resource. The challenge message may, for example, be a challenge message associated with the FIDO Universal Authentication Framework.

In step 408, the first device 405 obtains a biometric measurement from the user of the device. The biometric measurement can be obtained by a biometric sensor of the first device 405. The first device 405 may use the biometric sensor to measure a set of biometric features of the user to obtain a measurement vector comprised of measured values of the set of biometric features. For example, the biometric sensor may be a camera that takes a picture of a user's face. The first device may then measure distances between identified facial features in the picture to determine the biometric features. In some embodiments, the biometric measurement may be encrypted.

In step 410, the first device 405 sends the challenge message and the biometric measurement to the other devices 425. The first device 405 may also send other information or computations needed for the other devices 425 to generate partial computations. In some embodiments, the biometric measurement may be encrypted by the first device 405 before it is sent to the other device 425. In other embodiments, the biometric measurement may not be sent to the other devices 425 with the challenge message.

In step 412, the first device 405 can generate a first partial computation using the challenge message, biometric measurement, and/or the first shares of the private key and template. The other devices 425 can generate other partial computations with the challenge message, biometric measurement, and/or their respective key share and respective template share. The first device 405 and other devices 425 may also make use of information provided by the trusted authority, such as keys for a pseudorandom function. The partial computations can be computations to determine if the template and measurement match, according to a pre-established distance measure. Thus the partial computations may be partial distances. The partial distances may be encrypted with an additively homomorphic encryption scheme, which may be a threshold fully homomorphic encryption (TFHE) scheme. The TFHE can allow the first device 405 and the other devices 425 to compute the partial computations with both additions and multiplications of encrypted values, without decrypting the values. The devices can also generate partial computations of a token that can be used to generate a signature of the challenge message. In some embodiments, the devices can partially decrypt a partial computation (or a partial distance).

In step 414, the other devices 425 send the partial computations to the first device 405. The first device 405 receives at least T partial computations, where T is a threshold for the distributed signature generation. The first partial computation may be one of the at least T partial computations. The first device 405 may receive zero knowledge proofs along with each partial computation. The zero knowledge proofs may be used to verify the at least T partial computations.

In step 416, the first device 405 uses the partial computations to generate a signature (e.g., a token) of the challenge message. For example, the first device 405 may evaluate the partial computations to receive partial signatures (e.g., shares of the token), which it can then combine to generate a complete signature. In some embodiments, the partial signatures may be encrypted, such as with an additively homomorphic encryption scheme. The first device 405 may add shares of additively homomorphic encryptions of partial distances between the template shares and the measurement vector to obtain a total distance between the measurement vector and the template vector. The total distance can be compared to a threshold, and if the total distance is less than the threshold, the first device 405 can generate the signature and sign the challenge message. In this way, the generation of a complete token can be tied to the success of the biometric computations. In some embodiments, a zero knowledge proof can be used by the other devices to verify the comparison of the total distance to the threshold. A zero knowledge proof can also be used by the other devices or the first device 405 to verify the at least T partial computations.

In some embodiments, in order to generate the signature, the first device 405 may generate a cryptographic program. The cryptographic program may conditionally use a the set of keys to generate the signature when the measurement vector is within a threshold of the template vector. For example, the cryptographic program may generate the signature if a cosine similarity measure between the measurement vector and the template vector is less than a threshold. In some embodiments, the cryptographic program may include a garbled circuit. The garbled circuit may perform the steps of adding partial distances and comparing the total distance to the template. In some embodiments, the first device 405 may input the measurement vector into the garbled circuit, and thus the measurement vector can be compared to the template vector without the first device 405 sending the measurement vector to the other devices 425. The cryptographic program may also use properties of additively homomorphic encryption to determine if the measurement vector is within the threshold of the template vector. In some embodiments, the cryptographic program may reconstruct the biometric template using the template shares. In some embodiments, the garbled circuit may output a string that can be used to decrypt the partial signatures. In some embodiments, the cryptographic program may reconstruct the biometric template using the template shares in order to compute the distance measure.

In step 418, the first device 405 sends the signed challenge message to the second device 415. The second device 415 can use the stored public key to verify the signature on the challenge message. If the signature is valid, the first device 405 can be authenticated to the second device 415.

A. General Purpose

We now describe the techniques used in a four round Fuzzy Threshold Token Generation scheme that works for any distance measure and is malicious secure against an adversary that can corrupt up to (t−1) parties.

Our starting point is the observation that suppose all the parties could freely communicate in our model, then any r round malicious secure multiparty computation (MPC) protocol with a broadcast channel would also directly imply an r round Fuzzy Threshold Token Generation scheme if we consider the following functionality: the initiator P* has input (m, $\mathcal{S}$, $\vec{v}$), every party $P_i \in \mathcal{S}$ has input (m, $\mathcal{S}$) and their respective shares of the template $\vec{w}$ and the signing key. The functionality outputs a signature on m to party P* if Dist($\vec{u}$, $\vec{w}$)>d and $|\mathcal{S}|$=t. Recently, several elegant works [5, 6, 7, 8, 9, 11] have shown how to construct two round UC-secure MPC protocols in the CRS model with a broadcast channel from standard assumptions. However, since the communication model of our FTTG primitive does not allow all parties to interact amongst each other, our goal now is to emulate a two round MPC protocol π in our setting.

For simplicity, let's first consider n=t=3. That is, there are three parties: $P_1$, $P_2$, $P_3$. Consider the case when $P_1$ is the initiator. Now, in the first round of our FTTG scheme, $P_1$ sends m to both parties and informs them the set $\mathcal{S}$ that it is going to be communicating with involves both of them. Then, in round 2, we have $P_2$ and $P_3$ send their round one messages of the MPC protocol π. In round 3 of our FTTG scheme, $P_1$ sends its own round one message of the MPC protocol to both parties. Along with this, $P_1$ also sends $P_2$'s round one message to $P_3$ and vice versa. So now, at the end of round 3 of our FTTG scheme, all parties have exchanged their first round messages of protocol π.

Our next observation is that since we care only about $P_1$ getting output, in the underlying protocol π, only party $P_1$ needs to receive everyone else's messages in round 2! Therefore, in round 4 of our FTTG scheme, $P_2$ and $P_3$ can compute their round two messages based on the transcript so far and just send them to $P_1$. This will enable $P_1$ to compute the output of protocol π.

While the above FTTG scheme is correct, unfortunately, it is insecure. Note that in order to rely on the security of protocol π, we crucially need that for any honest party $P_i$, every other honest party receives the same first round message on its behalf. Further, embodiments can also require that all honest parties receive the same messages on behalf of the adversary. In our case, since the communication is being controlled and directed by $P_1$ instead of a broadcast channel, this need not be true if $P_1$ was corrupt and $P_2$, $P_3$ were honest. More specifically, one of the following two things could occur: (i) $P_1$ can forward an incorrect version of $P_3$'s round one message of protocol π to $P_2$ and vice versa. (ii) $P_1$ could send different copies of its own round 1 message of protocol π to both $P_2$ and $P_3$.

The first problem can be solved quite easily as follows: we simply enforce that $P_3$ sends a signed copy of its round 1 message of protocol π which is also forwarded by $P_1$ to $P_2$. Then, $P_2$ accepts the message to be valid if the signature verifies. In the setup phase, we can distribute a signing key to $P_3$ and a verification key to $P_2$. Similarly, we can ensure that $P_2$'s actual round 1 message of protocol π was forwarded by $P_1$ to $P_3$.

Tackling the second problem is a bit trickier. The idea is that instead of enforcing that $P_1$ send the same round 1 message of protocol π to both parties, we will instead ensure that $P_1$ learns their round 2 messages of protocol π only if it did indeed send the same round 1 message of protocol π to both parties. We now describe how to implement this mechanism. Let us denote $msg_2$ to be $P_1$'s round 1 message of protocol π sent to $P_2$ and $msg_3$ (possibly different from $msg_2$) to be $P_1$'s round 1 message of protocol π sent to $P_3$. In the setup phase, we distribute two keys $k_2$, $k_3$ of a pseudorandom function (PRF) to both $P_2$, $P_3$. Now, in round 4 of our FTTG scheme, $P_3$ does the following: instead of sending its round 2 message of protocol π as is, it encrypts this message using a secret key encryption scheme where the key is $PRF(k_3, msg_3)$. Then, in round 4, along with its actual message, $P_2$ also sends $PRF(k_3, msg_2)$ which would be the correct key used by $P_3$ to encrypt its round 2 message of protocol π only if $msg_2 = msg_3$. Similarly, we use the key $k_2$ to ensure that $P_2$'s round 2 message of protocol π is revealed to $P_1$ only if $msg_2 = msg_3$.

The above approach naturally extends for arbitrary n, k. by sharing two PRF keys between every pair of parties. Then, each party encrypts its round 2 message of protocol π with a secret key that is an XOR of all the PRF evaluations. We refer the reader to Section VII for more details.

B. Cosine Similarity

We now describe the techniques used in our four round efficient FTTG protocol for t=3 for the Cosine Similarity distance measure. Our protocol is secure against a malicious adversary that can corrupt at most 1 party. Our construction is very similar for the very related Euclidean Distance function but we focus on Cosine Similarity in this section. Recall that for two vectors $$\vec{u}, \vec{w}, CS. \text{Dist}(\vec{u}, vecw) = \frac{\langle \vec{u}, \vec{w} \rangle}{\|\vec{u}\| \cdot \|\vec{w}\|}$$

where $\|\vec{x}\|$ denotes the $L^2$-norm of the vector. First, we are going to assume that the distribution $\mathcal{W}$ samples vectors $\vec{w}$ such that $\|\vec{w}\|=1$. Then, instead of checking that CS. Dist($\vec{u}$, vecw)>d, we are going to check that $\langle \vec{u}, \vec{w} \rangle > (d \cdot \langle \vec{u}, \vec{u} \rangle)^2$. This is just a syntactic change that allows us to construct more efficient protocols.

Our starting point is the following. Suppose we had t=2. Then, embodiments can use Yao's [12] two party semi-honest secure computation protocol to build a two round FTTG scheme. In the registration phase, we secret share $\vec{w}$ into two parts $\vec{w}_1$, $\vec{w}_2$ and give one part to each party. The initiator requests for labels (via oblivious transfer) corresponding to his share of $\vec{w}$ and to his input $\vec{u}$ and the garbled circuit, which has the other share of $\vec{w}$ hardwired into it, reconstructs $\vec{w}$, checks that $\langle \vec{u}, \vec{w} \rangle > (d \cdot \langle \vec{u}, \vec{u} \rangle)^2$ and if so, outputs a signature. In this protocol, we would have security against a malicious initiator who only has to evaluate the garbled circuit, if we use an oblivious transfer protocol that is malicious secure in the CRS model. However, to achieve malicious security against the garbler, we would need expensive zero knowledge arguments. Now, in order to build an efficient protocol that achieves security against a malicious garbler and to actually make the protocol work for threshold t=3, the idea is to distribute the garbling process between two parties. That is, consider an initiator $P_1$ interacting with parties $P_2$, $P_3$. Now both $P_2$ and $P_3$ can generate one garbled circuit each using a shared randomness generated during the setup phase and the evaluator can just check if the two circuits are identical. In the registration phase, both $P_2$ and $P_3$ get the share $\vec{w}_2$ and a share of the signing key. Note that since the adversary can corrupt at most one party, this check would guarantee that the evaluator can learn whether the garbled circuit was honestly generated. In order to ensure that the evaluator does not evaluate both garbled circuits on different inputs, the garbled circuits can check that $P_1$'s OT receiver queries made to both parties were the same. While this directly gives a two round FTTG scheme that works for threshold t=3 and is secure against a malicious adversary that can corrupt at most one party, the resulting protocol is inefficient. Notice that in order to work for the Cosine Similarity distance measure, the garbled circuit will have to perform a lot of expensive operations—for vectors of length $\ell$, we would have to perform $O(\ell)$ multiplications inside the garbled circuit. Our goal is to build an efficient protocol that performs only a constant number of operations inside the garbled circuit.

Our strategy to build an efficient protocol is to use additional rounds of communication to offload the heavy computation outside the garbled circuit. In particular, if we can first do the inner product computation outside the garbled circuit in the first phase of the protocol, then the resulting garbled circuit in the second phase would have to perform only a constant number of operations. In order to do so, we leverage the tool of efficient additively homomorphic encryption schemes [14, 15]. In our new protocol, in round 1, the initiator $P_1$ will send an encryption of $\vec{u}$. $P_1$ can compute $\langle \vec{u}, \vec{w}_1 \rangle$ by itself. Both $P_2$ and $P_3$ respond with encryptions of $\langle \vec{u}, \vec{w}_2 \rangle$ computed homomorphically using the same shared randomness. Then, $P_1$ can decrypt this ciphertext and compute $\langle \vec{u}, \vec{w} \rangle$. The parties can then run the garbled circuit based protocol as above in rounds 3 and 4 of our FTTG scheme: that is, $P_1$ requests for labels corresponding to $\langle \vec{u}, \vec{w} \rangle$ and $\langle \vec{u}, \vec{u} \rangle$ and the garbled circuit does the rest of the check as before. While this protocol is correct and efficient, there are still several issues.

The first problem is that the inner product $\langle \vec{u}, \vec{w} \rangle$ is currently leaked to the initiator $P_1$ thereby violating the privacy of the template $\vec{w}$. To prevent this, we need to design a mechanism where no party learns the inner product entirely in the clear and yet the check happens inside the garbled circuit. A natural approach is for $P_2$ and $P_3$ to homomorphically compute an encryption of the result $\langle \vec{u}, \vec{w}_2 \rangle$ using a very efficient secret key encryption scheme. In our case, a one-time pad may suffice. Now, $P_1$ only learns an encryption of this value and hence the inner product is hidden, while the garbled circuit, with the secret key hardwired into it, can easily decrypt the one-time pad.

The second major challenge is to ensure that the input on which $P_1$ wishes to evaluate the garbled circuit is indeed the output of the decryption. If not, $P_1$ could request to evaluate the garbled circuit on suitably high inputs of his choice, thereby violating unforgeability. In order to prevent this attack, $P_2$ and $P_3$ homomorphically compute not just $x=\langle \vec{u}, \vec{w}_2 \rangle$ but also a message authentication code (MAC) y on the value x using shared randomness generated in the setup phase. We use a simple one time MAC that can be computed using linear operations and hence can be done using the additively homomorphic encryption scheme. Now, the garbled circuit also checks that the MAC verifies correctly and from the security of the MAC, $P_1$ can not change the input between the two stages. Also, $P_1$ can send encryptions of $\langle \vec{u}, \vec{u} \rangle$ in round 1 so that $P_2$, $P_3$ can compute a MAC on this as well, thereby preventing $P_1$ from cheating on this part of the computation too.

Another important issue to tackle is that we need to ensure that $P_1$ does indeed send valid well-formed encryptions. In order to do so, we rely on efficient zero knowledge arguments from literature. We observe that in our final protocol, the garbled circuit does only a constant number of operations and the protocol is extremely efficient.

In order to further optimize the concrete efficiency of our protocol, as done by Mohassel et al. [13], one or both of the two parties $P_2$, $P_3$ can send the entire garbled circuit. The other party can just send a hash of the garbled circuit and $P_1$ can just check that the hash values are equal.

III. Preliminaries

A. Notation

The notation [j:x] can denote that the value x is private to party j. For a protocol $\pi$, we write $[j:z'] \leftarrow \pi([i:(x,y)], [j:z], c)$ to denote that party i has two private inputs x and y; party j has one private input z; all the other parties have no private input; c is a common public input; and, after the execution, only j receives an output z'. $x_S$ denotes that each party $i \in S$ has a private value $x_i$.

B. Basic Primitives

We refer the reader to [18] for the definition of threshold linear secret sharing schemes, secret key encryption, oblivious transfer, garbled circuits, non-interactive zero knowledge arguments, digital signatures, collision resistant hash functions and pseudorandom functions. We refer to [14] for a definition of additively homomorphic encryption schemes and to [19] for a definition of circuit privacy. We refer to [18] for the definition of secure multi-party computation. We refer to Appendix A for a definition of threshold oblivious pseudorandom functions and robust secret sharing.

C. Distance Measures

First, let's recall that the $L^2$ norm of a vector $\vec{x}=(\vec{x}_i, \ldots, \vec{x}_n)$ is defined to be $\|\vec{x}\|=\sqrt{\vec{x}_1^2+\ldots+\vec{x}_n^2}$. We now define the various distance measures that we use in embodiments of the invention. This list is not limiting, as any suitable distance measure may be used.

Definition 1 (Hamming distance) For any two vectors $\vec{u}=(\vec{u}_1, \ldots, \vec{u}_\ell)$, $\vec{w}=(\vec{w}_1, \ldots, \vec{w}_\ell) \in \mathbb{Z}_q^\ell$, the Hamming Distance between them is defined to be the number of positions j at which $\vec{u}_j \neq \vec{w}_j$.

Hamming distance counts the number of points in which the measurement and template vectors differ. Two vectors of length l each can be said to be close if their Hamming Distance is at most (l−d)—that is, they are equal on at least d positions.

Definition 2 (Cosine similarity) For any two vectors $\vec{u}$, $\vec{w} \in \mathbb{Z}_q^\ell$, the Cosine Similarity between them is defined as follows:

$$CS.Dist(\vec{u}, \vec{w}) = \frac{\langle \vec{u}, \vec{w} \rangle}{\|\vec{u}\| \cdot \|\vec{w}\|}.$$

Cosine similarity uses the inner product of two vectors to determine the cosine of the angle between the vectors. Smaller angles correspond to more similar vectors. Thus if the angle is small, the cosine of the angle is greater, and if the cosine distance is greater than an established threshold, then the vectors are said to match.

Definition 3 (Euclidean Distance) For any two vectors $\vec{u}$, $\vec{w} \in \mathbb{Z}_q^\ell$, the Euclidean Distance between them is defined as follows:

$$EC.Dist(\vec{u}, \vec{w}) = (\langle \vec{u}, \vec{u} \rangle + \langle \vec{w}, \vec{w} \rangle - 2 \cdot CS.Dist(\vec{u}, \vec{w}))$$

Euclidean distance measures the distance between the endpoints of two vectors as points in space. Two vectors that have a small Euclidean distance are closer together. Thus if the Euclidean distance is below an established threshold, then the vectors are said to match.

D. Threshold Signature

We now formally define a Threshold Signature Generation Scheme [16] and the notion of unforgeability.

Definition 4 (Threshold Signature) Let n, t ∈ $\mathbb{N}$. A threshold signature scheme TS is a tuple of four algorithms (Gen, Sign, Comb, Ver) that satisfy the correctness condition below.

Gen($1^\kappa$, n, t)→(pp, vk, $sk_n$). This is a randomized key-generation algorithm that takes n, t and the security parameter K as input, and generates a signature verification-key vk, a shared signing-key $sk_n$ and public parameters pp. (pp is an implicit input to all algorithms below.)

Sign($sk_i$, m)=:$\sigma_i$. This is a deterministic signing algorithm that takes a signing key-share $sk_i$ as input along with a message and outputs a partial signature $\sigma_i$.

Comb($\{\sigma_i\}_{i \in S}$)=:σ/⊥. This is a deterministic algorithm that takes a set of partial signatures $\{sk_i\}_{i \in S}$ and outputs a signature σ or ⊥ denoting failure.

Ver(vk, (m, σ))=:1/0. This is a deterministic signature verification algorithm that takes a verification key vk and a candidate message-signature pair (m, σ) as input, and returns a decision bit (1 for valid signature and 0 otherwise).

For all κ∈ $\mathbb{N}$, any t, n∈ $\mathbb{N}$ such that t≤n, all (pp, vk, $sk_n$) generated by Gen($1^\kappa$, n, t), any message m, and any set S⊆[n] of size at least t, if $\sigma_i$=Sign($sk_i$, m) for i∈S, then Ver(vk, (m, Comb($\{\sigma^i\}_{i \in S}$)))=1.

Definition 5 (Unforgeability) A threshold signatures scheme TS=(Gen, Sign, Comb, Ver) is unforgeable if for all n, t∈ $\mathbb{N}$, t≤n, and any PPT adversary $\mathcal{A}$, the following game outputs 1 with negligible probability (in security parameter).

Initialize. Run (pp, vk, $sk_n$) Gen($1^\kappa$, n, t). Give pp, vk to $\mathcal{A}$. Receive the set of corrupt parties C ⊂ [n] of size at most t−1 from $\mathcal{A}$. Then give $sk_c$ to $\mathcal{A}$. Define γ:=t−|C|. Initiate a list L:=∅.

Signing queries. On query (m, i) for i⊆[n]\C return $\sigma_i$→Sign($sk_i$, m). Run this step as many times $\mathcal{A}$ desires.

Building the list. If the number of signing query of the form (m, i) is at least γ, then insert m into the list L. (This captures that $\mathcal{A}$ has enough information to compute a signature on m.)

Output. Eventually receive output (m*, σ*) from $\mathcal{A}$. Return 1 if and only if Ver(vk, (m*, σ*))=1 and m*∈L, and 0 otherwise.

E. Specific Threshold Signature Schemes

We now describe the threshold signature schemes of Boldyreva [16] based on Gap-DDH assumption and Shoup [17] based on RSA assumption. We will use these schemes in Section IX.

1. Scheme of Boldyreva

Let $\mathbb{G} = \langle g \rangle$ be a multiplicative cyclic group of prime order p that supports pairing and in which CDH is hard. In particular, there is an efficient algorithm VerDDH($g^a$, $g^b$, $g^c$, g) that returns 1 if and only if c=ab mod p for any a, b, c∈ $\mathbb{Z}^*_p$ and 0 otherwise. Let H:{0,1}*→ $\mathbb{G}$ be a hash function modeled as a random oracle. Let Share be the Shamir's secret sharing scheme.

The threshold signature scheme is as follows:

Setup($1^\lambda$, n, t)→([[sk]], vk, pp). Sample s←$_\$\mathbb{Z}^*_p$ and get ($s, s_1, \ldots, s_n$)←Share(n, t, p, (0, s)). Set pp:=(p, g, $\mathbb{G}$), $sk_i$:=$s_i$ and vk:=$g^s$. Give ($sk_i$, pp) to party i.

PartEval($sk_i$, x)→$y_i$. Compute w:=H(x), $h_i$:=$w^{sk_i}$ and output $h_i$.

Combine($\{i, y_i\}_{i \in S}$)=:Token/⊥. If |S|<t output ⊥. Otherwise parse $y_i$ as $h_i$ for i∈S and output $\Pi_{i \in S} h_i^{\lambda_{i,s} mod p}$ Verify(vk, x, Token)=:1/0. Return 1 if and only if VerDDH (H(x), vk, Token, g)=1.

2. Scheme of Shoup

Let Share be Shamir's secret sharing scheme and H:{0, 1}*→> $\mathbb{Z}^*_N$ be a hash function modeled as a random oracle.

The threshold signature scheme is as follows:

Setup($1^\lambda$, n, t)→([[sk]], vk, pp). Let p', q' be two randomly chosen large primes of equal length and set p=2p'+1 and q=2q'+1. Set N=pq. Choose another large prime e at random and compute d≡$e^{-1}$ mod Φ(N) where Φ(·): $\mathbb{N} \to \mathbb{N}$ is the Euler's totient function. Then (d, $d_1, \ldots, d_n$)←Share(n, t, Φ(N), (0, d)). Let $sk_i$=$d_i$ and vk=(N, e). Set pp=Δ where Δ=n!. Give (pp, vk, $sk_i$) to party i.

PartEval($sk_i$, x)→$y_i$. Output $y_i$:=H(x)$^{2\Delta d_i}$.

Combine($\{i, y_i\}_{i \in S}$)=:Token/⊥. If |S|<t output ⊥, otherwise compute z=$\Pi_{i \in S} i^{2\lambda'_{i,s}}$modN where $\lambda'_{i,s}$=$\lambda_{i,s}\Delta \in \mathbb{Z}$. Find integer (a, b) by Extended Euclidean GCD algorithm such that $4\Delta^2 a + eb = 1$. Then compute Token=$z^a \cdot H(x)^b$ mod N. Output Token.

Verify(vk, x, Token)=:1/0. Return 1 if and only if Token$^e$=H(x) mod N.

F. Zero Knowledge Argument of Knowledge for Additively Homomorphic Encryption In this section, we list a couple of NP languages with respect to any additively homomorphic encryption scheme in which we use efficient non-interactive zero knowledge argument of knowledge systems.

First, let (AHE.Setup, AHE.Enc, AHE.Add, AHE.ConstMul, AHE.Dec) be the algorithms of an additively homomorphic encryption scheme. Let pk denote a public key sampled by running the setup algorithm AHE.Setup($1^\lambda$). Let $\mathcal{M}$ denote the message space for the encryption scheme.

1. NP Languages

The first NP language is to prove knowledge of a plaintext in a given ciphertext. The second one proves that given three ciphertexts where the first two are well-formed and the prover knows the corresponding plaintexts and randomness used for encrypting them, the third ciphertext was generated by running the algorithm AHE.ConstMul(·). That is, it proves that the third ciphertext contains an encryption of the product of the messages encrypted in the first two ciphertexts.

NP language $L_1$ characterized by the following relation $R_1$.
Statement:st=(ct, pk)
Witness:wit=(x, r)
$R_1$(st, wit)=1 if and only if:
ct=AHE.Enc(pk, x; r).

NP language $L_2$ characterized by the following relation $R_2$.
Let $ct_i$=AHE.Enc(pk, $x_1$; $r_1$), $ct_2$=AHE.Enc(pk, $x_2$; $r_2$).
Statement:st=($ct_1$, $ct_2$, $ct_3$, pk)
Witness:wit=($x_1$, $r_1$, $x_2$, $r_2$, $r_3$)
$R_1$(st, wit)=1 if and only if:
$ct_3$=AHE.ConstMul(pk, $ct_1$, $x_2$; $r_3$).

2. Paillier Encryption Scheme

With respect to the additively homomorphic encryption scheme of Paillier [14], we have efficient NIZK arguments for the above two languages. Formally, we have the following imported theorem:

Imported Theorem 1 [20] Assuming the hardness of the $N^{th}$ Residuosity assumption, there exists a non-interactive zero knowledge argument of knowledge for the above two languages in the Random Oracle model.

The above zero knowledge arguments are very efficient and only use a constant number of group operations on behalf of both the prover and verifier.

IV. Fuzzy Threshold Signature Generation

We introduce the notion of fuzzy threshold token generation (FTTG). An FTTG scheme is defined with respect to a function Dist which computes distance between two vectors, say from the space of $\ell$-dimensional vectors over $\mathbb{Z}_q$. In the registration phase, key shares of a threshold signature scheme are generated and a template W is chosen according to a distribution $\mathcal{W}$ over $\mathbb{Z}_q^\ell$. Then the shares of the key and template are distributed among the n parties. A separate set-up algorithm generates some common parameters and some secret information for each party. After the one-time set-up has been completed, any one of the n parties can initiate a sign-on session with a new measurement $\vec{u}$. If at least t parties participate in the session and $\vec{u}$ is close to the distributed template $\vec{w}$, w.r.t. the measure Dist, then the initiating party obtains a valid signature.

Definition 6 (Fuzzy Threshold Token Generation). Let n, t$\in \mathbb{N}$ and $\mathcal{W}$ be a probability distribution over vectors in $\mathbb{Z}_q^\ell$ for some q, $\ell \in \mathbb{N}$. Let TS=(Gen, Sign, Comb, Ver) be a threshold signature scheme. An FTTG scheme for distance measure Dist: $\mathbb{Z}_q^\ell \times \mathbb{Z}_q^\ell \to \mathbb{N}$ with threshold d$\in \mathbb{Z}$ is given by a tuple (Registration, Setup, SignOn, Verify) that satisfies the correctness property stated below.

Registration($1^\kappa$, n, t, TS, q, $\ell$, $\mathcal{W}$, d)$\to$(sk, $\vec{w}_{[n]}$, pp, vk): On input the parameters, this algorithm first runs the key-generation of the threshold signature scheme, ($sk_{[n]}$, pp, vk)$\leftarrow$Gen($1^\kappa$, n, t). Then it chooses a random sample $\vec{w} \leftarrow \mathcal{W}$. At the end, every party i receives ($sk_i$, $\vec{w}_i$, pp, vk), where $\vec{w}_i$ is a share of $\vec{w}$. (We will implicitly assume that all protocols/algorithms below take pp as input.)

Setup( )$\to$($pp_{setup}$, $s_1$, . . . , $s_n$): Setup is an algorithm that outputs some common parameters $pp_{setup}$ and some secret information $s_i$ for each party. ($pp_{setup}$ will also be an implicit input in the algorithms below.)

SignOn((sk, $\vec{w}$)$_s$, [j:(m, $\vec{u}$, S)])$\to$([j:$\tau/\bot$], [S:(m, j, S)]): SignOn is a distributed protocol through which a party j with an input $\vec{u}$ obtains a (private) token $\tau$ (or $\bot$, denoting failure) on a message m with the help of parties in a set S. Each party i$\in$S uses their private inputs ($sk_i$, $\vec{w}_i$) in the protocol and outputs (m, j, S). Party j additionally outputs $\tau/\bot$. Further, in this protocol, Party j can communicate with every party in the set $\mathcal{S}$ but the other parties in $\mathcal{S}$ can not interact directly with each other.

Verify(vk, m, $\tau$)$\to$\{0,1\}: Verify is an algorithm which takes input the verification-key vk, a message m and a token $\tau$, runs the verification algorithm of the threshold signature scheme b:=Ver(vk, (m, $\tau$)), and outputs b.

Correctness. For all $\kappa \in \mathbb{N}$, any n, t$\in \mathbb{N}$ such that t≤n, any threshold signature scheme TS, any q, $\ell \in \mathbb{N}$, any probability distribution $\mathcal{W}$ over $\mathbb{Z}_q^\ell$, any distance d$\in \mathbb{Z}$, any measurement $\vec{u} \in \mathbb{Z}_q^\ell$, any m, any S$\subseteq$[n] such that |S|=t, and any j$\in$[n], if (sk, $\vec{w}_{[n]}$, pp, vk)$\leftarrow$Registration($1^\kappa$, n, t, TS, q, $\ell$, $\mathcal{W}$, d), ($pp_{setup}$, $s_1$, . . . , $s_n$) Setup( ), and ([j:out], [S:(m, j, S)])$\leftarrow$SignOn((sk, $\vec{w}$)$_{[n]}$, [j:(m, $\vec{u}$, S)]), then Verify(vk, m, out)=1 if Dist($\vec{w}$, $\vec{u}$)≥d.

For an FTTG scheme, one could consider two natural security considerations. The first one is the privacy of biometric information. A template is sampled and distributed in the registration phase. Clearly, no subset of t−1 parties should get any information about the template from their shares. Then, whenever a party performs a new measurement and takes the help of other parties to generate a signature, none of the participants should get any information about the measurement, not even how close it was to the template. We allow the participants to learn the message that was signed, the identity of the initiating party, and set of all participants. The second natural security consideration is unforgeability. Even if the underlying threshold signature scheme is unforgeable, it may still be possible to generate a signature without having a close enough measurement. An unforgeable FTTG scheme should not allow this.

We propose a unified real-ideal style definition to capture both considerations. In the real world, sessions of sign-on protocol are run between adversary and honest parties whereas in the ideal world, they talk to the functionality $\mathcal{F}_{DiFuz}$. Both the worlds are initialized with the help of n, t, an unforgeable threshold signature scheme, parameters q, $\ell$ for the biometric space, a threshold for successful match d, a distribution $\mathcal{W}$, and a sequence $\vec{U}:=(\vec{u}_1, \vec{u}_2, \ldots, \vec{u}_h)$ of measurements for honest parties. The indistinguishability condition that we will define below must hold for all values of these inputs. In particular, it should hold irrespective of the threshold signature scheme used for initialization, as long as it is unforgeable. The distribution $\mathcal{W}$ over the biometric space could also be arbitrary.

In the initialization phase, Registration is run in both real and ideal worlds to generate shares of a signing key and a template (chosen as per $\mathcal{W}$). In the real world, Setup is also run. The public output of both Registration and Setup is given to the adversary $\mathcal{A}$. It outputs a set of parties C to corrupt along with a sequence $((m_1, j_1, S_1), \ldots, (m_h, j_h, S_h))$, which will later be used to initiate sign-on sessions from honest parties (together with $(\vec{u}_1, \ldots, \vec{u}_h)$. The secret shares of corrupt parties are given to $\mathcal{A}$ and the rest of shares are given to appropriate honest parties. On the other hand, in the ideal world, $\mathcal{S}$ is allowed to pick the output of Setup. We will exploit this later to produce a simulated common reference string. Note, however, that the output of Setup (whether honest or simulated) will be part of the final distribution.

Evaluation phase in the real world can be one of two types. Either a corrupt party can initiate a sign-on session or $\mathcal{A}$ can ask an honest party to initiate a session using the inputs chosen before. In the ideal world, $\mathcal{S}$ talks to $\mathcal{F}_{DiFuz}$ to run sign-on sessions. Again, there are two options. If $\mathcal{S}$ sends (SignOn-Corrupt, m, $\vec{u}$, j, S) to the functionality (where j is corrupt), then it can receive signature shares of honest parties in S on the message m but only if $\vec{u}$ is close enough to $\vec{w}$. When $\mathcal{S}$ sends (SignOn-Honest, sid, i), $\mathcal{F}_{DiFuz}$ waits to see if $\mathcal{S}$ wants to finish the session or not. If it does, then $\mathcal{F}_{DiFuz}$ computes a signature and sends it to the initiating (honest) party.

We say that an FTTG scheme is secure if the joint distribution of the view of the real world adversary and the outputs of honest parties is computationally indistinguishable from the joint distribution of the view of the ideal world adversary and messages honest parties get from the functionality.

There are several important things to note about the definition. It allows an adversary to choose which parties to corrupt based on the public parameters. It also allows the adversary to run sign-on sessions with arbitrary measurements. This can help it to generate signatures if some measurements turn out to be close enough. Even if none of them do, it can still gradually learn the template. Our definition does not allow inputs for sessions initiated by honest parties to be chosen adaptively during the evaluation phase. Thus, the definition is a standalone definition and not a (universally) composable one. This type of restriction helps us to design more efficient protocols, and in some cases without any trusted setup.

Definition 7 A fuzzy threshold token generation scheme FG=(Registration, Setup, SignOn, Verify) is secure if for any n, t s.t. t>n, any unforgeable threshold signature scheme TS, any q, $\ell \in \mathbb{N}$, any distance d$\in \mathbb{Z}$, and any PPT adversary $\mathcal{A}$, there exists a PPT simulator $\mathcal{S}$ such that for any probability distribution $\mathcal{W}$ over $\mathbb{Z}_q^\ell$ and any sequence $\vec{U}:=(\vec{u}_1, \vec{u}_2, \ldots, \vec{u}_h)$ of measurements (where h=poly(κ) and $\vec{u}_i \in \mathbb{Z}_q^\ell$), (Vie$^{\mathcal{W}_{\mathcal{A}}}$, {Out-Real$_i$}$_{i \in [n]\setminus C}$))≈(Vie$^{\mathcal{W}_{\mathcal{S}}}$, {Out-Ideal$_i$}$_{i \in [n]\setminus C}$)), where Vie$^{\mathcal{W}_{\mathcal{A}}}$ and Vie$^{\mathcal{W}_{\mathcal{S}}}$ are the views of $\mathcal{A}$ and $\mathcal{S}$ in the real and ideal worlds respectively, Out-Real$_i$ is the concatenated output of (honest) party i in the real world from all the SignOn sessions it participates in (plus the parameters given to it during initialization), and Out-Ideal$_i$ is the concatenation of all the messages that party i gets from the functionality $\mathcal{F}_{DiFuz}$ in the ideal world, as depicted in FIG. 5.

V. Any Distance Measure

In this section, we show how to construct a four round secure fuzzy threshold token generation protocol using any two round malicious secure MPC protocol using a broadcast channel as the main technical tool. Our token generation protocol satisfies Definition 7 for any n, t and works for any distance measure. Formally, we show the following theorem:

Theorem 1 Assuming the existence of threshold signatures, threshold secret sharing, two round UC-secure MPC protocols in the CRS model that is secure in the presence of a broadcast channel against malicious adversaries that can corrupt up to (t−1) parties, secret key encryption, and pseudorandom functions and strongly unforgeable signatures, there exists a four round secure fuzzy threshold token generation protocol Definition 7 for any n, t and any distance measure.

Note that such a two round MPC protocol can be built assuming DDH/LWE/QR/N$^{th}$ Residuosity [5, 6, 7, 8, 9, 11]. All the other primitives can be based on the existence of injective one way functions.

Instantiating the primitives used in the above theorem, we get the following corollary:

Corollary 2 Assuming the existence of injective one way functions and A$\in$ {DDH/LWE/QR/N$^{th}$ Residuosity}, there exists a four round secure fuzzy threshold token generation protocol satisfying Definition 7 for any n, t, any distance measure Dist and any threshold d.

A. Construction

We first list some notation and the primitives used before describing our construction.

Let Dist denote the distance function and d denote the threshold distance value to denote a match. Let the n parties be denoted by $P_1, \ldots, P_n$ respectively. Let λ denote the security parameter. Let $\mathcal{W}$ denote the distribution from which the random vector is sampled. Let's assume the vectors are of length $\ell$ where $\ell$ is a polynomial in λ. Each element of this vector is an element of a field F over some large prime modulus q.

Let TS=(TS.Gen, TS.Sign, TS.Combine, TS.Verify) be a threshold signature scheme. Let (SKE.Enc, SKE.Dec) denote a secret key encryption scheme. Let (Share, Recon) be a (t, n) threshold secret sharing scheme. Let (Gen, Sign, Verify) be a strongly-unforgeable digital signature scheme. Let PRF denote a pseudorandom function.

Let $\pi$ be a two round UC-secure MPC protocol in the CRS model in the presence of a broadcast channel that is secure against a malicious adversary that can corrupt upto (t−1) parties. Let $\pi$.Setup denote the algorithm used to generate the CRS. Let ($\pi$.Round$_1$, $\pi$.Round$_2$) denote the algorithms used by any party to compute the messages in each of the two rounds and $\pi$.Out denote the algorithm to compute the final output. Further, let $\pi$.Sim use algorithm ($\pi$.Sim$_1$, $\pi$.Sim$_2$) to compute the first and second round messages respectively. Note that since we consider a rushing adversary, the algorithm $\pi$.Sim$_1(\cdot)$ does not require the adversary's input or output. Let $\pi$.Ext denote the extractor, that, on input the adversary's round one messages, extracts its inputs. Let $\pi$.Sim.Setup denote the algorithm used by $\pi$.Sim to compute the simulated CRS.

We now describe the construction of our four round secure fuzzy threshold token generation protocol $\pi^{Any}$ for any n and k.

1. Registration

In the registration phase, the following algorithm is executed by a trusted authority. The trusted authority may be a device that will participate in subsequent biometric matching and signature generation. If the trusted authority will potentially participate in biometric matching and signature generation, it can delete the information that it should not have at the end of the registration phase. That is, it should delete the shares corresponding to the other devices.

The trusted authority can sample a random vector w from the distribution $\mathcal{W}$ of biometric data and save it as the biometric template. The trusted authority can then compute the appropriate shares of the template ($\vec{w}_1, \ldots, \vec{w}_n$), depending on the key sharing algorithm being used, the number of devices and the threshold, and the security parameter using a share generation algorithm ($\vec{w}_1, \ldots, \vec{w}_n$)←Share($1^\lambda$, $\vec{w}$, n, t). The public key vk$^{TS}$, secret key shares sk$_1^{TS}, \ldots,$ sk$_n^{TS}$, and other relevant parameters pp$^{TS}$ for the threshold signature scheme can be generated with the threshold generation algorithm (pp$^{TS}$, vk$^{TS}$, sk$_1^{TS}, \ldots,$ sk$_n^{TS}$)←TS.Gen($1^\lambda$, n, t). Then the trusted authority can send each device the relevant information (e.g., the template share, secret key share, public key, and other threshold signature parameters). For example, the i$^{th}$ device (party P$_i$) can receive ($\vec{w}_i$, pp$^{TS}$, vk$^{TS}$, sk$_i^{TS}$).

2. Setup

Set up can also be done by a trusted authority. The trusted authority may be the same trusted device that completed the registration. If the trusted authority will potentially participate in biometric matching and signature generation, it can delete the information that it should not have at the end of the registration phase. That is, it should delete the shares corresponding to the other devices.

Generate crs←$\pi$.Setup($1^\lambda$).
For each i∈[n], compute (sk$_i$, vk$_i$)←Gen($1^\lambda$).
For every i,j∈[n], compute (k$_{i,j}^{PRF}$, k$_{j,i}^{PRF}$) as uniformly random strings.
For each i∈[n], give (crs, sk$_i$, {vk$_j$}$_{j\in[n]}$) to party P$_i$.

First, the trusted authority can generate a common reference string crs for the multiparty computation scheme being used using a setup algorithm crs←$\pi$.Setup($1^\lambda$). Generate shares of a secret key and public key for authenticating the computations. Compute shares of relevant parameters and secrets for a distributed pseudorandom function. Then each device is sent the relevant information (e.g., the crs and key shares).

3. SignOn

In the SignOn phase, let's consider party P* that uses input vector $\vec{u}$, a message m on which it wants a token. P* interacts with the other parties in the below four round protocol. The arrowhead in Round 1 can denote that in this round messages are outgoing from party P*.

Round 1: (P*→) Party P* does the following:
  i. Pick a set $\mathcal{S}$ consisting of t parties amongst P$_1, \ldots,$ P$_n$. For simplicity, without loss of generality, we assume that P* is also part of set $\mathcal{S}$.
  ii. To each party P$_i\in\mathcal{S}$, send (m, $\mathcal{S}$).

Round 2: (→P*) Each Party P$_i\in\mathcal{S}$ (except P*) does the following:
  i. Participate in an execution of protocol $\pi$ with the parties in set $\mathcal{F}$ using input y$_i$=($\vec{w}_i$, sk$_i^{TS}$) and randomness r$_i$ to compute the circuit C defined in FIG. 6. That is, compute the first round message msg$_{1,i}$←$\pi$.Round$_1$(y$_i$; r$_i$).
  ii. Compute $\sigma_{1,i}$=Sign(sk$_i$, msg$_{1,i}$) using some randomness.
  iii. Send (msg$_{1,i}$, $\sigma_{1,i}$) to party P*.

Round 3: (P*→) Party P* does the following:
  i. Let Trans$_{DiFuz}$ denote the set of messages received in round 2.
  ii. Participate in an execution of protocol $\pi$ with the parties in set $\mathcal{S}$ using input y$_*$=($\vec{w}_*$, sk$_*^{TS}$, $\vec{u}$, m) and randomness r, to compute the circuit C defined in FIG. 6. That is, compute the first round message msg$_{1,*}$←$\pi$.Round$_1$(y$_*$; r$_*$).
  iii. To each party P$_i\in\mathcal{S}$, send (Trans$_{DiFuz}$, msg$_{1,*}$).

Round 4: (→P*) Each Party P$_i\in\mathcal{S}$ (except P*) does the following:
  i. Let Trans$_{DiFuz}$ consist of a set of messages of the form (msg$_{i,j}$, $\sigma_{1,j}$), $\forall j\in$S\P*. Output ⊥ if Verify(vk$_j$, msg$_{1,j}$, $\sigma_{1,j}$)≠1.
  ii. Let $\tau_1$ denote the transcript of protocol $\pi$ after round 1. That is, $\tau_1$={msg$_{1,j}$}$_{j\in\mathcal{S}}$.
  iii. Compute the second round message msg$_{2,i}$←$\pi$.Round$_2$(y$_i$, $\tau_1$; r$_i$).
  iv. Let (Trans$_{DiFuz}$, msg$_{1,*}$) denote the message received from P* in round 3. Compute ek$_i$=$\oplus_{j\in\mathcal{S}}$ PRF(k$_{i,j}^{PRF}$, msg$_{1,*}$).
  v. Compute ct$_i$=SKE.Enc(ek$_i$, msg$_{2,i}$).
  vi. For each party P$_j\in\mathcal{S}$, compute ek$_{j,i}$=PRF(k$_{j,i}^{PRF}$, msg$_{1,*}$).
  vii. Send (ct$_i$, {ek$_{j,i}$}$_{j\in\mathcal{S}}$) to P*.

Output Computation: Every party P$_i\in\mathcal{S}$ outputs (m, P*, $\mathcal{S}$). Additionally, party P* does the following to generate a token:
  i. For each party P$_j\in\mathcal{S}$, do the following:
    Compute ek$_j$=$\oplus_{i\in\mathcal{S}}$ ek$_{j,i}$.
    Compute msg$_{2,j}$=SKE.Dec(ek$_j$, ct$_j$).
  ii. Let $\tau_2$ denote the transcript of protocol $\pi$ after round 2.

iii. Compute the output of $\pi$ as $\{\text{Token}\}_{i \in \mathcal{S}} \leftarrow \pi.\text{Out}(y_*, \tau_2; r_*)$.
iv. Compute Token$\leftarrow$TS.Combine($\{\text{Token}\}_{i \in \mathcal{S}}$).
v. Output Token if TS.Verify($vk^{TS}$, m, Token). Else, output $\perp$.

4. Token Verification

Given a verification key $vk^{TS}$, message m and token Token, the token verification algorithm outputs 1 if TS.Verify($vk^{TS}$, m, Token) outputs $\perp$.

The correctness of the protocol directly follows from the correctness of the underlying primitives.

B. Security Proof

In this section, we formally prove Theorem 1.

Consider an adversary $\mathcal{A}$ who corrupts $t^*$ parties where $t^* < t$. The strategy of the simulator Sim for our protocol $\pi^{Any}$ against a malicious adversary $\mathcal{A}$ is described below. Note that the registration phase first takes place at the end of which the simulator gets the values to be sent to every corrupt party which it then forwards to $\mathcal{A}$.

1. Description of Simulator

Setup: Sim does the following:
(a) Generate $crs_{sim} \leftarrow \pi.\text{Sim.Setup}(1^\lambda)$.
(b) For each $i \in [n]$, compute $(sk_i, vk_i) \text{Gen}(1^\lambda)$.
(c) For each $i,j \in [n]$, compute $(k_{i,j}^{PRF}, k_{j,i}^{PRF})$ as uniformly random strings.
(d) For each $i \in [n]$, if $P_i$ is corrupt, give $(crs, sk_i, \{vk_j\}_{j \in [n]}, \{k_{j,i}^{PRF}, k_{i,j}^{PRF}\}_{j \in [n]})$ to the adversary $\mathcal{A}$.

SignOn Phase: Case 1—Honest Party as P*

Suppose an honest party P* uses an input vector u and a message m for which it wants a token by interacting with a set of parties $\mathcal{S}$. The arrowhead in Round 1 can denote that in this round messages are outgoing from the simulator. Sim gets the tuple (m, $\mathcal{S}$) from the ideal functionality $\mathcal{F}_{DiFuz}$ and interacts with the adversary $\mathcal{A}$ as below:

Round 1: (Sim$\rightarrow$) Sim sends (m, $\mathcal{S}$) to the adversary $\mathcal{A}$ for each corrupt party $P_i \in \mathcal{S}$.

Round 2: ($\rightarrow$Sim) On behalf of each corrupt party $P_i \in \mathcal{S}$, receive $(msg_{1,i}, \sigma_{1,i})$ from the adversary.

Round 3: (Sim$\rightarrow$) Sim does the following:
(a) On behalf of each honest party $P_j$ in $\mathcal{S} \setminus P^*$, compute $msg_{i,j} \leftarrow \pi.\text{Sim}_1(1^\lambda, P_j)$ and $\sigma_{1,j} = \text{Sign}(sk_j, msg_{1,j})$.
(b) Let $\text{Trans}_{DiFuz}$ denote the set of tuples of the form $(msg_{1,i}, \sigma_{1,i})$ received in round 2 and computed in the above step.
(c) Compute the simulated first round message of protocol $\pi$ on behalf of honest party P* as follows: $msg_{1,*} \leftarrow \pi.\text{Sim}_1(1^\lambda, P^*)$.
(d) Send ($\text{Trans}_{DiFuz}$, $msg_{1,*}$) to the adversary for each corrupt party $P_i \in \mathcal{S}$.

Round 4: ($\rightarrow$Sim) On behalf of each corrupt party $P_i \in \mathcal{S}$, receive ($ct_i$, $\{ek_{j,i}\}_{j \in \mathcal{S}}$) from the adversary.

Message to Ideal Functionality $\mathcal{F}_{DiFuz}$: Sim does the following:
(a) Run $\pi.\text{Sim}(*)$ on the transcript of the underlying protocol $\pi$.

(b) If $\pi.\text{Sim}(*)$ decides to instruct the ideal functionality of $\pi$ to deliver output to the honest party P* in protocol $\pi$, then so does Sim to the functionality $\mathcal{F}_{DiFuz}$ in our distributed fuzzy secure authentication protocol. Note that in order to do so, $\pi.\text{Sim}(*)$ might internally use the algorithm $\pi.\text{Ext}(\cdot)$. Essentially, this step guarantees Sim that the adversary behaved honestly in the protocol.
(c) Else, Sim outputs $\perp$.

SignOn Phase: Case 2—Malicious Party as P*

Suppose a malicious party is the initiator P*. Sim interacts with the adversary $\mathcal{A}$ as below:

Round 1: ($\rightarrow$Sim) Sim receives (m, $\mathcal{S}$) from the adversary $\mathcal{A}$ on behalf of each honest party $P_j$.

Round 2: (Sim$\rightarrow$) Sim does the following:
(a) On behalf of each honest party $P_j$ in $\mathcal{S}$, compute and send the pair $msg_{1,j} \leftarrow \pi.\text{Sim}_1(1^\lambda, P_j)$ and $\sigma_{1,j} = \text{Sign}(sk_j, msg_{1,i})$ to the adversary.

Round 3: ($\rightarrow$Sim) Sim receives a tuple ($\text{Trans}_{DiFuz}$, $msg_{1,*}$) from the adversary $\mathcal{A}$ on behalf of each honest party $P_j$.

Round 4: (Sim$\rightarrow$) Sim does the following:
(a) On behalf of each honest party $P_j$, do the following:
   i. Let $\text{Trans}_{DiFuz}$ consist of a set of messages of the form $(msg_{1,i}, \sigma_{1,i})$, $\forall i \in S \setminus P^*$. Output $\perp$ if Verify($vk_i$, $msg_{1,i}, \sigma_{1,i}$)$\neq$1.
   ii. Let $\tau_1$ denote the transcript of protocol $\pi$ after round 1. That is, $\tau_1 = \{msg_{1,i}\}_{i \in \mathcal{S}}$.
(b) Let $\tau_2$ denote the subset of $\tau_1$ corresponding to all the messages generated by honest parties.
(c) If $\tau_2$ not equal for all the honest parties, output "SpecialAbort".
(d) If $msg_{1,*}$ not equal for all the honest parties, set a variable flag=0.
(e) Query to Ideal Functionality $\mathcal{F}_{DiFuz}$:
   i. Compute $in_{p_\mathcal{A}} = \pi.\text{Ext}(\tau_1, crs_{sim})$.
   ii. Query the ideal functionality $\mathcal{F}_{DiFuz}$ with $in_{p_\mathcal{A}}$ to receive output $ou_{t_\mathcal{A}}$.
(f) Compute the set of second round messages $msg_{2,j}$ of protocol $\pi$ on behalf of each honest party $P_j$ as $\pi.\text{Sim}_2(\tau_1, in_{p_\mathcal{A}}, ou_{t_\mathcal{A}}, P_j)$.
(g) On behalf of each honest party $P_j$, do the following:
   i. Let ($\text{Trans}_{DiFuz}$, $msg_{1,*}$) denote the message received from the adversary in round 3. Compute $ek_j = \bigoplus_{i \in \mathcal{S}} \text{PRF}(k_{j,i}^{PRF}, msg_{1,*})$.
   ii. If flag=0, compute $ct_j$=SKE.Enc(rand, $0^{|msg_{2,j}|}$) where rand is a string chosen uniformly at random.
   iii. Else, compute $ct_j$=SKE.Enc($ek_j, msg_{2,j}$).
   iv. For each party $P_i \in \mathcal{S}$, compute $ek_{i,j}$=PRF($k_{i,j}^{PRF}, msg_{1,*}$).
   v. Send ($ct_j$, $\{ek_{i,j}\}_{i \in \mathcal{S}}$) to the adversary.

2. Hybrids

We now show that the above simulation strategy is successful against all malicious PPT adversaries. That is, the view of the adversary along with the output of the honest parties is computationally indistinguishable in the real and ideal worlds. We will show this via a series of computationally indistinguishable hybrids where the first hybrid $\text{Hyb}_0$ corresponds to the real world and the last hybrid $\text{Hyb}_4$ corresponds to the ideal world.

1. $Hyb_0$—Real World: In this hybrid, consider a simulator SimHyb that plays the role of the honest parties as in the real world.

2. $Hyb_1$—Special Abort: In this hybrid, SimHyb outputs "SpecialAbort" as done by Sim in round 4 of Case 2 of the simulation strategy. That is, SimHyb outputs "SpecialAbort" if all the signatures verify but the adversary does not send the same transcript of the first round of protocol π to all the honest parties.

3. $Hyb_1$—Simulate MPC messages: In this hybrid, SimHyb does the following:

In the setup phase, compute the CRS as $crs_{sim} \leftarrow \pi.Sim.Setup(1^\lambda)$.

Case 1: Suppose an honest party plays the role of P*, do:
In round 3, compute the first round messages $msg_{1,j}$ of protocol π on behalf of every honest party $P_j \in \mathcal{S}$ and the first round message $msg_{1,*}$ on behalf of the party P* by running the algorithm $\pi.Sim_1(\cdot)$ as done in the ideal world.

Then, instead of P* computing the output by itself using the protocol messages, instruct the ideal functionality to deliver output to P*. That is, execute the "message to ideal functionality" step exactly as in the ideal world.

Case 2: Suppose a corrupt party plays the role of P*, do:
In round 2, compute the first round messages $msg_{1,j}$ of protocol π on behalf of every honest party $P_i \in \mathcal{S}$ by running the algorithm $\pi.Sim_1(\cdot)$ as done in the ideal world.

Interact with the ideal functionality exactly as done by Sim in the ideal world. That is, query the ideal functionality on the output of the extractor $\pi.Ext(\cdot)$ on input $(\tau_1, crs_{sim})$ and receive output $out_{\mathcal{A}}$.

Compute the set of second round messages $msg_{2,j}$ of protocol π on behalf of each honest party $P_j$ as $\pi.Sim_2(\tau_1, in\ p_{\mathcal{A}}, out_{\mathcal{A}}, P_j)$.

4. $Hyb_3$—Switch DPRF Output in Case 2: In this hybrid, suppose a corrupt party plays the role of P*, SimHyb computes the value of the variable flag as done by the simulator Sim in round 4 of the simulation strategy. That is, SimHyb sets flag=0 if the adversary did not send the same round 1 messages of protocol π to all the honest parties $P_j \in \mathcal{S}$. Then, on behalf of every honest party $P_j$, SimHyb does the following:

If flag=1, compute $ct_j$ as in $Hyb_1$.
If flag=0, compute $ct_j$=SKE.Enc(rand, $msg_{2,j}$) where rand is chosen uniformly at random and not as the output of the DPRF anymore.

5. $Hyb_4$—Switch Ciphertext in Case 2: In this hybrid, suppose a corrupt party plays the role of P*, SimHyb does the following: if flag=0, compute $ct_j$=SKE.Enc(rand, $0^{|msg_{2,j}|}$) as in the ideal world. This hybrid corresponds to the ideal world.

We will now show that every pair of successive hybrids is computationally indistinguishable.

Lemma 1 Assuming the strong unforgeability of the signature scheme, $Hyb_0$ is computationally indistinguishable from $Hyb_1$.

Proof. The only difference between the two hybrids is that in $Hyb_1$, SimHyb might output "SpecialAbort". We now show that SimHyb outputs "SpecialAbort" in $Hyb_1$ only with negligible probability.

Suppose not. That is, suppose there exists an adversary $\mathcal{A}$ that can cause SimHyb to output "SpecialAbort" in $Hyb_1$ with non-negligible probability, then we will use $\mathcal{A}$ to construct an adversary $\mathcal{A}_{Sign}$ that breaks the strong unforgeability of the signature scheme which is a contradiction.

$\mathcal{A}_\pi$ begins an execution of the DiFuz protocol interacting with the adversary $\mathcal{A}$ as in $Hyb_1$. For each honest party $P_j$, $\mathcal{A}_{Sign}$ interacts with a challenger $\mathcal{C}_{Sign}$ and gets a verification key $vk_j$ which is forwarded to $\mathcal{A}$ as part of the setup phase of DiFuz. Then, during the course of the protocol, $\mathcal{A}_{Sign}$ forwards signature queries from $\mathcal{A}$ to $\mathcal{C}_{Sign}$ and the responses from $\mathcal{C}_{Sign}$ to $\mathcal{A}$.

Finally, suppose $\mathcal{A}$ causes $\mathcal{A}_{Sign}$ to output "SpecialAbort" with non-negligible probability. Then, it must be the case that for some tuple of the form $(msg_{1,j}, \sigma_{1,j})$ corresponding to an honest party $P_j$, the signature $\sigma_{1,j}$ was not forwarded to $\mathcal{A}$ from $\mathcal{C}_{Sign}$ but still verified successfully. Thus, $\mathcal{A}_{Sign}$ can output the same tuple $(msg_{1,j}, \sigma_{1,j})$ as a forgery to break the strong unforgeability of the signature scheme with non-negligible probability which is a contradiction.

Lemma 2 Assuming the security of the MPC protocol π, $Hyb_1$ is computationally indistinguishable from $Hyb_1$.

Proof. Suppose there exists an adversary $\mathcal{A}$ that can distinguish between the two hybrids with non-negligible probability. We will use $\mathcal{A}$ to construct an adversary $\mathcal{A}_\pi$ that breaks the security of the protocol π which is a contradiction.

$\mathcal{A}_\pi$ begins an execution of the DiFuz protocol interacting with the adversary $\mathcal{A}$ and an execution of protocol π for evaluating circuit C (FIG. 6) interacting with a challenger $\mathcal{C}_\pi$. Now, suppose $\mathcal{A}$ corrupts a set of parties $\mathcal{P}$, $\mathcal{A}_\pi$ corrupts the same set of parties in the protocol π. First, the registration phase of protocol DiFuz takes place. Then, $\mathcal{A}_\pi$ receives a string crs from the challenger $\mathcal{C}_\pi$ which is either honestly generated or simulated. $\mathcal{A}_\pi$ sets this string to be the crs in the setup phase of the DiFuz protocol with $\mathcal{A}$. The rest of the setup protocol is run exactly as in $Hyb_0$.

Case 1: Honest Party as P*

Now, since we consider a rushing adversary for protocol π, on behalf of every honest party $P_j$, $\mathcal{A}_\pi$ first receives a message $msg_j$ from the challenger $\mathcal{C}_\pi$. $\mathcal{A}_\pi$ sets $msg_j$ to be the message $msg_{1,j}$ in round 3 of its interaction with $\mathcal{A}$ and then computes the rest of its messages to be sent to $\mathcal{A}$ exactly as in $Hyb_1$. $\mathcal{A}_\pi$ receives a set of messages corresponding to protocol π from $\mathcal{A}$ on behalf of the corrupt parties in $\mathcal{P}$ which it forwards to $\mathcal{C}_\pi$ as its own messages for protocol π.

Case 2: Corrupt Party as P*

As in the previous case, on behalf of every honest party $P_j$, $\mathcal{A}_\pi$ first receives a message $msg_j$ from the challenger $\mathcal{C}_\pi$. $\mathcal{A}_\pi$ sets $msg_j$ to be the message $msg_{1,j}$ in round 2 of its interaction with $\mathcal{A}$. Then, in round 4, if the signatures verify, $\mathcal{A}_\pi$ forwards the set of messages corresponding to protocol π received from $\mathcal{A}$ on behalf of the corrupt parties in $\mathcal{P}$ to $\mathcal{C}_\pi$ as its own messages for protocol π. Then, on behalf of every honest party $P_j$, $\mathcal{A}_\pi$ receives a message $msg_j$ from the challenger $\mathcal{C}_\pi$ as the second round message of protocol π. $\mathcal{A}_\pi$ sets $msg_j$ to be the message $msg_{2,j}$ in round 4 of its interaction with $\mathcal{A}$ and computes the rest of its messages to be sent to $\mathcal{A}$ exactly as in $Hyb_1$.

Notice that when the challenger $\mathcal{C}_\pi$ sends honestly generated messages, the experiment between $\mathcal{A}_\pi$ and $\mathcal{A}$ corresponds exactly to $Hyb_1$ and when the challenger $\mathcal{C}_\pi$ sends simulated messages, the experiment corresponds exactly to $Hyb_2$. Thus, if $\mathcal{A}$ can distinguish between the two hybrids with non-negligible probability, $\mathcal{A}_\pi$ can use the same guess to break the security of the scheme $\pi$ with non-negligible probability which is a contradiction.

Lemma 3 Assuming the security of the pseudorandom function, $Hyb_2$ is computationally indistinguishable from $Hyb_3$.

Proof. Suppose there exists an adversary $\mathcal{A}$ that can distinguish between the two hybrids with non-negligible probability. We will use $\mathcal{A}$ to construct an adversary $\mathcal{A}_{PRF}$ that breaks the security of the pseudorandom function which is a contradiction.

The adversary $\mathcal{A}_{PRF}$ interacts with the adversary $\mathcal{A}$ in an execution of the protocol DiFuz. For each honest party $P_j$, $\mathcal{A}_{PRF}$ also interacts with a challenger $\mathcal{C}_{PRF}$ in the PRF security game. For each j, $\mathcal{C}_{PRF}$ sends the PRF keys corresponding to the set of corrupt parties (<k) as requested by $\mathcal{A}_{PRF}$ which is then forwarded to $\mathcal{A}$ during the setup phase. Then, $\mathcal{A}_{PRF}$ continues interacting with $\mathcal{A}$ up to round 3 as in $Hyb_1$. Now, in round 4, suppose it computes the value of the variable flag to be 0 (as computed in $Hyb_3$), then $\mathcal{A}_{PRF}$ does the following: for each honest party $P_j$, forward the message $msg_{1,*}$ received in round 3. Then, set the XOR of the set of responses from $\mathcal{C}_{PRF}$ to be the value $ek_j$ used for generating the ciphertext $ct_j$.

Now notice that when the challenger $\mathcal{C}_{PRF}$ responds with a set of honest PRF evaluations for each honest party j, the interaction between $\mathcal{A}_{PRF}$ and $\mathcal{A}$ exactly corresponds to $Hyb_2$ and when the challenger responds with a set of uniformly random strings, the interaction between $\mathcal{A}_{PRF}$ and $\mathcal{A}$ exactly corresponds to $Hyb_3$. Thus, if $\mathcal{A}$ can distinguish between the two hybrids with non-negligible probability, $\mathcal{A}_{DPRF}$ can use the same guess to break the pseudorandomness property of the PRF scheme with non-negligible probability which is a contradiction.

Lemma 4 Assuming the semantic security of the secret key encryption scheme, $Hyb_3$ is computationally indistinguishable from $Hyb_4$.

Proof. Suppose there exists an adversary $\mathcal{A}$ that can distinguish between the two hybrids with non-negligible probability. We will use $\mathcal{A}$ to construct an adversary $\mathcal{A}_{SKE}$ that breaks the semantic security of the encryption scheme which is a contradiction.

The adversary $\mathcal{A}_{SKE}$ interacts with the adversary $\mathcal{A}$ as in $Hyb_3$. Then, on behalf of every honest party $P_j$, before sending its round 4 message, $\mathcal{A}_{SKE}$ first sends the tuple $(msg_{2,j}, 0^{|msg_{2,j}|})$ to the challenger $\mathcal{C}_{SKE}$ of the secret key encryption scheme. Corresponding to every honest party, it receives a ciphertext which is either an encryption of $msg_{2,j}$ or $0^{|msg_{2,j}|}$ using a secret key chosen uniformly at random. Then, $\mathcal{A}_{SKE}$ sets this ciphertext to be the value $ct_j$ and continues interacting with the adversary $\mathcal{A}$ exactly as in $Hyb_2$. Notice that when the challenger $\mathcal{C}_{SKE}$ sends ciphertexts of $msg_{2,j}$, the experiment between $\mathcal{A}_{SKE}$ and $\mathcal{A}$ corresponds exactly to $Hyb_3$ and when the challenger $\mathcal{C}_{SKE}$ sends ciphertexts of $0^{|msg_{2,j}|}$, the experiment corresponds exactly to $Hyb_4$. Thus, if $\mathcal{A}$ can distinguish between the two hybrids with non-negligible probability, $\mathcal{A}_{SKE}$ can use the same guess to break the semantic security of the encryption scheme with non-negligible probability which is a contradiction.

VI. Any Distance Measure Using Threshold FHE

In this section, we show how to construct a fuzzy threshold token generation protocol for any distance measure using any FHE scheme with threshold decryption. Our token generation protocol satisfies the definition in Section III for any n, t and works for any distance measure. Formally, we show the following theorem:

Theorem 3. Assuming the existence of the following: FHE with threshold decryption, threshold signatures, secret key encryption, and strongly unforgeable digital signatures, there exists a four round secure fuzzy threshold token generation protocol for any n, t and any distance measure.

A. Construction

We first list some notation and the primitives used before describing our construction.

Let Dist denote the distance function that takes as input a template w and a measurement u, and let d denote the threshold distance value to denote a match between w and u. Let C be a circuit that takes as input a template w, a measurement u and some string K, and outputs K if Dist(w, u)<d; otherwise it outputs 0. Let the n parties be denoted by $P_1, \ldots, P_n$ respectively. Let $\lambda$ denote the security parameter. Let W denote the distribution from which a random template vector is sampled. Let's assume the vectors are of length $\ell$ where $\ell$ is a polynomial in $\lambda$.

Let TFHE=(TFHE.Gen, TFHE.Enc, TFHE.PartialDec, TFHE.Eval, TFHE.Combine) be a threshold FHE scheme. Let TS=(TS.Gen, TS.Sign, TS.Combine, TS.Verify) be a threshold signature scheme. Let SKE=(SKE, Gen, SKE.Enc, SKE.Dec) denote a secret key encryption scheme.

Let (Gen, Sign, Verify) be a strongly-unforgeable digital signature scheme. Let H be a collision-resistant hash function (e.g., modeled as a random oracle).

We now describe the construction of our four round secure fuzzy threshold token generation protocol $\pi^{Any-TFHE}$ or any n and k.

1. Registration

In the registration phase, the following algorithm can executed by a trusted authority:

Sample a random w from the distribution $\mathcal{W}$.
Compute $(pk, sk_1, \ldots, sk_N) \leftarrow$ TFHE.Gen($1^\lambda$, n, t)
Compute $(p^{TS}, vk^{TS}, sk_1^{TS}, sk_n^{TS}) \leftarrow$ TS.Gen($1^\lambda$, n, t).
Compute $K \leftarrow$ SKE, Gen($1^\lambda$)
Compute the ciphertexts $ct_0 \leftarrow$ TFHE.$Enc(pk,w), ct_0 \leftarrow$ TFHE.$Enc(pk,K)$ For each i∈[n], do the following:
(a) Compute $sk'_i, vk'_i \leftarrow$ Gen($1^\lambda$)
(b) Compute $K_i = H(K, i)$.
(c) Give the following to party $P_i$ $(pk, sk_i, ct_0, ct_1, (vk'_1, \ldots, vk'_n) sk'_i, pp^{TS}, vk^{TS} sk_i^{TS}, K_i)$ A trusted authority (e.g., primary user device) can sample a biometric template w from a distribution of a biometric measurement $\mathcal{W}$. The trusted authority can also compute a public key pk and a plurality of private key shares $sk_i$ for a threshold fully homomorphic encryption scheme TFHE, in addition to public parameters $pp^{TS}$, a verification key $vk^{TS}$, and a plurality of private key shares $sk_i^{TS}$ for a threshold signature scheme TS and a string K for a secret key encryption scheme SKE. Using the public key pk, the trusted authority can encrypt the biometric template w to form ciphertext $ct_0$ and encrypt the string K to form ciphertext $ct_1$.

Then, the trusted authority can compute a plurality of values for each electronic device i of n electronic devices (e.g., a first electronic device and other electronic devices). The trusted authority can compute a secret key share $sk'_i$ and a verification key share $vk'_i$ for a digital signature scheme. The trusted authority can also compute a hash $K_i$ using the string K and a hash function H. The trusted authority can then send to each electronic device $P_i$ the public key pk, the ciphertexts $ct_0$ and $ct_1$, verification key shares ($vk'_i$, ..., $vk'_i$), secret key share $sk'_i$, public parameters $pp^{TS}$, verification key $vk^{TS}$, private key share $sk_i^{TS}$, and hash K.

2. SignOn Phase

In the SignOn phase, let's consider party P* that uses input vector u, a message m on which it wants a token. P* interacts with the other parties in the below four round protocol. The arrowhead in Round 1 can denote that in this round messages are outgoing from party P*

Round 1: (P*→) Party P* does the following:
a) Compute the ciphertext ct*=TFHE.Enc(pk, u).
b) Pick a set S consisting of t parties amongst $P_1, \ldots, P_n$. For simplicity, without loss of generality, we assume that P* is also part of set S.
c) To each party $P_1 \in S$, send (ct*,m).

Round 2: (→P*) Each Party $P_i \in S$ (except P*) does the following:
a) Compute the signature $\sigma'_i$=Sign($sk'_i$, ct*).
b) Send $\sigma'_i$ to the party P*.

Round 3: (P*→) Party P* sends ($\sigma'_1, \ldots, \sigma'_n$) to each party $P_i$.

Round 4: (→P*) Each Party $P_i \in S$ (except P*) does the following:
a) If there exists i∈[n] such that Verify($vk'_i$, ct*, $\sigma'_i$)≠1, then output ⊥.
b) Otherwise, evaluate the ciphertext $ct$=TFHE.Eval($pk, C, ct_0, ct^*, ct_1$), and compute a partial decryption of ct as:

$\mu_i$=TFHE.PartialDec($sk_i, ct$).

c) Compute $TOKEN_i$=TS.Sign($sk_i$, m) and $\tilde{ct}_i \leftarrow$ SKE.Enc($K_i$, $TOKEN_i$).
d) Send ($\mu_i$, $\tilde{ct}_i$) to the party P*.

Output Computation: Party P* does the following to generate a token:
a) Recover K=TFHE.Combine($\mu_1, \ldots, \mu_n$)
b) For each i∈[n], do the following:
   i. Compute $K_i$=H(K, i).
   ii. Recover $Token_i$=SKE.Dec($K_i$, $\tilde{ct}_i$).
c) Compute Token←TS.Combine($\{Token_i\}_{i \in S}$).
d) Output Token if TS.Verify($vk^{TS}$, m, Token)=1. Else, output ⊥.

A first electronic device, P* can encrypt the input vector u (e.g., the biometric measurement vector) with the public key pk of the threshold fully homomorphic encryption scheme to generate an encrypted biometric measurement ciphertext ct*. The first electronic device can send the encrypted biometric measurement ct* and the message m to each of the other electronic devices. Each of the other electronic devices can compute a partial signature computation $\sigma'_i$ with the ciphertext ct* and the secret key share $sk'_i$. Each electronic can send the partial signature computation $\sigma'_i$ to the first electronic device. The first electronic device can send all of the partial signature computations ($\sigma'_1, \ldots, \sigma'_n$) to all of the other electronic devices.

Each of the other electronic devices can verify each of the partial signature computations ($\sigma'_1, \ldots, \sigma'_n$) with the ciphertext ct* and the received verification keys ($vk'_1, \ldots, vk'_n$). If any of the partial signature computations are not verified (e.g., Verify($vk'_i$, ct*, $\sigma'_i$)≠1), the electronic device can output ⊥, indicating an error. An unverified signature can indicate that one (or more) of the electronic devices did not compute the partial signature computation correctly, and thus may be compromised or fraudulent. After verifying the partial signature computations, each of the other electronic devices can evaluate the ciphertexts ct*, $ct_0$ and $ct_1$ to generate a new ciphertext ct. Evaluating the ciphertexts may include evaluating a circuit C that computes a distance measure between the template w (in ciphertext $ct_0$) and the measurement u (in ciphertext ct*). If the distance measure is less than a threshold d, the circuit C can output the string K (in ciphertext $ct_1$). Each of the other electronic devices can then compute a partial decryption $\mu_i$ of the ciphertext ct. A partial threshold signature token $Token_i$ can be generated by each of the other electronic devices using the secret key share $sk_i$ and the message m. A ciphertext $\tilde{ct}_i$ can be computed as a secret key encryption with the partial threshold signature token $Token_i$ and the hash $K_i$. The partial decryption $\mu_i$ and the ciphertext $\tilde{ct}_i$ can then be send to the first electronic device.

The first electronic device can homomorphically combine the partial decryptions ($\mu_1, \ldots, \mu_n$) to recover the string K. Then the first electronic device can compute hash $K_i$ for each electronic device i using the string K and a hash function H, then use the hash $K_i$ to decrypt the secret key encryption ciphertext $\tilde{ct}_i$ to recover the partial threshold signature token $Token_i$. With each received partial threshold signature token $Token_i$, the first electronic device can combine them to compute a signature token Token. If the first electronic device can verify the token Token and the message m, the first electronic device can output the token Token; otherwise, the first electronic device can output ⊥.

3. Token Verification

Given a verification key $vk^{TS}$, message m and token Token, the token verification algorithm outputs 1 if TS.Verify($vk^{TS}$, m, Token) outputs 1.

Correctness: The correctness of the protocol directly follows from the correctness of the underlying primitives.

B. Security Proof

In this section, we formally prove Theorem 3.

Consider an adversary A, who corrupts t*, parties where t*<t. The strategy of the simulator Sim, for our protocol $\pi^{Any-TFHE}$ against an adversary A, is sketched below.

1. Description of Simulator

Registration Phase: On receiving the first query of the form ("Register", sid) from a party $P_i$, the simulator Sim receives the message ("Register", sid, $P_i$) from the ideal functionality $F_{DiFuz}$, which it forwards to the adversary A.

SignOn Phase: Case 1—Honest Party as P*: Suppose that in some session with id sid, an honest party P* that uses an input vector u and a message m for which it wants a token by interacting with a set S consisting of t parties, some of which could be corrupt. Sim gets the tuple (m, S) from the ideal functionality $F_{DiFuz}$ and interacts with the adversary $\mathcal{A}$.

In the first round of the sign-on phase, ~sends encryptions of 0 under the threshold FHE scheme to each malicious party in the set S Note that this is indistinguishable from the real world by the CPA security of the threshold FHE scheme. In the subsequent rounds, it receives messages from the adversary A on behalf of the corrupt parties on S and also sends messages to the corrupt parties in the set S.

Sim also issues a query of the form ("SignOn", sid, msg, $P_i, T \subseteq [n]$) to the ideal functionality $F_{FTTG}$, and proceeds as follows:

If the ideal functionality $F_{FTTG}$, responds with ("Sign", sid, msg, $P_i$,), then Sim chooses a signature a and responds to $F_{FTTG}$, with ("Signature", msg, sid, $P_i, \sigma$), and sends ($\sigma$, msg,), to the adversary A.

On the other hand, if the ideal functionality $F_{FTTG}$, responds with ("SignOn failed", msg), then the simulator Sim aborts.

SignOn Phase: Case 2—Malicious Party as P*: Suppose that in some session with id sid, a malicious party P* that uses an input vector u and a message m for which it wants a token by interacting with a set S consisting of t parties, some of which could be corrupt. Sim again gets the tuple (m, S) from the ideal functionality $F_{DiFuz}$, and interacts with the adversary $\mathcal{A}$.

The simulator Sim receives the measurement u from the adversary A on behalf of the corrupt party P*, and issues a query of the form ("Test Password", sid, u, $P_i$,) to the ideal functionality $F_{FTTG}$. It forwards the corresponding response from $F_{FTTG}$, to the adversary $\mathcal{A}$.

In the first round of the sign-on phase, ~ receives ciphertexts under the threshold FHE scheme from the adversary A. on behalf of each honest party in the set S. In the subsequent rounds, it sends messages to the adversary A. on behalf of the honest parties in S and also receives messages from the adversary A on behalf of the hones parties in S.

Sim also issues a query of the form ("SignOn", sid, msg, $P_i, T \subseteq [n]$) to the ideal functionality $F_{FTTG}$ and proceeds as follows:

If the ideal functionality $F_{FTTG}$, responds with ("Sign", sid, msg, $P_i$,) then SIM chooses a signature a, responds to $F_{FTTG}$, with ("Signature", msg, sid, $P_i, \sigma$) and sends ($\sigma$, msg). to the adversary A.

On the other hand, if the ideal functionality $F_{FTTG}$, responds with ("SignOn failed", msg), then the simulator SIM.aborts.

VII. Cosine Similarity and Euclidean Distance

In this section, we show how to construct an efficient four round secure fuzzy threshold token generation protocol in the Random Oracle model for the Euclidean Distance and Cosine Similarity distance measure. Our token generation protocol satisfies Definition 7 for any n with threshold t=3 and is secure against a malicious adversary that can corrupt any one party. We first focus on the Cosine Similarity distance measure. At the end of the section, we explain how to extend our result for Euclidean Distance as well.

Formally we show the following theorem:

Theorem 3 Assuming the existence of threshold signatures, threshold secret sharing, two message oblivious transfer in the CRS model that is secure against malicious adversaries, garbled circuits, a threshold secret sharing scheme, circuit-private additively homomorphic encryption, secret key encryption, and non-interactive zero knowledge arguments for NP languages $L_1, L_2$ defined in Section IV.E, there exists a four round secure fuzzy threshold token generation protocol satisfying Definition 7 with respect to the Cosine Similarity distance function. The protocol works for any n, for threshold t=3, and is secure against a malicious adversary that can corrupt any one party.

We know how to build two message OT in the CRS model assuming DDH/LWE/Quadratic Residuosity/$N^{th}$ Residuosity assumption [21, 22, 23, 24]. The Paillier encryption scheme [14] is an example of a Circuit-private additively homomorphic encryption from the $N^{th}$ Residuosity assumption. As shown in Section IV.E, we can also build NIZK arguments for languages $L_1, L_2$ from the $N^{th}$ Residuosity assumption in the Random Oracle model. The other primitives can either be built without any assumption or just make use of the existence of one way functions. Thus, instantiating the primitives used in the above theorem, we get the following corollary:

Corollary 4 Assuming the hardness of the $N^{th}$ Residuosity assumption, there exists a four round secure fuzzy threshold token generation protocol in the Random Oracle model satisfying Definition 7 with respect to the Cosine Similarity distance function. The protocol works for any n, for threshold t=3, and is secure against a malicious adversary that can corrupt any one party.

A. Construction

We first list some notation and the primitives used before describing our construction.

Let d denote the threshold value for the Cosine Similarity function. Let (Share, Recon) be a (2, n) threshold secret sharing scheme. Let the n parties be denoted by $P_1, \ldots, P_n$ respectively. Let $\lambda$ denote the security parameter. Let $\mathcal{W}$ denote the distribution from which the random vector is sampled. Let's assume the vectors are of length $\ell$ where $\ell$ is a polynomial in $\lambda$. Each element of this vector is an element of a field F over some large prime modulus q.

Let TS=(TS.Gen, TS.Sign, TS.Combine, TS.Verify) be a threshold signature scheme. Let (SKE.Enc, SKE.Dec) denote a secret key encryption scheme. Let (Garble, Eval) denote a garbling scheme for circuits. Let Sim. Garble denote the simulator for this scheme. Let OT=(OT.Setup, OT.Round$_1$, OT.Round$_2$, OT.Output) be a two message oblivious transfer protocol in the CRS model. Let OT.Sim denote the simulator. Let OT.Sim. Setup denote the algorithm used by the simulator to generate a simulated CRS and OT.Sim. Round$_2$ denote the algorithm used to generate the second round message against a malicious receiver.

Let AHE=(AHE.Setup, AHE.Enc, AHE.Add, AHE.ConstMul, AHE.Dec) be the algorithms of a circuit-private additively homomorphic encryption scheme. Let (NIZK.Prove, NIZK.Verify) denote a non-interactive zero knowledge argument of knowledge system in the RO model. Let RO denote the random oracle. Let NIZK.Sim denote the simulator of this argument system and let NIZK.Ext denote the extractor. Let PRF denote a pseudorandom function that takes inputs of length $\ell$.

We now describe the construction of our four round secure fuzzy threshold token generation protocol $\pi^{CS}$ for Cosine Similarity.

1. Registration

In the registration phase, the following algorithm is executed by a trusted authority. The trusted authority may be a device that will participate in subsequent biometric matching and signature generation. If the trusted authority will potentially participate in biometric matching and signature generation, it can delete the information that it should not have at the end of the registration phase. That is, it should delete the shares corresponding to the other devices.

Sample a random vector $\vec{w}$ from the distribution $\mathcal{W}$. For simplicity, let's assume that the L2-norm of $\vec{w}$ is 1.

Compute $(pp_{TS}, vk^{TS}, sk_1^{TS}, \ldots, sk_n^{TS}) \leftarrow \text{TS.Gen}(1^\lambda, n, k)$.

For each $i \in [n]$, P. to party give $(pp_{TS}, vk^{TS}, sk_i^{TS})$ to party $P_i$.

For each $i \in [n]$, do the following:
Compute $(\vec{w}_i, \vec{v}_i) \leftarrow \text{Share}(1^\lambda, \vec{w}, n, 2)$.
Compute $(sk_i, pk_i) \leftarrow \text{AHE.Setup}(1^\lambda)$.

Let $\vec{w}_i = (w_{i,1}, \ldots, w_{i,\ell})$. For all $j \in [\ell]$, compute $ct_{i,j} = \text{AHE.Enc}(pk_i, w_{i,j}; r_{i,j})$.

Give $(\vec{w}_i, sk_i, pk_i, \{ct_{i,j}, r_{w_{ij}}\}_{j \in [\ell]})$ to party $P_i$ and $(\vec{v}_i, pk_i, \{ct_{i,j}\}_{j \in [\ell]})$ to all the other parties.

The trusted device samples a biometric template $\vec{w}$ from a distribution $\mathcal{W}$. $\mathcal{W}$ can be the raw biometric data that is collected by a biometric sensor. For simplicity, assume that $\vec{w}$ is normalized. The trusted device then generates a public key, shares of a secret key and any other needed public parameters for a threshold signature scheme, following any suitable key sharing algorithm. Examples of key sharing algorithms include Shamir's secret sharing.

The $i^{th}$ device, of the n total devices, receives the public parameters, $pp^{TA}$, the public key, $vk^{TA}$, and the $i^{th}$ share of the secret key, $sk_i^{TA}$ for a secret key encryption scheme. Then, the trusted device can compute $(\vec{w}_i, \vec{v}_i)$, where $\vec{w}_i$ is the $i^{th}$ share of the biometric template. The trusted device can also calculate shares of the public key and secret key for an additively homomorphic encryption scheme, $(sk_i, pk_i)$. Then the trusted device can encrypt each of the l components of $\vec{w}_i$ as $ct_{i,j}$. The $i^{th}$ device receives its shares of the template, secret key, private key, and encrypted values, as well as the random factor used in the encryption. All of the other devices receive the complement of the template share, the public key share, and the encrypted template, without the random factor. Thus by the end of the registration phase, each device has the full public key and the full encrypted template.

2. Setup

Set up can also be done by a trusted authority. The trusted authority may be the same trusted device that completed the registration. If the trusted authority will potentially participate in biometric matching and signature generation, it can delete the information that it should not have at the end of the registration phase. That is, it should delete the shares corresponding to the other devices.

For each $i \in [n]$, the setup algorithm does the following:
Generate $crs_i \leftarrow \text{OT.Setup}(1^\lambda)$.
Generate random keys $(k_{i,a}, k_{i,b}, k_{i,c}, k_{i,d}, k_{i,p}, k_{i,q}, k_{i,z}, k_{i,C}, k_{i,enc}, k_{i,ot})$ for the PRF.
Give $(crs_i)$ to party $P_i$.
Give $(crs_i, k_{i,a}, k_{i,b}, k_{i,c}, k_{i,d}, k_{i,p}, k_{i,q}, k_{i,z}, k_{i,C}, k_{i,enc}, k_{i,ot})$ to all other parties.

In the setup phase, the primary device can generate and distribute a number of constants that can be used later for partial computations. The trusted device can generate a common reference string for oblivious transfer set up, and a plurality of random keys for a pseudorandom function. The $i^{th}$ device receives the $i^{th}$ crs, and all other parties receive the $i^{th}$ crs and the $i^{th}$ set of random keys.

3. SignOn

In the SignOn phase, let's consider party $P_i$ that uses an input vector $\vec{u}$ and a message m on which it wants a token. $P_i$ picks two other parties $P_j$ and $P_k$ and interacts with them in the below four round protocol. In the SignOn phase, a biometric measurement is matches to a template and a signature is generated for an authentication challenge. A primary device, $P_i$, selects two other devices of the n total devices, $P_j$ and $P_k$ to participate. The sign on phase happens with four rounds of communication. The primary device has a measured biometric $\vec{u}$ and a message m on which it wants a token. The arrowhead on Round 1 can denote that in this round messages are outgoing from party $P_i$.

Round 1: $(P_i \rightarrow)$ Party $P_i$ does the following:

i. Let $\vec{u} = (u_1, \ldots, u_\ell)$.
ii. Let $\mathcal{S} = (P_j, P_k)$ with $j < k$.
iii. For each $j \in [\ell]$, compute the following:
  $ct_{1,j} = \text{AHE.Enc}(pk_i, u_j; r_{1,j})$.
  $\pi_{1,j} \leftarrow \text{NIZK.Prove}(st_{1,j}, wit_{1,j})$ for the statement $st_{1,j} = (ct_{1,j}, pk_i) \in L_1$ using witness $wit_{1,j} = (u_j, r_{1,j})$.
  $ct_{2,j} = \text{AHE.ConstMul}(pk_i, ct_{1,j}, u_j; r_{2,j})$.
  $\pi_{2,j} \leftarrow \text{NIZK.Prove}(st_{2,j}, wit_{2,j})$ for the statement $st_{2,j} = (ct_{1,j}, ct_{1,j}, ct_{2,j}, pk_i) \in L_2$ using witness $wit_{2,j} = (u_j, r_{1,j}, u_j, r_{1,j}, r_{2,j})$.
  $ct_{3,j} = \text{AHE.ConstMul}(pk_i, ct_{1,j}, r_{3,j})$.
  $\pi_{3,j} \leftarrow \text{NIZK.Prove}(st_{3,j}, wit_{3,j})$ for the statement $st_{3,j} = ct_{1,j}, ct_{i,j}, ct_{3,j}, pk_i) \in L_2$ using witness $wit_{3,j} = (u_j, r_{1,j}, w_{i,j}, r_{w_{ij}}; r_{3,j})$.

iv. To both parties in $\mathcal{S}$, send $msg_1 = (\mathcal{S}, m, \{ct_{1,j}, ct_{2,j}, ct_{3,j}, \pi_{i,j}, \pi_{2,j}, \pi_{3,j}\}_{j \in [\ell]})$.

Round 1: For each component of the measurement vector, $P_i$ makes a series of computations and non-interactive zero knowledge proofs on those computations. First it encrypts the component and generates a proof that the encryption is valid. Then it homomorphically computes the product of the component with itself as part of the proof that $\vec{u}$ is normalized. Finally, it computes the product of $\vec{u}$ with $\vec{w}_i$ for the component, and generates a proof that the multiplication is valid. Then $P_i$ sends the message, the computed values, and the proofs to the other two devices.

Round 2: $(\rightarrow P_i)$ Both parties $P_j$ and $P_k$ do the following:
i. Abort if any of the proofs $\{\pi_{1,j}, \pi_{2,j}, \pi_{3,j}\}_{j \in [\ell]}$ don't verify.
ii. Generate the following randomness:
  $a = \text{PRF}(k_{i,a}, msg_1)$, $b = \text{PRF}(k_{i,b}, msg_1)$.
  $c = \text{PRF}(k_{i,c}, msg_1)$, $d = \text{PRF}(k_{i,d}, msg_1)$.
  $p = \text{PRF}(k_{i,p}, msg_1)$, $q = \text{PRF}(k_{i,q}, msg_1)$.
  $r_z = \text{PRF}(k_{i,z}, msg_1)$.

iii. Using the algorithms of AHE and using randomness $PRF(k_{i,enc}, msg_1)$, compute $ct_{x,1}$, $ct_{x,2}$, $ct_{y,1}$, $ct_{y,2}$, $ct_{z,1}$, $ct_{z,2}$ as encryptions of the following:

$x_1 = \langle \vec{u}, \vec{w}_i \rangle$, $x_2 = (a \cdot x_1 + b)$ $y_1 = \langle \vec{u}, \vec{u} \rangle$, $y_2 = (c \cdot y_1 + d)$ $z_1 = \langle \vec{u}, \vec{v}_i \rangle + r_z$, $z_2 = (p \cdot z_1 + q)$ iv. Send $(ct_{x,2}, ct_{y,2}, ct_{z,1}, ct_{z,2})$ to $P_i$.

Round 2: Both parties $P_j$ and $P_k$ verify the proofs. If any proofs aren't valid, they can abort the protocol. This ensures that $P_i$ is trustworthy and did not send an invalid value for $\vec{u}$ to attempt to force a match. Then each device uses the random keys provided in the Setup phase to generate pseudorandom values a, b, c, d, p, q, and $r_z$. Because they received the same random keys associated with a message from $P_i$, they will generate the same random values.

They can then use the additively homomorphic encryption algorithms to compute some values, and one-time message authentication codes (MACs) for those values. The values are: the inner product of the measurement with $P_i$'s share of the template ($x_1$), the inner product of the measurement with itself ($y_1$), and the inner product of the measurement with the complement $\vec{v}_i$ plus the random value $r_z$($z_1$). The associated MACs are $x_2$, $y_2$, and $z_2$. The inner product with $P_i$'s share of the template can be done because that was sent as a ciphertext component wise, and then reconstructed as inner products on the full vector because of the homomorphic addition. The one-time MACs provide another check on $P_i$. Even if $P_i$ attempts to change the computed values to force a match, the MAC's will no longer correspond to the computed values. Then each party sends everything except for $x_1$ and $y_1$ to $P_i$.

Round 3: ($P_i \rightarrow$) To each party in $\mathcal{S}$, party $P_i$ does the following:

i. Abort if the tuples sent by both $P_j$ and $P_k$ in round 2 were not the same.

ii. Compute $x_1 = \langle \vec{u}, \vec{w}_i \rangle$, $x_2 = \text{AHE.Dec}(sk_i, ct_{x,2})$.

iii. Compute $y_1 = \langle \vec{u}, \vec{u} \rangle$, $y_2 = \text{AHE.Dec}(sk_i, ct_{y,2})$.

iv. Compute $z_1 = \text{AHE.Dec}(sk_i, ct_{z,1})$, $z_2 = \text{AHE.Dec}(sk_i, ct_{z,2})$.

v. Generate and send $msg_3 = \{ot_{s,t}^{Rec} = \text{OT.Round}_1(crs_i, s_t; r_{s,t}^{ot})\}_{s \in \{x,y,z\}, t \in \{1,2\}}$ where $r_{s,t}^{ot}$ is picked uniformly at random.

Round 3: $P_i$ can compare the tuples sent by the other two parties. If they do not match, $P_i$ can abort the protocol. This check is to ensure that $P_j$ and $P_k$ are trustworthy. Because they began with the same random keys, all of their calculations should be the same. We assume that the two devices did not collude to send invalid values because the devices are presumed to only communicate with the primary device. Then $P_i$ computes $x_1$ and $y_1$ for itself, and decrypts the messages containing $z_1$, $x_2$, $y_2$, and $z_2$. Then $P_i$ sends an oblivious transfer message to each of the other two devices to pass garbled inputs for the garbled circuit used in Round 4.

Round 4: ($P_j \rightarrow P_i$) Party $P_j$ does the following:
i. Compute $r_C = PRF(k_{i,C}, msg_1)$.
ii. Compute $\tilde{C} = \text{Garble}(C; r_C)$ for the circuit C described in FIG. 7.
iii. Let $\{r_{s,t}^{ot}\}_{s \in \{x,y,z\}, t \in \{0,1\}} = PRF(k_{i,ot}, msg_3)$.

iv. For each $s \in \{x, y, z\}$ and each $t \in \{0,1\}$ let $lab_{s,t}^0$, $lab_{s,t}^1$ denote the labels of the garbled circuit $\tilde{C}$ corresponding to input wires $s_t$. Generate $ot_{s,t}^{Sen} = \text{OT.Round}_2(crs_i, lab_{s,t}^0, lab_{s,t}^1, ot_{s,t}^{Rec}; r_{s,t}^{ot})$.

v. Let $ot^{Sen} = \{ot_{s,t}^{Sen}\}_{s \in \{x,y,z\}, t \in \{1,2\}}$ vi. Pick a random string $Pad = PRF(k_{i,C}, msg_3)$.

vii. Set $OneCT_j = \text{SKE.Enc}(Pad, \text{TS.Sign}(sk_j^{TS}, m))$.

viii. Send ($\tilde{C}$, $ot^{Sen}$, $OneCT_j$) to $P_i$.

Round 4: ($P_k \rightarrow P_i$) Party $P_k$ does the following:
i. Compute $\tilde{C}$, $ot^{Sen}$, Pad exactly as done by $P_j$.
ii. Set $OneCT_k = \text{SKE.Enc}(Pad, \text{TS.Sign}(sk_k^{TS}, m))$.
iii. Send ($RO(\tilde{C}, ot^{Sen})$, $OneCT_k$) to $P_i$.

Round 4: Both $P_j$ and $P_k$ can generate a garbled circuit, as shown in FIG. 7, and prepare to send it. Each device also generates an appropriate string Pad. The two devices should create the same garbled circuit and a string Pad because they have the same input parameters due to the shared randomness established in the Setup phase. The circuit checks then that each value/MAC pair agrees, and aborts if there are any that do not match. It then computes the inner product. If the inner product is greater than the predetermined threshold, then the circuit outputs a string Pad. If the inner product is not greater than the threshold, then the circuit outputs a failure marker. The random constants used to check the MAC are hardwired into the circuit, so $P_i$ cannot learn those values and forge a result.

Then $P_j$ computes a partial signature for the secret key encryption scheme, using the string Pad and the secret key share from the registration phase. $P_k$ does the same with its own key share. Then $P_j$ sends to $P_i$ sends the garbled circuit and its partial computation. $P_k$ sends their partial computation and a random oracle hash of the circuit.

Output Computation: Parties $P_j$, $P_k$ output (m, $P_i$, $\mathcal{S}$). Additionally, party $P_i$ does the following to generate a token:
i. Let (C, $ot^{Sen}$, $OneCT_j$) be the message received from $P_j$ and ($msg_4$, $OneCT_k$) be the message received from $P_k$.
ii. Abort if $RO(\tilde{C}, ot^{Sen}) \neq msg_4$.
iii. For each $s \in \{x, y, z\}$ and each $t \in \{0,1\}$ compute $lab_{s,t} = \text{OT.Output}(ot_{s,t}^{Sen}, ot_{s,t}^{Rec}, r_{s,t}^{ot})$.
iv. Let $lab = \{lab_{s,t}\}_{s \in \{x,y,z\}, t \in \{0,1\}}$.
v. Compute $Pad = \text{Eval}(\tilde{C}, lab)$.
vi. Compute $Token_j = \text{SKE.Dec}(Pad, OneCT_j)$, $Token_k = \text{SKE.Dec}(Pad, OneCT_k)$, $Token_i = \text{TS.Sign}(sk_i^{TS}, m)$.
vii. Compute $Token \leftarrow \text{TS.Combine}(\{Token_s\}_{s \in \{i,j,k\}})$.
viii. Output Token if $\text{TS.Verify}(vk^{TS}, m, Token)$. Else, output $\perp$.

Output Computation: $P_i$ can now generate a token. It can check if the hash of the circuit sent by $P_i$ the matches the hash sent by $P_k$, and if not, abort the computation. This ensures that the two other parties are behaving correctly. $P_i$ can then compute the appropriate labels for the garbled circuit and evaluate the circuit to determine a string Pad (if there is a match). Using the string Pad, $P_i$ can decrypt the partial computations sent by the other two parties and do its own partial computation of the signature. Finally, $P_i$ can combine the partial computations and create a complete token.

4. Token Verification

Given a verification key $vk^{TS}$, message m and token Token, the token verification algorithm outputs 1 if $\text{TS.Verify}(vk^{TS}, m, Token)$ outputs 1.

The correctness of the protocol directly follows from the correctness of the underlying primitives.

B. Security Proof

In this section, we formally prove Theorem 3.

Consider an adversary $\mathcal{A}$ who corrupts a party $P_{\mathcal{A}}$. The strategy of the simulator Sim for our protocol $\pi^{CS}$ against a malicious adversary $\mathcal{A}$ is described below. Note that the registration phase first takes place at the end of which the simulator gets the values to be sent to $P_{\mathcal{A}}$ which it then forwards to $\mathcal{A}$.

1. Description of Simulator

Setup: For each $i \in [n]$, Sim does the following:
Generate $crs_{sim_i} \leftarrow$ OT.Sim.Setup($1^\lambda$).
Generate random keys ($k_{i,a}$, $k_{i,b}$, $k_{i,c}$, $k_{i,d}$, $k_{i,p}$, $k_{i,q}$, $k_{i,z}$, $k_{i,C}$) for the PRF.
If $P_i = P_{\mathcal{A}}$, Give ($crs_i$) to $\mathcal{A}$.
Else, give ($crs_i$, $k_{i,a}$, $k_{i,b}$, $k_{i,c}$, $k_{i,d}$, $k_{i,p}$, $k_{i,q}$, $k_{i,z}$, $k_{i,C}$) to $\mathcal{A}$.
SignOn Phase: Case 1—Honest Party as $P_i$ Suppose an honest party $P_i$ that uses an input vector $\vec{u}$ and a message m for which it wants a token by interacting with a set $\mathcal{S}$ of two parties, one of which is $P_{\mathcal{A}}$. The arrowhead in Round 1 can denote that in this round messages are outgoing from the simulator. Sim gets the tuple (m, $\mathcal{S}$) from the ideal functionality $\mathcal{F}_{DiFuz}$ and interacts with the adversary $\mathcal{A}$ as below:

Round 1: (Sim→) Sim does the following:
(a) For each $j \in [\ell]$, compute the following:
For each $t \in \{1,2,3\}$, $ct_{t,j}$=AHE.Enc($pk_i$, $m_{t,j}$; $r_{t,j}$) where ($m_{t,j}$, $r_{t,j}$) are picked uniformly at random.
$\pi_{1,j} \leftarrow$ NIZK.Sim($st_{1,j}$) for the statement $st_{1,j}$=($ct_{1,j}$, $pk_i$) $\in L_1$.
$\pi_{2,j} \leftarrow$ NIZK.Sim($st_{2,j}$) for the statement $st_{2,j}$=($ct_{1,j}$, $ct_{2,j}$, $pk_i$) $\in L_2$.
$\pi_{3,j} \leftarrow$ NIZK.Sim($st_{3,j}$) for the statement $st_{3,j}$=($ct_{1,j}$, $ct_{j}$, $ct_{3,j}$, $pk_i$) $\in L_2$.
(b) Send $msg_1$=($\mathcal{S}$, m, $\{ct_{1,j}, ct_{2,j}, ct_{3,j}, \pi_{1,j}, \pi_{2,j}, \pi_{3,j}\}_{j \in [\ell]}$) to $\mathcal{A}$.

Round 2: (→Sim) On behalf of the corrupt party $P_{\mathcal{A}}$, receive ($ct_{x,2}, ct_{y,2}, ct_{z,1}, ct_{z,2}$) from the adversary.

Round 3: (Sim→) Sim does the following:
(a) Abort if the ciphertexts ($ct_{x,2}, ct_{y,2}, ct_{z,1}, ct_{z,2}$) were not correctly computed using the algorithms of AHE, vector $\vec{v}_i$ and randomness ($k_{i,a}, k_{i,b}, k_{i,c}, k_{i,d}, k_{i,p}, k_{i,q}, k_{i,z}, k_{i,enc}$).
(b) Generate and send $msg_3 = \{ot_{s,t}^{Rec}=$OT.Round$_1(crs_i, m_{s,t}^{ot}; r_{s,t}^{ot})\}_{s \in \{x,y,z\}, t \in \{1,2\}}$ where $m_{s,t}^{ot}, r_{s,t}^{ot}$ are picked uniformly at random.

Round 4: (→Sim) On behalf of the corrupt party $P_{\mathcal{A}}$, receive ($\tilde{C}$, $ot^{Sen}$, OneCT) from the adversary.

Message to Ideal Functionality $\mathcal{F}_{DiFuz}$: Sim does the following:
(a) Abort if ($\tilde{C}$, $ot^{Sen}$) were not correctly computed using the respective algorithms and randomness ($k_{i,ot}, k_{i,C}$).
(b) Else, instruct the ideal functionality $\mathcal{F}_{DiFuz}$ to deliver output to the honest party $P_i$.

SignOn Phase: Case 2—Malicious Party as $P_i$

Suppose a malicious party is the initiator $P_i$. Sim interacts with the adversary $\mathcal{A}$ as below:

Round 1: (→Sim) Sim receives $msg_1$=($\mathcal{S}$, m, $\{ct_{1,j}, ct_{2,j}, ct_{3,j}, \pi_{1,j}, \pi_{2,j}, \pi_{3,j}\}_{j \in [\ell]}$) from the adversary $\mathcal{A}$ on behalf of two honest parties $P_j$, $P_k$.

Round 2: (Sim→) Sim does the following:
(a) Message to Ideal Functionality $\mathcal{F}_{DiFuz}$:
  i. Run the extractor NIZK.Ext on the proofs $\{\pi_{1,j}, \pi_{2,j}, \pi_{3,j}\}_{j \in [\ell]}$ compute $\vec{u}$.
  ii. Query the ideal functionality $\mathcal{F}_{DiFuz}$ with in $P_{\mathcal{A}} = (m, \vec{u}, \mathcal{S})$ to receive output $out_{\mathcal{A}}$.
(b) Generate ($ct_{x,2}, ct_{y,2}, ct_{z,1}, ct_{z,2}$) as encryptions of random messages using public key $pk_i$ and uniform randomness. Send them to $\mathcal{A}$.

Round 3: (→Sim) Sim receives $msg_3 = \{ot_{s,t}^{Rec}\}_{s \in \{x,y,z\}, t \in \{1,2\}}$ from the adversary $\mathcal{A}$ on behalf of both honest parties $P_j$ and $P_k$.

Round 4: (Sim→) Sim does the following:
(a) Pick a value Pad uniformly at random.
(b) if $out_{\mathcal{A}} = \bot$:
  Let $out_{\mathcal{A}}$=(Token$_j$, Token$_k$).
  Compute ($\tilde{C}_{sim}$, $lab_{sim}$)$\leftarrow$Sim.Garble(Pad).
  Let $lab_{sim} = \{lab_{s,t}\}_{s \in \{x,y,z\}, t \in \{0,1\}}$
  For each $s \in \{x, y, z\}$ and each $t \in \{0,1\}$ compute $ot_{s,t}^{Sen}=$OT.Sim.Round$_2(lab_{s,t})$.
  Compute $ot^{Sen} = \{ot_{s,t}^{Sen}\}_{s \in \{x,y,z\}, t \in \{0,1\}}$.
  Set OneCT$_j$=SKE.Enc(Pad, Token$_j$) and OneCT$_k$=SKE.Enc(Pad, Token$_k$).
(c) if $out_{\mathcal{A}} \neq \bot$:
  Compute ($\tilde{C}_{sim}$, $lab_{sim}$)$\leftarrow$Sim.Garble($\bot$).
  Let $lab_{sim} = \{lab_{s,t}\}_{s \in \{x,y,z\}, t \in \{0,1\}}$.
  For each $s \in \{x, y, z\}$ and each $t \in \{0,1\}$ compute $ot_{s,t}^{Sen}=$OT.Sim.Round$_2(lab_{s,t})$.
  Compute $ot^{Sen} = \{ot_{s,t}^{Sen}\}_{s \in \{x,y,z\}, t \in \{0,1\}}$.
  Set OneCT$_j$=SKE.Enc(Pad, $r_j$) and OneCT$_k$=SKE.Enc(Pad, $r_k$) where $r_j$ and $r_k$ are picked uniformly at random.
(d) Send ($\tilde{C}_{sim}$, $ot^{Sen}$, OneCT$_j$) and (RO($\tilde{C}_{sim}$, $ot^{Sen}$), OneCT$_k$) to $\mathcal{A}$.

2. Hybrids

We now show that the above simulation strategy is successful against all malicious PPT adversaries. That is, the view of the adversary along with the output of the honest parties is computationally indistinguishable in the real and ideal worlds. We will show this via a series of computationally indistinguishable hybrids where the first hybrid $Hyb_0$ corresponds to the real world and the last hybrid $Hyb_8$ corresponds to the ideal world.

1. $Hyb_0$—Real World: In this hybrid, consider a simulator SimHyb that plays the role of the honest parties as in the real world.

When Honest Party is $P_i$:

2. $Hyb_1$—Case 1: Aborts and Message to Ideal Functionality. In this hybrid, SimHyb aborts if the adversary's messages were not generated in a manner consistent with the randomness output in the setup phase and also runs the query to the ideal functionality.

That is, SimHyb runs the "Message To Ideal Functionality" step as done by Sim after round 4 of Case 1 of the simulation strategy. SimHyb also performs the Abort check step in step 1 of round 3 of Case 1 of the simulation.

3. $Hyb_1$—Case 1: Simulate NIZKs. In this hybrid, SimHyb computes simulated NIZK arguments in round 1 of Case 1 as done by Sim in the ideal world.
4. $Hyb_3$—Case 1: Switch Ciphertexts. In this hybrid, SimHyb computes the ciphertexts in round 1 of Case 1 using random messages as done in the ideal world.
5. $Hyb_4$—Case 1: Switch OT Receiver Messages. In this hybrid, SimHyb computes the OT receiver messages in round 3 of Case 1 using random inputs as done in the ideal world.

When Corrupt Party is $P_i$:

6. $Hyb_5$—Case 2: Message to Ideal Functionality. In this hybrid, SimHyb runs the "Message To Ideal Functionality" step as done by Sim in round 2 of Case 2 of the simulation strategy. That is, SimHyb queries the ideal functionality using the output of the extractor NIZK. Ext on the proofs given by $\mathcal{A}$ in round 1.
7. $Hyb_6$—Case 2: Simulate OT Sender Messages. In this hybrid, SimHyb computes the CRS during the setup phase and the OT sender messages in round 4 of Case 2 using the simulator OT.Sim as done in the ideal world.
8. $Hyb_7$—Case 2: Simulate Garbled Circuit. In this hybrid, SimHyb computes the garbled circuit and associated labels in round 4 of Case 2 using the simulator Sim.Garble as done in the ideal world.
9. $Hyb_8$—Case 2: Switch Ciphertexts. In this hybrid, SimHyb computes the ciphertexts in round 2 of Case 2 using random messages as done in the ideal world. This hybrid corresponds to the ideal world.

We will now show that every pair of successive hybrids is computationally indistinguishable.

Lemma 5 $Hyb_0$ is statistically indistinguishable from $Hyb_1$.

Proof. When an honest party initiates the protocol as the querying party $P_i$, let's say it interacts with parties $P_j$ and $P_k$ such that $P_j$ is corrupt. In $Hyb_0$, on behalf of $P_i$, SimHyb checks that the messages sent by both parties $P_j$ and $P_k$ are same and if so, computes the output on behalf of the honest party. Since $P_k$ is honest, this means that if the messages sent by both parties are indeed the same, the adversary $\mathcal{A}$, on behalf of $P_j$, did generate those messages honestly using the shared randomness generated in the setup phase and the shared values generated in the registration phase.

In $Hyb_1$, on behalf of $P_i$, SimHyb checks that the messages sent by the adversary on behalf of $P_j$ were correctly generated using the shared randomness and shared values generated in the setup and registration phases and if so, asks the ideal functionality to deliver output to the honest party. Thus, the switch from $Hyb_0$ to $Hyb_1$ is essentially only a syntactic change.

Lemma 6 Assuming the zero knowledge property of the NIZK argument system, $Hyb_1$ is computationally indistinguishable from $Hyb_2$.

Proof. The only difference between the two hybrids is that in $Hyb_1$, SimHyb computes the messages of the NIZK argument system by running the honest prover algorithm NIZK.Prove(·), while in $Hyb_2$, they are computed by running the simulator NIZK.Sim(·). Thus, we can show that if there exists an adversary $\mathcal{A}$ that can distinguish between the two hybrids with non-negligible probability, we can design a reduction $\mathcal{A}_{NIZK}$ that can distinguish between real and simulated arguments with non-negligible probability thus breaking the zero knowledge property of the NIZK argument system which is a contradiction.

Lemma 7 Assuming the semantic security of the additively homomorphic encryption scheme AHE, $Hyb_2$ is computationally indistinguishable from $Hyb_3$.

Proof. The only difference between the two hybrids is that in $Hyb_2$, SimHyb computes the ciphertexts in round 1 by encrypting the honest party's actual inputs $(\vec{u}, \vec{w}_i)$, while in $Hyb_3$, the ciphertexts encrypt random messages. Thus, we can show that if there exists an adversary $\mathcal{A}$ that can distinguish between the two hybrids with non-negligible probability, we can design a reduction $\mathcal{A}_{AHE}$ that can distinguish between encryptions of the honest party's actual inputs and encryptions of random messages with non-negligible probability thus breaking the semantic security of the encryption scheme AHE which is a contradiction.

Lemma 8 Assuming the security of the oblivious transfer protocol OT against a malicious sender, $Hyb_3$ is computationally indistinguishable from $Hyb_4$.

Proof. The only difference between the two hybrids is that in $Hyb_3$, SimHyb computes the OT receiver's messages as done by the honest party in the real world, while in $Hyb_4$, the OT receiver's messages are computed by using random messages as input. Thus, we can show that if there exists an adversary $\mathcal{A}$ that can distinguish between the two hybrids with non-negligible probability, we can design a reduction $\mathcal{A}_{OT}$ that can distinguish between OT receiver's messages of the honest party's actual inputs and random inputs with non-negligible probability thus breaking the security of the oblivious transfer protocol OT against a malicious sender which is a contradiction.

Lemma 9 Assuming the argument of knowledge property of the NIZK argument system, $Hyb_4$ is computationally indistinguishable from $Hyb_5$.

Proof. The only difference between the two hybrids is that in $Hyb_5$, SimHyb also runs the extractor NIZK. Ext on the proofs given y the adversary to compute its input $\vec{u}$. Thus, the only difference between the two hybrids is if the adversary can produce a set of proofs $\{\pi_j\}$ such that, with non-negligible probability, all of the proofs verify successfully, but SimHyb fails to extract a and hence SimHyb aborts.

However, we can show that if there exists an adversary $\mathcal{A}$ that can this to happen with non-negligible probability, we can design a reduction $\mathcal{A}_{NIZK}$ that breaks the argument of knowledge property of the system NIZK with non-negligible probability which is a contradiction.

Lemma 10 Assuming the security of the oblivious transfer protocol OT against a malicious receiver, $Hyb_5$ is computationally indistinguishable from $Hyb_6$.

Proof. The only difference between the two hybrids is that in $Hyb_5$, SimHyb computes the OT sender's messages by using the actual labels of the garbled circuit as done by the honest party in the real world, while in $Hyb_6$, the OT sender's messages are computed by running the simulator OT.Sim. In $Hyb_6$, the crs in the setup phase is also computed using the simulator OT.Sim.

Thus, we can show that if there exists an adversary $\mathcal{A}$ that can distinguish between the two hybrids with non-negligible probability, we can design a reduction $\mathcal{A}_{OT}$ that can distinguish between the case where the crs an OT sender's messages were generated by running the honest sender algorithm from the case where the crs and the OT sender's messages were generated using the simulator OT.Sim with non-negligible probability thus breaking the security of the oblivious transfer protocol OT against a malicious receiver which is a contradiction.

Lemma 11 Assuming the correctness of the extractor NIZK.Ext and the security of the garbling scheme, $Hyb_6$ is computationally indistinguishable from $Hyb_7$.

Proof. The only difference between the two hybrids is that in $Hyb_6$, SimHyb computes the garbled circuit by running the honest garbling algorithm Garble using honestly generated labels, while in $Hyb_7$, SimHyb computes a simulated garbled circuit and simulated labels by running the simulator Sim.Garble on the value $out_\mathcal{A}$ output by the ideal functionality. From the correctness of the extractor NIZK.Ext, we know that the output of the garbled circuit received by the evaluator ($\mathcal{A}$) in $Hyb_6$ is identical to the output of the ideal functionality $out_\mathcal{A}$ used in the ideal world. Thus, we can show that if there exists an adversary $\mathcal{A}$ that can distinguish between the two hybrids with non-negligible probability, we can design a reduction $\mathcal{A}_{Garble}$ that can distinguish between an honestly generated set of input wire labels and an honestly generated garbled circuit from simulated ones with non-negligible probability thus breaking the security of the garbling scheme which is a contradiction.

Lemma 12 Assuming the circuit privacy property of the additively homomorphic encryption scheme AHE, $Hyb_7$ is computationally indistinguishable from $Hyb_8$.

Proof. The only difference between the two hybrids is that in $Hyb_7$, SimHyb computes the ciphertexts sent in round 2 by performing the homomorphic operations on the adversary's well-formed ciphertexts sent in round 1 exactly as in the real world, while in $Hyb_3$, SimHyb generates ciphertexts that encrypt random messages. Thus, we can show that if there exists an adversary $\mathcal{A}$ that can distinguish between the two hybrids with non-negligible probability, we can design a reduction $\mathcal{A}_{AHE}$ that can break the circuit privacy of the circuit private additively homomorphic encryption scheme AHE which is a contradiction.

C. Euclidean Distance

Recall that given two vectors $\vec{u}, \vec{w}$, the square of the Euclidean Distance EC.Dist between them relates to their Cosine Similarity CS.Dist as follows:

$$EC.Dist(\vec{u},\vec{w}) = (\langle \vec{u}, \vec{u} \rangle + \langle \vec{w}, \vec{w} \rangle - 2 \cdot CS.Dist(\vec{u},\vec{w}))$$

Thus, it is easy to observe that the above protocol and analysis easily extends for Euclidean Distance too.

VIII. Cosine Similarity Using Depth-1 Threshold FHE

In this section, we show how to efficiently construct a fuzzy threshold token generation protocol for cosine similarity using any depth-1 FHE scheme with threshold decryption.

A. Construction

We first list some notation and the primitives used before describing our construction.

Let IP be a function that takes as input a template w, a measurement u and outputs the inner product $\langle w, u \rangle$, and let d denote the threshold inner-product value to denote a match between w and u. Let the n parties be denoted by $P_1, \ldots, P_n$ respectively. Let $\lambda$ denote the security parameter. Let W denote the distribution from which a random template vector is sampled. Let's assume the vectors are of length $\ell$ where $\ell$ is a polynomial in $\lambda$. Let C be a circuit that takes as input a template w, a measurement u and some string K, and outputs K if the distance between w and u is below some (pre-defined) threshold; otherwise it outputs 0.

Let TFHE=(TFHE.Gen, TFHE.Enc, TFHE.PartialDec, TFHE.Eval, TFHE. Combine) be a depth-1 threshold FHE scheme. Let TS=(TS.gen, TS.Sign, TS.Combine, TS.Verify) be a threshold signature scheme. Let SKE=(SKE, Gen, SKE.Enc, SKE.Dec) denote a secret key encryption scheme. Let PKE=(PKE.Gen, PKE.Enc, PKE.Dec) denote a public key encryption scheme.

Let (Gen, Sign, Verify) be a strongly-unforgeable digital signature scheme. Let NIZK=(NIZK.Setup, NIZK.Prove, NIZK.Verify) denote a non-interactive zero knowledge argument. Let H be a collision-resistant hash function (modeled later as a random oracle).

We now describe the construction of our six round secure fuzzy threshold token generation protocol $\pi^{IP}$ for any n and k.

1. Registration

In the registration phase, the following algorithm is executed by a trusted authority:
Sample a random w from the distribution W.
Compute $(pk, sk_1, \ldots, sk_N) \leftarrow TFHE.Gen(1^\lambda, n, t)$.
Compute $(pp^{TS}, vk^{TS}, sk_1^{TS}, \ldots, sk_n^{TS}) \leftarrow TS.Gen(1^\lambda, n, t)$.
Compute $(\widetilde{pk}, \widetilde{sk}) \leftarrow PKE.Gen(1^\lambda)$.
Compute $K \leftarrow SKE, Gen(1^\lambda)$.
Compute $crs \leftarrow NIZK.Setup(1^\lambda)$.
Compute the ciphertexts $ct_0 \leftarrow TFHE.Enc(pk,w), ct_1 \leftarrow TFHE.Enc(pk,K)$.

For each $i \in [n]$, do the following:
a) Compute $(sk'_i, vk'_i) \leftarrow Gen(1^\lambda)$.
b) Compute $K_i = H(K, i)$.
c) Give the following to party $P_i$ $(pk, sk_i, ct_0, ct_1, (vk'_1, \ldots, vk'_n), sk'_i, pp^{TS}, vk^{TS}, sk_i^{TS}, \widetilde{pk}, K_i, crs)$.

A trusted authority (e.g., primary user device) can sample a biometric template w from a distribution of a biometric measurement $\mathcal{W}$. The trusted authority can also compute a public key pk and a plurality of private key shares $sk_i$ for a threshold fully homomorphic encryption scheme TFHE, in addition to public parameters $pp^{TS}$, a verification key $vk^{TS}$, and a plurality of private key shares $sk_i^{TS}$ for a threshold signature scheme TS. The trusted authority can also compute a public key $\widetilde{pk}$ and a secret key $\widetilde{sk}$ for a public key encryption scheme PKE and a string K for a secret key encryption scheme SKE. Using the public key pk, the trusted authority can encrypt the biometric template w to form ciphertext $ct_0$ and encrypt the string K to form ciphertext $ct_1$.

Then, the trusted authority can compute a plurality of values for each electronic device i of n electronic devices (e.g., a first electronic device and other electronic devices). The trusted authority can compute a secret key share $sk'_i$ and a verification key share $vk'_i$ for a digital signature scheme. The trusted authority can also compute a hash $K_i$ using the string K and a hash function H. The trusted authority can then send to each electronic device $P_i$ the public key pk, the ciphertexts $ct_0$ and $ct_1$, verification key shares $(vk'_i, \ldots, vk'_t)$, secret key share $sk'_i$, public parameters $pp^{TS}$, verification key $vk^{TS}$, private key share $sk_i^{TS}$, and hash $K_i$.

2. SignOn Phase

In the SignOn phase, let's consider party $P^*$ that uses input vector u, a message m on which it wants a token. $P^*$ interacts with the other parties in the below four round protocol. The arrowhead in round 1 can denote that in this round messages are outgoing from party $P^*$.

Round 1: ($P^* \rightarrow$) Party $P^*$ does the following:
a) Compute the ciphertext $ct^*$=TFHE.Enc(pk, u).
b) Pick a set S consisting of t parties amongst $P_1, \ldots, P_n$. For simplicity, without loss of generality, we assume that $P^*$ is also part of set S.
c) To each party $P_i \in S$, send ($ct^*$, m).

Round 2: ($\rightarrow P^*$) Each Party $P_i \in S$ (except $P^*$) does the following:
a) Compute the signature $\sigma'_1$=Sign($sk'_i$, $ct^*$).
b) Send $\sigma'_i$ to the party $P^*$.

Round 3: ($P^* \rightarrow$) Party $P^*$ sends ($\sigma'_1, \ldots, \sigma'_n$) to each party $P_i$.

Round 4: ($\rightarrow P^*$) Each Party $P_i \in S$ (except $P^*$) does the following:
a) If there exists $i \in [n]$ such that Verify ($vk'_i$, $ct^*$, $\sigma'_i$)≠1, then output ⊥.
b) Otherwise, evaluate the ciphertext $ct$=TFHE.Eval($pk, IP, ct_0, ct^*$), and compute a partial decryption of ct as:

$\mu_i$=TFHE.PartialDec($sk_i, ct$).

c) Send $\mu_i$ to the party $P^*$.

Round 5: ($P^* \rightarrow$) Party $P^*$ does the following:
a) Recover IP(v, u)=TFHE.Combine($\mu_1, \ldots, \mu_n$).
b) Compute $C_0 \leftarrow$ PKE.Enc($\widetilde{pk}$, IP(v, u)).
c) For each $i \in [n]$, compute $C_i$PKE.Enc($\widetilde{pk}$, $\mu_i$).
d) Send to each party $P_i$ the tuple $(C_0, C_1, \ldots, C_n, \pi)$, where $\pi$ is a NIZK proof (generated using crs by the algorithm NIZK.Prove) for the following statement (denoted as $\gamma$ subsequently):
The ciphertext $C_0$ encrypts an inner product $\mu_0$ and each ciphertext $C_i$ encrypts some message $\mu_i$ for $i \in [n]$ under the public key $\widetilde{pk}$ such that:
 i. $\mu_0 < d$.
 ii. $\mu_0$=TFHE.Combine($\mu_1, \ldots, \mu_n$).

Round 6: ($\rightarrow P^*$) Each Party $\{P_i \in S$(except $P^*$) does the following:
a) If NIZK.Verify(crs, $\gamma$, $\pi$)≠1, then output ⊥.
b) Otherwise, compute a partial decryption of $ct_1$ as:

$\mu_{i,1}$=TFHE.PartialDec($sk_i, ct_1$).

(c) Compute $Token_i$=TS.Sign($sk_i$, m) and $\widetilde{ct}_i \leftarrow$ SKE.Enc ($K_i$, $Token_i$).
(d) Send ($\mu_{i,1}$, $\widetilde{ct}_i$) to the party $P^*$.

Output Computation: Party $P^*$ does the following to generate a token:
(a) Recover K=TFHE.Combine($\mu_{1,1}, \ldots, \mu_{n,1}$).
(b) For each $i \in [n]$, do the following:
 i. Compute $K_i$=H(K, i).
 ii. Recover $Token_i$=SKE.Dec($K_i$, $\widetilde{ct}_i$).

(c) Compute←TS.Combine($\{Token_i\}_{i \in S}$).
(d) Output Token if TS.Verify($vk^{TS}$, m, Token)=1. Else, output ⊥.

A first electronic device, $P^*$ can encrypt the input vector u (e.g., the biometric measurement vector) with the public key pk of the threshold fully homomorphic encryption scheme to generate an encrypted biometric measurement ciphertext $ct^*$. The first electronic device can send the encrypted biometric measurement $ct^*$ and the message m to each of the other electronic devices. Each of the other electronic devices can compute a partial signature computation $\sigma'_i$ with the ciphertext $ct^*$ and the secret key share $sk'_i$. Each electronic device can send the partial signature computation $\sigma'_i$ to the first electronic device. The first electronic device can send all of the partial signature computations ($\sigma'_1, \ldots, \sigma'_n$) to all of the other electronic devices.

Each of the other electronic devices can verify each of the partial signature computations ($\sigma'_1, \ldots, \sigma'_n$) with the ciphertext $ct^*$ and the received verification keys) ($vk'_1, \ldots, vk'_n$). If any of the partial signature computations are not verified (e.g., Verify($vk'_i$, $ct^*$, $\sigma'^i$)≠1), the electronic device can output ⊥, indicating an error. An unverified signature can indicate that one (or more) of the electronic devices did not compute the partial signature computation correctly, and thus may be compromised or fraudulent. After verifying the partial signature computations, each of the other electronic devices can evaluate the ciphertexts $ct^*$, and $ct_0$ to generate a new ciphertext ct. Evaluating the ciphertexts may include computing an inner product between the template w (in ciphertext $ct_0$) and the measurement u (in ciphertext $ct^*$). The inner product can then be used, for example, to compute a cosine similarity distance measure or a Euclidean distance. Each of the other electronic devices can then compute a partial decryption $\mu_i$ of the ciphertext ct. The partial decryption $\mu_i$ can then be send to the first electronic device.

The first electronic device can combine the partial decryptions ($\mu_1, \ldots, \mu_n$) using threshold fully homomorphic encryption to recover the inner product IP(w, u) of the template w and the measurement u. The first electronic device can encrypt the inner product IP(w, u) with a public key encryption scheme to generate a ciphertext $C_0$, and encrypt each partial decryption $\mu_i$ to generate a plurality of ciphertexts $C_i$. The first electronic device can also generate a non-interactive zero knowledge proof $\pi$. The proof $\pi$ can be a proof that $C_0$ encrypts an inner product $\mu_0$ and each ciphertext $C_i$ encrypts a value $\mu_i$. The proof $\pi$ can also state that the inner product (and thus the distance measure) is less than a threshold d, and that the inner product $\mu_0$ is the result of the combination of the partial decryptions ($\mu_1, \ldots, \mu_n$). The first electronic device can then send to each of the other electronic devices a tuple with the ciphertexts and the proof ($C_0, C_1, \ldots, C_n, \pi$).

Each of the other electronic devices can verify the proof $\pi$. If the proof is not verified, the electronic device can output ⊥ and abort. If the proof $\pi$ is verified, the electronic device can compute a partial decryption $\mu_{i,1}$ of $ct_1$, the encryption of the string K. A partial threshold signature token $Token_i$ can be generated by each of the other electronic devices using the secret key share $sk_i$ and the message m. A ciphertext $\widetilde{ct}_i$ can be computed as a secret key encryption with the partial threshold signature token $Token_i$ and the hash $K_i$. The partial decryption $\mu_{i,1}$ and the ciphertext $\widetilde{ct}_i$ can then be send to the first electronic device.

The first electronic device can homomorphically combine the partial decryptions ($\mu_{1,1}, \ldots, \mu_{n,1}$) to recover the string K. Then the first electronic device can compute hash $K_i$ for each electronic device i using the string K and a hash function H, then use the hash $K_i$ to decrypt the secret key encryption ciphertext $\tilde{ct}_i$ to recover the partial threshold signature token $Token_i$. With each received partial threshold signature token $Token_i$, the first electronic device can combine them to compute a signature token Token. If the first electronic device can verify the token Token and the message m, the first electronic device can output the token Token; otherwise, the first electronic device can output ⊥.Token Verification Given a verification key $vk^{TS}$, message m and Token, the token verification algorithm outputs 1 if TS.Verify($vk^{TS}$, m, Token) outputs 1.

B. Security Analysis

We prove informal Theorem 3 here. In fact, the proof is very similar to the proof of the general case using TFHE. So we omit the details and only provide a brief sketch. Note that, this protocol realizes $\mathcal{F}_{FTTG}$ with a slightly weaker guarantee as defined by the leakage functions. In particular, the leakage functions $L_c$, $L_f$, $L_m$ return the exact inner product of the template w and the measurement u. This is because of the fact that, in the protocol, (viz. the Sign On phase), the initiator gets to know this value. In the simulation this comes up when the Sign On session is initiated by a corrupt party. In that case, the simulator issues a "Test Password" query on the input of the initiator and learns the inner product that it sends to the adversary then. Other steps are mostly the same as that of the simulator of the generic protocol and therefore we omit the details.

IX. Hamming Distance

In this section, we show how to construct an efficient two round secure fuzzy threshold token generation protocol in the Random Oracle model for the distance measure being Hamming Distance. Our token generation protocol satisfies Definition 7 for any n, t and is secure against a malicious adversary that can corrupt up to (t−1) parties.

Formally, we show the following theorem:

Theorem 5 Assuming the existence of threshold signatures as defined in Section III.E, threshold linear secret sharing, robust linear secret sharing, secret key encryption, UC-secure threshold oblivious pseudorandom functions, and collision resistant hash functions, there exists a two round secure fuzzy threshold token generation protocol satisfying Definition 7 for the Hamming Distance function. The protocol works for any n, any threshold t, and is secure against a malicious adversary that can corrupt up to (t−1) parties.

The threshold oblivious PRF can be built assuming the Gap Threshold One-More Diffie-Hellman assumption in the Random Oracle model [25]. The threshold signature schemes we use can be built assuming either DDH/RSA [16, 17]. Collision resistant hash functions are implied by the Random Oracle model. We will use the Shamir's secret sharing scheme to instantiate the robust secret sharing scheme as described in Imported Lemma 1. The other primitives can be built either unconditionally or assuming just one way functions. Thus, instantiating the primitives used in the above theorem, we get the following corollary:

Corollary 6 Assuming the hardness of $\mathcal{A} \in$ {Gap DDH, RSA} and Gap Threshold One-More Diffie-Hellman (Gap-TOMDH), there exists a two round secure fuzzy threshold token generation protocol in the Random Oracle model satisfying Definition 7 for the Hamming Distance function.

The protocol works for any n, any threshold t, and is secure against a malicious adversary that can corrupt upto (t−1) parties.

A. Construction

We first list some notation and the primitives used before describing our construction.

Let the n parties be denoted by $P_1, \ldots, P_n$ respectively. Let $\lambda$ denote the security parameter. Let $\mathcal{W}$ denote the distribution from which the random vector is sampled. Let's assume the vectors are of length $\ell$ where $\ell$ is a polynomial in $\lambda$. Each element of this vector is an element of a field F over some large prime modulus q. Let d denote the threshold value for the Hamming Distance function. That is, two vectors $\vec{w}$ and $\vec{u}$ of length $\ell$ each can be considered close if their Hamming Distance is at most ($\ell$−d)—that is, they are equal on at least d positions.

Let (Share, Recon) be a (n, t) linear secret sharing scheme. Let (RSS.Share, RSS.Recon, Thres.Recon) be a ($\ell$, d, $$\frac{\ell+d}{2}$$

robust linear secret sharing scheme as defined in Appendix A. That is, the secret can be reconstructed by running algorithm Thres.Recon given either exactly d honestly generated shares or by running algorithm RSS.Recon given a collection off $\ell$ shares of which $$\frac{\ell+d}{2}$$

are honestly generated. Let TS=(TS.Gen, TS.Sign, TS.Combine, TS.Verify) be the threshold signature scheme of Boldyreva [16]. We note that a similar construction also works for other threshold signature schemes. Without loss of generality and for simplicity, we present our scheme here using the construction of Boldyreva [16].

Let (SKE.Enc, SKE.Dec) denote a secret key encryption scheme. Let TOPRF=(TOPRF.Setup, TOPRF.Encode, TOPRF.Eval, TOPRF.Combine) denote a UC-secure threshold oblivious pseudorandom function in the Random Oracle (RO) model. Let TOPRF.Sim=(TOPRF.Sim.Encode, TOPRF.Sim.Eval, TOPRF.Sim.Ext) denote the simulator of this scheme where the algorithm TOPRF.Sim.Encode is used to generate simulated encodings, TOPRF.Sim.Eval is used to generate simulated messages on behalf of algorithm TOPRF.Eval. Algorithm TOPRF.Sim.Ext extracts the message being encoded based on the queries made to RO during the TOPRF.Combine phase. Let's model a collision resistant hash function H via a Random Oracle.

We now describe the construction of our two round secure threshold fuzzy token generation protocol for Hamming Distance.

1. Registration

In the registration phase, the following algorithm is executed by a trusted authority:

Compute $(pp^{TS}, vk^{TS}, sk_1^{TS}, \ldots, sk_\ell^{TS}) \leftarrow$ TS.Gen($1^\lambda$, $\ell$, d). Recall that $(sk_i^{TS}, \ldots, sk_\ell^{TS})$ is generated by running RSS.Share($sk^{TS}$, $$\frac{\ell+d}{2}\Big)$$

For each $i \in [\ell]$, compute $(sk_{i,1}^{TS}, \ldots, sk_{i,n}^{TS}) \leftarrow$ Share $(sk_i^{TS}, n, t)$.

For each $j \in [n]$, give $(pp^{TS}, vk^{TS}, \{sk_{i,j}^{TS}\}_{i \in [\ell]})$ to party $P_j$.

Sample a random vector $\vec{w}$ from the distribution $\mathcal{W}$. Let $\vec{w} = (w_1, \ldots, w_\ell)$.

Compute $(pp^{TOPRF}, sk_1^{TOPRF}, \ldots, sk_n^{TOPRF}) \leftarrow$ TOPRF.Setup($1^\lambda$, n, t). Let $sk^{TOPRF}$ denote the combined key of the TOPRF.

For each $j \in [n]$, give $sk_j^{TOPRF}$ to $P_j$.

For each $i \in [\ell]$, do the following:
  Compute $h_i$=TOPRF($sk^{TOPRF}, w_i$).
  For each $j \in [n]$, compute $h_{i,j}$=H($h_i \| j$). Give $h_{i,j}$ to party $P_j$.

2. Setup

The setup algorithm does nothing.

3. SignOn Phase

In the SignOn phase, let's consider party P* that uses an input vector $\vec{u} = (u_1, \ldots, u_\ell)$ and a message m on which it wants a token. P* interacts with the other parties in the below two round protocol.

Round 1: (P*→) Party P* does the following:
  i. Pick a set $\mathcal{S}$ consisting of t parties amongst $P_1, \ldots, P_n$. For simplicity, without loss of generality, we assume that P* is also part of set $\mathcal{S}$.
  ii. For each $i \in [\ell]$, compute $c_i$=TOPRF.Encode($u_i; \rho_i$) using randomness $\rho_i$.
  iii. To each party $P_j \in \mathcal{S}$, send $(\mathcal{S}, m, c_1, \ldots, c_\ell)$.

Round 2: (→P*) Each Party $P_i \in \mathcal{S}$ (except P*) does the following:
  i. Compute $(r_{1,j}, \ldots, r_{\ell,j}) \leftarrow$ RSS.Share(0, $\ell$, d, $$\frac{\ell+d}{2}\Big).$$

ii. For each $i \in [\ell]$, do:
    Compute TS.Sign($sk_{i,j}^{TS}$, m). It evaluates to $H(m)^{sk_{i,j}}$. Set $y_{i,j}=H(m)^{(sk_{i,j}+r_{i,j})}$.
    Compute $z_{i,j}$=TOPRF.Eval($sk_j^{TOPRF}, c_i$).
    Compute $ct_{i,j}$=SKE.Enc($h_{i,j}, y_{i,j}$).
    Send ($z_{i,j}, ct_{i,j}$) to party P.

Output Computation: Every party $P_j \in \mathcal{S}$ outputs (m, P*, $\mathcal{S}$). Additionally, party P* does the following to generate a token:
  i. For each $i \in [\ell]$, do:
    Compute $h_i$=TOPRF.Combine($\{z_{i,j}\}_{j \in \mathcal{S}}$).
    For each $j \in \mathcal{S}$, compute $h_{i,j}$=H($h_i \| j$) and then compute $y_{i,j}$=SKE.Dec($h_{i,j}, ct_{i,j}$).
    Let $\alpha_1, \ldots, \alpha_n$ be the reconstruction coefficients of the (n, t) linear secret sharing scheme used to secret share $sk_i^{TS}$. Compute $Token_i = \Pi_{j \in \mathcal{S}} (ct_{i,j}^{\alpha_j})$.

Strategy 1:

$$\Big(\frac{\ell+d}{2}\Big)$$

matches
  i. Let $\beta_1, \ldots, \beta_\ell$ be the reconstruction coefficients of the robust reconstruction algorithm RSS.Recon of the ($\ell$, d, $$\frac{\ell+d}{2}\Big)$$

linear robust secret sharing scheme used to secret share both $sk^{TS}$ and 0 by each party in $\mathcal{S}$.
  ii. Compute Token=$\Pi_{i \in \ell}$ ($Token_i^{\beta_i}$).
  iii. If TS.Verify($vk^{TS}$, m, Token), output Token and stop.
  iv. Else, output $\perp$.

Strategy 2: Only d matches
  i. For each set $\mathcal{P} \subset [\ell]$ such that $|\mathcal{P}|=d$, do:
    Compute Token=$\Pi_{i \in \mathcal{P}}$ ($Token_i^{\beta_i}$).
    If TS.Verify($vk^{TS}$, m, Token), output Token and stop.
  ii. Else, output $\perp$.

4. Token Verification

Given a verification key $vk^{TS}$, message m and token Token, the token verification algorithm outputs 1 if TS.Verify($vk^{TS}$, m, Token) outputs 1.

The correctness of the protocol directly follows from the correctness of the underlying primitives.

B. Security Proof

In this section, we formally prove Theorem 5.

Consider an adversary $\mathcal{A}$ who corrupts t* parties where t*<t. The strategy of the simulator Sim for our protocol $\pi^{HD}$ against a malicious adversary $\mathcal{A}$ is described below. Note that the registration phase first takes place at the end of which the simulator gets the values to be sent to every corrupt party which it then forwards to $\mathcal{A}$.

1. Description of Simulator

SignOn Phase: Case 1—Honest Party as P*

Suppose an honest party P* that uses an input vector $\vec{u} = (u_1, \ldots, u_\ell)$ and a message m for which it wants a token by interacting with a set $\mathcal{S}$ consisting of t parties, some of which could be corrupt. Sim gets the tuple (m, $\mathcal{S}$) from the ideal functionality $\mathcal{F}_{DiFuz}$ and interacts with the adversary $\mathcal{A}$ as below:

Round 1: (Sim→) Sim does the following:
  (a) For each $i \in [\ell]$, compute $c_i$=TOPRF.Sim.Encode($1^\lambda; \rho_i$) using randomness $\rho_i$.
  (b) To each malicious party $P_j \in \mathcal{S}$, send ($\mathcal{S}, m, c_1, \ldots, c_\ell$).

Round 2: (→Sim) For each $i \in [\ell]$, on behalf of each corrupt party $P_i \in \mathcal{S}$, receive ($z_{i,j}, ct_{i,j}$) from the adversary.

Message to Ideal Functionality $\mathcal{F}_{DiFuz}$: Sim does the following:
(a) For each corrupt party $P_j$, do:
   For every $i \in [\ell]$, abort if $Z_{i,j} \neq \text{TOPRF.Eval}(sk_j^{TOPRF}, c_i)$.
   Compute $y_{i,j} = \text{SKE.Dec}(h_{i,j}, ct_{i,j})$.
   Let $\beta_1, \ldots, \beta_\ell$ be the reconstruction coefficients of the robust reconstruction algorithm RSS. Recon of the ($\ell, d, \frac{\ell+d}{2}$)

linear robust secret snaring scheme used to secret share 0.
   Compute $msg_j = \Pi_{i \in \ell}(y_{i,j}^{\beta_i})$. Abort if $msg_j \neq H(m)^{\Sigma_{i \in [r]}(\beta_i \cdot sk_{i,j})}$.

(b) Instruct the ideal functionality $\mathcal{F}_{DiFuz}$ to deliver output to the honest party P*.

SignOn Phase: Case 2—Malicious Party as P*

Suppose a malicious party is the initiator P*. Sim interacts with the adversary $\mathcal{A}$ as below:

Round 1: ($\to$Sim) Sim receives ($\mathcal{S}, m, c_1, c_\ell$) from the adversary $\mathcal{A}$ on behalf of every honest parties $P_j \in \mathcal{S}$.

Round 2: (Sim$\to$) On behalf of every honest parties $P_j \in \mathcal{S}$, Sim does the following for each $i \in [\ell]$:
(a) Compute $z_{i,j} = \text{TOPRF.Sim.Eval}(c_i)$.
(b) Pick ciphertext $ct_{i,j}$ uniformly at random.
(c) Send ($z_{i,j}, ct_{i,j}$) to party $\mathcal{A}$ Output Computation Phase: Sim does the following:
(a) Message to Ideal Functionality $\mathcal{F}_{DiFuz}$:
   i. For each $i \in [\ell]$, based on the adversary's queries to the oracle RO, run algorithm TOPRF.Sim. Ext to compute $u^*_i$. We assume that the evaluator has to make all the RO calls in parallel to allow for extraction. This can be enforced in the protocol design and we avoid mentioning this explicitly to ease the exposition.
   ii. Query the ideal functionality with input $\vec{u}^* = (u^*_1, \ldots, u^*_\ell)$ to receive output $\text{out}_\mathcal{A}$.
(b) For each $i \in [\ell]$, let $h_i = \text{TOPRF.Combine}(\{z_{i,j}\}_{j \in S})$.
(c) On behalf of each honest party $P_j$, for each $i \in [\ell]$, set $H(h_i||j)$ such that $\text{SKE.Dec}(h_{i,j}, ct_{i,j}) = H(m)^{R_{i,j}}$ where $R_{i,j}$ is chosen below.
(d) If $\text{out}_\mathcal{A} = \perp$, do:
   i. Every $R_{i,j}$ picked uniformly at random.
(e) If $\text{out}_\mathcal{A} \neq \perp$, For each honest party $P_j$, do:
   i. Pick $r_{1,j}, \ldots, r_{\ell,j} \leftarrow \text{RSS.Share}(0, \frac{\ell+d}{2})$.
   ii. Set $R_{i,j} = (sk^*_{i,j} + r_{i,j})$ where $sk^*_{i,j}, \ldots, s^{k^*_\ell}_{\ j}$ are picked such that the adversary's token output computation process results in output $\text{out}_\mathcal{A}$.

2. Hybrids

We now show that the above simulation strategy is successful against all malicious PPT adversaries. That is, the view of the adversary along with the output of the honest parties is computationally indistinguishable in the real and ideal worlds. We will show this via a series of computationally indistinguishable hybrids where the first hybrid $\text{Hyb}_0$ corresponds to the real world and the last hybrid $\text{Hyb}_1$ corresponds to the ideal world.

1. $\text{Hyb}_0$—Real World: In this hybrid, consider a simulator SimHyb that plays the role of the honest parties as in the real world.

When Honest Party is P*:

2. $\text{Hyb}_1$—Case 1: Simulate TOPRF Encoding. In this hybrid, SimHyb computes the round 1 message on behalf of P* by running the simulator TOPRF.Sim.Encode($\cdot$) to compute the encoding $c_i$ for each $i \in [\ell]$ as done in round 1 of the ideal world.

3. $\text{Hyb}_2$—Case 1: Message to Ideal Functionality. In this hybrid, SimHyb runs the "Message To Ideal Functionality" step as done by Sim after round 2 of Case 1 of the simulation strategy instead of computing the output as done by the honest party P* in the real world.

When Corrupt Party is P*:

4. $\text{Hyb}_3$—Case 2: Message to Ideal Functionality. In this hybrid, SimHyb runs the "Message To Ideal Functionality" step as done by Sim after round 2 of Case 2 of the simulation strategy. That is, SimHyb runs the extractor TOPRF.Sim.Ext to compute P* and queries the ideal functionality with this.

5. $\text{Hyb}_4$—Case 2: Simulate TOPRF Evaluation. In this hybrid, in round 2, SimHyb computes the TOPRF evaluation responses by running the algorithm TOPRF.Sim.Eval as done in the ideal world.

6. $\text{Hyb}_5$—Case 2: $\text{out}_\mathcal{A} = \perp$. In this hybrid, when the output from the ideal functionality $\text{out}_\mathcal{A} = \perp$, on behalf of every honest party $P_j$, SimHyb sets the exponent of each $y_{i,j}$ to be a uniformly random value $R_{i,j}$ instead of $(sk_{i,j} + r_{i,j})$.

7. $\text{Hyb}_6$—Case 2: $\text{out}_\mathcal{A} = \perp$. In this hybrid, when the output from the ideal functionality $\text{out}_\mathcal{A} = \perp$, instead of computing the ciphertext $ct_{i,j}$ as before, SimHyb picks $ct_{i,j}$ uniformly at random and responds to the Random Oracle query as in the ideal world to set the decrypted plaintext.

8. $\text{Hyb}_7$—Case 2: $\text{out}_\mathcal{A} \neq \perp$. In this hybrid, when the output from the ideal functionality $\text{out}_\mathcal{A} \neq \perp$, SimHyb computes the ciphertexts $ct_{i,j}$ and the responses to the RO queries exactly as in the ideal world. This hybrid corresponds to the ideal world.

We will now show that every pair of successive hybrids is computationally indistinguishable.

Lemma 13 Assuming the security of the threshold oblivious pseudorandom function TOPRF, $\text{Hyb}_0$ is computationally indistinguishable from $\text{Hyb}_1$.

Proof. The only difference between the two hybrids is that in in $\text{Hyb}_0$, SimHyb computes the value $c_i$ for each $i \in [\ell]$ by running the honest encoding algorithm TOPRF.Encode while in $\text{Hyb}_1$, it computes them by running the simulated encoding algorithm TOPRF.Sim.Encode. Suppose there exists an adversary $\mathcal{A}$ that can distinguish between the two hybrids with non-negligible probability. We can use $\mathcal{A}$ to construct an adversary $\mathcal{A}_{TOPRF}$ that can distinguish between the real and simulated encodings with non-negligible probability and thus break the security of the TOPRF which is a contradiction.

Lemma 14 Assuming the correctness of the threshold oblivious pseudorandom function TOPRF, correctness of the private key encryption scheme and correctness of the robust secret sharing scheme, $Hyb_1$ is computationally indistinguishable from $Hyb_2$.

Proof. The difference between the two hybrids is that in $Hyb_2$, SimHyb checks whether the adversary did indeed computes its messages honestly and if not, aborts. However, in $Hyb_1$, SimHyb aborts only if the output computation phase did not succeed. Thus, we can observe that assuming the correctness of the primitives used—namely, the threshold oblivious pseudorandom function TOPRF, the private key encryption scheme and the robust secret sharing scheme, $Hyb_1$ is computationally indistinguishable from $Hyb_2$.

Lemma 15 Assuming the correctness of the extractor TOPRF.Sim.Ext of the threshold oblivious pseudorandom function TOPRF, $Hyb_2$ is computationally indistinguishable from $Hyb_3$.

Proof. The only difference between the two hybrids is that in $Hyb_3$, SimHyb also runs the extractor TOPRF.Sim.Ext based on the adversary's queries to the random oracle RO to extract the adversary's input $\vec{u}^*$. Thus, the only difference in the adversary's view is if SimHyb aborts with non-negligible probability because the extractor TOPRF.Sim.Ext aborts with non-negligible probability. Thus, we can show that assuming the correctness of the extractor TOPRF.Sim.Ext of the threshold oblivious pseudorandom function TOPRF, $Hyb_2$ is computationally indistinguishable from $Hyb_3$.

Lemma 16 Assuming the security of the threshold oblivious pseudorandom function TOPRF, $Hyb_3$ is computationally indistinguishable from $Hyb_4$.

Proof. The only difference between the two hybrids is that for every honest party $P_j$, in $Hyb_3$, SimHyb computes the value $z_{i,j}$ for each $i \in [\ell]$ by running the honest evaluation algorithm TOPRF.Eval while in $Hyb_4$, it computes them by running the simulated evaluation algorithm TOPRF.Sim.Eval. Suppose there exists an adversary $\mathcal{A}$ that can distinguish between the two hybrids with non-negligible probability. We can use $\mathcal{A}$ to construct an adversary $\mathcal{A}_{TOPRF}$ that can distinguish between the real and simulated evaluation responses with non-negligible probability and thus break the security of the TOPRF which is a contradiction.

Lemma 17 Assuming the correctness of the threshold oblivious pseudorandom function, security of the private key encryption scheme, security of the threshold linear secret sharing scheme and the security of the robust linear secret sharing scheme, $Hyb_4$ is computationally indistinguishable from $Hyb_5$.

Proof. In the scenario where the output from the ideal functionality out $t_{\mathcal{A}} = \perp$, we know that the adversary's input $\vec{w}$ matches with the vector $\vec{w}$ in at most (d−1) positions. Therefore, from the correctness of the TOPRF scheme, for each honest party $P_j$, the adversary learns the decryption key for at most (d−1) of the $\ell$ ciphertexts $\{ct_{i,j}\}_{i \in [\ell]}$. Therefore, from the security of the secret key encryption scheme, the adversary learns at most (d−1) of the $\ell$ plaintexts $\{y_{i,j}\}_{i \in [\ell]}$.

Now, in $Hyb_4$, for every party $P_j$, for every $i \in [\ell]$ for which the adversary learns the plaintext, the exponent in the plaintext $y_{i,j}$ is of the form $(sk_{i,j} + r_{i,j})$ where $r_{i,j}$ is a secret sharing of 0 while in $Hyb_5$, the exponent is picked uniformly at random. Therefore, since the secret sharing scheme statistically hides the secret as long as at most (d−1) shares are revealed, we can show that if there exists an adversary $\mathcal{A}$ that can distinguish between the two hybrids with non-negligible probability, we can use $\mathcal{A}$ to construct an adversary $\mathcal{A}_{Share}$ that can distinguish between a real set of (d−1) shares and a set of (d−1) random values with non-negligible probability, thus breaking the security of the secret sharing scheme which is a contradiction.

Lemma 18 $Hyb_5$ is statistically indistinguishable from $Hyb_6$.

Proof. Notice that in going from $Hyb_5$ to $Hyb_6$, we only make a syntactic change. That is, instead of actually encrypting the desired plaintext at the time of encryption, we use the random oracle to program in the decryption key in such a way as to allow the adversary to decrypt and learn the same desired plaintext.

Lemma 19 $Hyb_6$ is statistically indistinguishable from $Hyb_7$.

Proof. In the scenario where the output from the ideal functionality out $t_{\mathcal{A}} = \perp$, we know that the adversary's input $\vec{u}^*$ matches with the vector $\vec{w}$ in at least d positions. For every honest party $P_j$, the adversary learns the plaintexts $\{y_{i,j}\}$ for every position i that has a match.

Now, in $Hyb_6$, for every party $P_j$, for every $i \in [\ell]$ for which the adversary learns the plaintext, the exponent in the plaintext $y_{i,j}$ is of the form $(sk_{i,j} + r_{i,j})$ where $r_{i,j}$ is a secret sharing of 0. However, in $Hyb_7$, the $sk_{i,j}$ values in the exponent are picked not to be secret shares of the threshold signing key share $sk_j^{TS}$, but picked in such a manner that the adversary recovers the same output. There is no other difference between the two hybrids and it is easy to observe that the difference between the two hybrids is only syntactic and hence they are statistically indistinguishable.

X. A Protocol Using Secure Sketches

Secure sketches are fundamental building blocks of fuzzy extractor. Combining any information theoretic secure sketch with any threshold oblivious PRF we construct a FTTG protocol. Due to the information theoretic nature of secure sketch this protocol has a distinct feature, that is the probability of succeeding in an offline attack stays the same irrespective of the computational power of the attacker or the number of brute-force trials. However, if a party initiates the protocol with a "close" measurement it recovers the actual template. Also, due to the same reason the template cannot be completely hidden. In other words, this protocol has an inherent leakage on the template incurred by the underlying secure sketch instantiation. The first distinct characteristic is easily captured under the current definition setting the functions $L_c$ to return the correct template and $L_f$, $L_m$ to return $\perp$ on all inputs. To capture the leakage from template we introduce a new query to the ideal functionality.

Consider another extra parameter, the leakage function $L_{tmp}: \mathbb{Z}_q^\ell \to \{0,1\}^\beta$. On receiving a query of the form ("Leak on Template", sid, $\mathcal{P}_i$) from S, first check whether there is a tuple (sid, $\mathcal{P}_i$, $w_i$) recorded, if it is not found then do nothing, otherwise reply with ("Leakage", (sid, $\mathcal{P}_i$, $L_{tmp}(w_i)$) to S. The extended ideal functionality that is the same as $\mathcal{F}_{FTTG}$ except it has this additional query is called $\mathcal{F}^*_{FTTG}$ Now we provide a protocol below that realizes $\mathcal{F}^*_{FTTG}$ with some reasonable leakage. For simplicity we only present the protocol only secure against semi-honest adversary. Adding generic NIZK proofs it is possible to make it secure against malicious adversary.

A. Setup

In the Setup phase, the following algorithms are executed by a trusted authority:
- Run the TOPRF setup $([[sk^{OP}]], pp^{OP}) \leftarrow$ TOPRF.Setup $(1^K, n, t)$.
- Compute $(pp^{TS}, vk^{TS}, sk_1^{TS}, \ldots, sk_n^{TS}) \leftarrow$ TS.Gen$(1^\lambda, n, k)$.
- For each $i \in [n]$, give $(pp^{TS}, vk^{TS}, sk_i^{TS}, sk_i^{OP}, pp^{OP})$ p to party $P_i$.

B. Registration for $P_i$

Party $P_i$ interacts with everyone else to register its own template:
- Sample a random vector $\in \mathbb{Z}_q^\ell$ from the distribution $\mathcal{W}$.
- Run the TOPRF encoding to generate $c \leftarrow$ TOPRF.Encode $(w, \text{rand})$ for some randomness rand and send $c$ to everyone.
- Each party $P_j (j \neq i)$ replies back with their respective toprf evaluations $z_j := $ TOPRF.Eval$(sk_j^{OP}, c)$.
- Party $P_i$ on receiving at least t−1 responses from parties in some set (say) S, combine them to compute h:=TOPRF.Combine$(w, \{j, z_j\}_{j \in S \cup \{i\}}, \text{rand})$.
- Party $P_i$ computes keys $K_j := H(h,j)$ for all $j \in [n]$.
- Party $P_i$ also computes $s \leftarrow $ Sketch$(w)$.
- Party $P_i$ sends the pair $(K_j, s)$ to each party $P_j$ for all $j \in [n]$.

C. SignOn Phase

In the SignOn phase, let's consider party $P_i$ that uses an input vector u and a message m on which it wants a token. $P_i$ picks a set S of t−1 other parties $\{P_j\}_{j \in S}$ and $P_k$ and interacts with them in the below four round protocol. The arrowhead in round 1 can denote that in this round messages are outgoing from party $P_i$

- Round 1: $(P_i \rightarrow)$ $P_i$ contacts all parties in the set S with a initialization message that contains the message to be signed, m and an extractable commitment of its measurement Com(u).
- Round 2: $(\rightarrow P_i)$ Each party $P_j$ for $j \in S$ sends the sketch s back to $P_i$.
- Round 3: $(P_i \rightarrow)$ On receiving all s $P_i$ executes the following steps:
  (a) check if the s matches, if not then abort; otherwise go to the next step;
  (b) perform reconstruction w:=Recon(u, s);
  (c) compute the TOPRF encoding with some fresh randomness rand c:=TOPRF.Encode(w, rand) and send c to all $P_j$ in S.
- Round 4: $(\rightarrow P_i)$ On receiving c from $P_i$ each party $P_j$ for $j \in S$ executes the following steps:
  (a) compute the TOPRF evaluation $\mathcal{Z}_j := $ TOPRF.Eval$(sk_j^{TS}, m)$
  (b) compute the partial signature on m as $\sigma \leftarrow $ TS.Sign$((sk_j^{TS}, m)$
  (c) encrypt the partial signature as $ct_j \leftarrow $ enc$(K_j, \sigma_j)$.
  (d) send the tuple $(\mathcal{Z}_j, ct_j)$ to $P_i$
- Output Computation: On receiving all tuples $(\mathcal{Z}_j, ct_j)$ from parties $\{P_j\}_{j \in [S]}$
  (a) $P_i$ combines the TOPRF as $\mathcal{Z}$ TOPRF.Combine$(w, \{j, \mathcal{Z}_j\}_{j \in S}, \text{rand})$;
  (b) and then compute $K_j := H(\mathcal{Z}, j)$;
  (c) decrypt each $ct_j$ using $K_j$ to recover all the partial signatures $\sigma_j$.
  (d) combine the partial signatures to obtain the token Token and output that.

D. Token Verification

Given a verification key $vk^{TS}$, message m and token Token, the token verification algorithm outputs 1 if TS.Verify$(vk^{TS}, m, \text{Token})$ outputs 1.

Correctness: The correctness of the protocol directly follows from the correctness of the underlying primitives.

E. Security Analysis

We show that the above protocol realizes the extended ideal functionality $\mathcal{F}^*_{FTTG}$ in presence of semi-honest], static adversary that corrupts up to t−1 parties. In particular we formally prove (informal) Theorem 5 in this section. We prove that by constructing a polynomial time simulator as follows:

The Simulator S:

During the Setup the simulator generates the signing key pairs of a threshold signatures and forward the secret-key shares to the corrupt parties. It also generates the TOPRF keys and forwards the key shares to the corrupt parties. It also generates the parameters for the extractable commitment and keeps the trapdoor secret.

After the registration is done the simulator makes a "Leak on Template" query to obtain some leakage on the template and using that simulate a fake sketch for the corrupt parties.

To simulate the sign on phase it works as follows depending on whether the initiator is corrupt or not. If the initiator is honest, then it can easily simulate the honest parties view by using their shares of TOPRF correctly and using a dummy measurement. If the initiator is corrupt, then it extracts the input measurement from the extractable commitment Com(u) and then makes a "Test Password" query to the ideal functionality $\mathcal{F}^*_{FTTG}$ with that. If u is close to the template then it successfully registers a signature which it then returns to the initiator in a threshold manner (can be done easily by adding secret-shares of zeros).

We argue that for any PPT adversary $\mathcal{A}$, the above simulator successfully simulates a view in the ideal world that is computationally indistinguishable from the real world. From the above description notice a few results.

The registration is perfectly simulated due to access of the leakage on template query. Note that, without this access it would have been impossible to simulate this step. To demonstrate that we mention a simple attack when the attacker registers a dummy template, say string of $0_s$. Then there is no guarantee form secure sketch. So, without the leakage access, the simulator would not have any clue about the template. However, given the leakage access, the simulator can reconstruct the entire template (as there is no entropy and the information can be compressed within the allowed leakage bound).

The sign-on phase, which is initiated from the honest party is simulated correctly due to the template privacy guarantee provided by the underlying TOPRF. Note that, in this case the adversary does not learn the signature and hence in the simulation it is not required to register a correct signature with the ideal functionality. In the other case, when a corrupt party initiates the session, the extractability of the commitment scheme guarantees that, the extracted commitment is indeed the correct input of the attacker and then using the "Test Password" query the simulator is able to generate a signature correctly in case a close match is guessed correctly.

XI. Computer System

Figure 8:
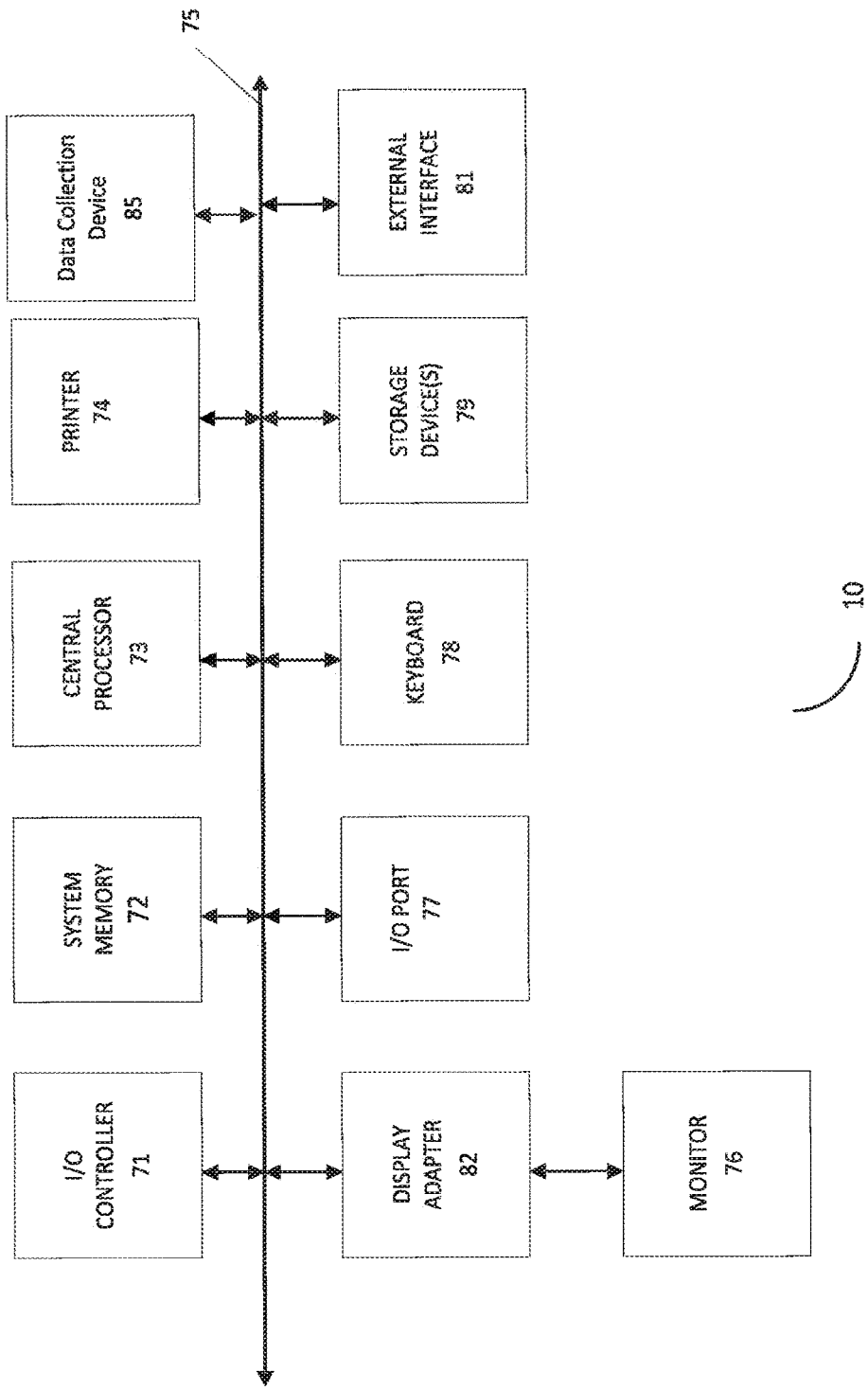
FIG. 8 shows a block diagram of an example computer system usable with systems and methods according to embodiments of the present invention.

Any of the computer systems mentioned herein may utilize any suitable number of subsystems. Examples of such subsystems are shown in FIG. 8 in computer apparatus 700. In some embodiments, a computer system includes a single computer apparatus, where the subsystems can be components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 8 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

XII. References

[1] Google Pixel Fingerprint. https://support.google.com/pixelphone/answer/6285273?h1=en. Accessed on Oct. 2, 2018. 1

[2] About Face ID advanced technology. https://support.apple.com/en-us/HT208108. Accessed on Oct. 2, 2018. 1

[3] FIDO Alliance. https://fidoalliance.org/. Accessed on Oct. 2, 2018. 1

[4] Yevgeniy Dois, leonid Reyzin, an Adam Smith. Fuzzy extractors: How to generate strong keys from biometrics and other noisy data. In Christian Cachin and Jan Camenisch, editors, Advances in Cryptology—EUROCRYPT 2004, volume 3027 of Lecture Notes in Computer Science, pages 523-540, Interlaken, Switzerland, May 2-6, 2004. Springer, Heidelberg, Germany. 2

[5] Pratyay Mukherjee and Daniel Wichs. Two round multiparty computation via multikey fhe. In Annual International Conference on the Theory and Applications of Cryptographic Techniques, pages 735-763. Springer, 2016. 3, 5, 16

[6] Chris Peikert and Sina Shiehian. Multi-key fhe from lwe, revisited. In TCC, 2016. 3, 5, 16

[7] Zvika Brakerski and Renen Perlman. Lattice-based fully dynamic multi-key fhe with short ciphertexts. In CRYPTO, pages 190-213. Springer, 2016. 3, 5, 16

[8] Sanjam Garg and Akshayaram Srinivasan. Two-round multiparty secure computation from minimal assumptions. EUROCRYPT, 2018. 3, 5, 16

[9] Fabrice Benhamouda and Huijia Lin. k-round mpc from k-round of via garbled interactive circuits. EUROCRYPT, 2018. 3, 5, 16

[10] Shashank Agrawal, Peihan Miao, Payman Mohassel, and Pratyay Mukherjee. Pasta: Password-based threshold authentication. IACR Cryptology ePrint Archive, 2018:885, 2018. 4, 8

[11] Prabhanjan Ananth, Saikrishna Badrinarayanan, Aayush Jain, Nathan Manohar, and Amit Sahai. From FE combiners to secure MPC and back. IACR Cryptology ePrint Archive, 2018:457, 2018. 5, 16

[12] Andrew Chi-Chih Yao. How to generate and exchange secrets (extended abstract). In 27th Annual Symposium on Foundations of Computer Science, Toronto, Canada, 27-29 Oct. 1986, pages 162-167. IEEE Computer Society, 1986. 6

[13] Payman Mohassel, Mike Rosulek, and Ye Zhang. Fast and secure three-party computation: The garbled circuit approach. In Indrajit Ray, Ninghui Li, and Christopher Kruegel, editors, Proceedings of the 22nd ACM SIGSAC Conference on Computer and Communications Security, Denver, CO, USA, Oct. 12-16, 2015, pages 591-602. ACM, 2015. 7, 8

[14] Pascal Paillier. Public-key cryptosystems based on composite degree residuosity classes. In International Conference on the Theory and Applications of Cryptographic Techniques, pages 223-238. Springer, 1999. 7, 10, 12, 24

[15] Taher El Gamal. A public key cryptosystem and a signature scheme based on discrete logarithms. In G. R. Blakley and David Chaum, editors, Advances in Cryptology, Proceedings of CRYPTO '84, Santa Barbara, California, USA, Aug. 19-22, 1984, Proceedings, volume 196 of Lecture Notes in Computer Science, pages 10-18. Springer, 1984. 7, 41

[16] Alexandra Boldyreva. Threshold signatures, multisignatures and blind signatures based on the gap-diffie-hellman-group signature scheme. In International Workshop on Public Key Cryptography, pages 31-46. Springer, 2003. 9, 10, 33, 34

[17] Victor Shoup. Practical threshold signatures. In Bart Preneel, editor, Advances in Cryptology—EUROCRYPT 2000, International Conference on the Theory and Application of Cryptographic Techniques, Bruges, Belgium, May 14-18, 2000, Proceeding, volume 1807 of Lecture Notes in Computer Science, pages 207-220. Springer, 2000. 9, 33

[18] Oded Goldreich. The Foundations of Cryptography—Volume 2, Basic Applications. Cambridge University Press, 2004. 10

[19] Rafail Ostrovsky, Anat Paskin-Cherniaysky, and Beni Paskin-Cherniaysky. Maliciously circuit-private fhe. In International Cryptology Conference, pages 536-553. Springer, 2014. 10

[20] Ronald Cramer, Ivan Damgard, and Jesper B Nielsen. Multiparty computation from threshold homomorphic encryption. In International Conference on the Theory and Applications of Cryptographic Techniques, pages 280-300. Springer, 2001. 12

[21] William Aiello, Yuval Ishai, and Omer Reingold. Priced oblivious transfer: How to sell digital goods. In Birgit Pfitzmann, editor, Advances in Cryptology—EUROCRYPT 2001, International Conference on the Theory and Application of Cryptographic Techniques, Innsbruck, Austria, May 6-10, 2001, Proceeding, volume 2045 of Lecture Notes in Computer Science, pages 119-135. Springer, 2001. 24

[22] Moni Naor and Benny Pinkas. Efficient oblivious transfer protocols. In S. Rao Kosaraju, editor, Proceedings of the Twelfth Annual Symposium on Discrete Algorithms, Jan. 7-9, 2001, Washington, DC, USA., pages 448-457. ACM/SIAM, 2001. 24

[23] Chris Peikert, Vinod Vaikuntanathan, and Brent Waters. A framework for efficient and composable oblivious transfer. In David A. Wagner, editor, Advances in Cryptology—CRYPTO 2008, 28th Annual International Cryptology Conference, Santa Barbara, CA, USA, Aug. 17-21, 2008. Proceedings, volume 5157 of Lecture Notes in Computer Science, pages 554-571. Springer, 2008. 24, 42

[24] Shai Halevi and Yael Tauman Kalai. Smooth projective hashing and two-message oblivious transfer. J. Cryptology, 25(1), 2012. 24

[25] Stanislaw Jarecki, Aggelos Kiayias, Hugo Krawczyk, and Jiayu Xu. TOPPSS: costminimal password-protected secret sharing based on threshold OPRF. In Dieter Gollmann, AtsukoMiyaji, and Hiroaki Kikuchi, editors, Applied Cryptography and Network Security—15th International Conference, ACNS 2017, Kanazawa, Japan, Jul. 10-12, 2017, Proceedings, volume 10355 of Lecture Notes in Computer Science, pages 39-58. Springer, 2017. 33, 43

[26] Robert J. McEliece and Dilip V. Sarwate. On sharing secrets and reed-solomon codes. Communications of the ACM, 24(9):583-584, 1981. 44

[27] Pierre-Alain Dupont, Julia Hesse, David Pointcheval, Leonid Reyzin, and Sophia Yakoubov. Fuzzy password-authenticated key exchange. In Jesper Buus Nielsen and Vincent Rijmen, editors, Advances in Cryptology—EUROCRYPT 2018, pages 393-424, Cham, 2018. Springer International Publishing. 43, 44

XIII. Appendix A: Additional Preliminaries

A. Threshold Oblivious Pseudorandom Functions

We now define the notion of a UC-secure Threshold Oblivious Pseudorandom Function taken almost verbatim from Jarecki et al. [25]. We refer the reader to Jarecki et al. [25] for the security definition and here only list the algorithms that form part of the primitive.

Definition 8 A threshold oblivious pseudo-random function TOPRF is a tuple of four PPT algorithms (TOPRF. Setup, TOPRF.Encode, TOPRF.Eval, TOPRF.Combine) described below.

TOPRF.Setup $(1^\lambda, n, t) \rightarrow ([[sk]], pp)$. It generates n secret key shares $sk_1, sk_2, \ldots, sk_n$ and public parameters pp. Share $sk_i$ is given to party i. (pp will be an implicit input in the algorithms below.)

TOPRF.Encode(x, p)=:c. It generates an encoding c of input x using randomness ρ.

TOPRF.Eval($sk_i$, c)=:$z_i$. It generates shares of the TOPRF value from an encoding. Party i computes the i-th share $z_i$ from c by running TOPRF.Eval with $sk_i$ and c.

TOPRF.Combine(x, $\{(i, z_i)\}_{i \in S}$, ρ)=:(h or ⊥),It combines the shares received from parties in the set $S$ using randomness ρ to generate a value h. If the algorithm fails, its output is denoted by ⊥.

B. Robust Secret Sharing

We now give the definition of a Robust Secret Sharing scheme taken almost verbatim from Dupont et al. [26].

Definition 9 Let $\lambda \in \mathbb{N}$, q be a λ-bit prime, $F_q$ be a finite field and n, t, m, r $\in \mathbb{N}$ with t<r≤n and m<r. An (n, t, r) robust secret sharing scheme (RSS) consists of two probabilistic algorithms RSS. Share: $F_q â†' F_q^n$ and RSS. Recon: $F_q^n \rightarrow F_q$ with the following properties:

t-privacy: for any s, sâ$\subset^2 \in F_q$, $\mathcal{A} \subset [n]$ with |A|<t, the projections $c_\mathcal{A}$ of c←RSS. Share(s) and $c'_\mathcal{A}$ of c'←RSS.Share(sâ$\subset^2$) are identically distributed.

r-robustness: for any s$\in F_q$, $\mathcal{A} \subset [n]$ with |A|≥r, any c output by RSS. Share(s), and any c̃ such that $c_\mathcal{A} = \tilde{c}_\mathcal{A}$, it holds that RSS. Recon(c̃)=s.

In other words, an (n, t, r)-RSS is able to reconstruct the shared secret even if the adversary tampered with up to (nâ˜r) shares, while each set of t shares is distributed independently of the shared secret s and thus reveals nothing about it.

We say that a Robust Secret Sharing is linear if, similar to standard secret sharing, the reconstruction algorithm RSS-.Recon only performs linear operations on its input shares.

Imported Lemma 1 The Shamir's secret sharing scheme is a ($\ell$, d, $$\left\lceil \frac{\ell + d}{2} \right\rceil)$$

robust linear secret sharing scheme.

The above lemma is borrowed from instantiating Lemma 5 of Dupont et al. [26] using the work of McEliece and Sarwate [27], as described in Dupont et al. [26].

What is claimed is:

1. A method of registering a first electronic device of a user to an authentication server, the method comprising performing, by the first electronic device:
   measuring, by a biometric sensor of the first electronic device, a first set of biometric features of the user to obtain a template vector, which comprises measured values of the first set of biometric features;
   generating a private key and a public key;
   generating a plurality of key shares of the private key, wherein each key share of the plurality of key shares is assigned to one of a plurality of devices of the user, the generating including storing a first key share of the plurality of key shares of the private key in the first electronic device of the user;
   transmitting one or more other key shares of the plurality of key shares of the private key to one or more other electronic devices of the user, wherein the one or more other electronic devices store the one or more other key shares of the private key;
   generating template shares of the template vector, wherein a first template share of the template vector is stored in the first electronic device, wherein the first electronic device is configured to generate a first partial signature using the first key share and the first template share;
   transmitting, by the first electronic device, one or more other template shares of the template vector to the one or more other electronic devices of the user, wherein the one or more other electronic devices store the one or more other template shares of the template vector; and
   transmitting the public key to the authentication server, wherein the authentication server is different than the first electronic device and the one or more other electronic devices of the user.

2. The method of claim 1, wherein the first electronic device is configured to generate the first partial signature using the first template share, the first key share, and a challenge message.

3. The method of claim 1, further comprising:
   receiving, by the first electronic device, a challenge message from the authentication server; and
   transmitting, by the first electronic device, the challenge message to the one or more other electronic devices.

4. The method of claim 1, wherein each of the one or more other electronic devices is configured to generate a partial signature using a corresponding template share, a corresponding key share, and a challenge message.

5. The method of claim 1, further comprising:
   deleting, by the first electronic device, the private key and the template vector.

6. The method of claim 1, wherein the first template share and other template shares are an encryption of the template vector.

7. The method of claim 1, further comprising:
   measuring, by the biometric sensor of the first electronic device, a second set of biometric features of the user to obtain a measurement vector, which comprises measured values of the second set of biometric features; and
   sending, by the first electronic device, the measurement vector and a challenge message received from the authentication server, to the one or more other electronic devices.

8. The method of claim 7, further comprising:
   receiving, by the first electronic device, a plurality of partial signatures, including one or more partial signatures from the one or more other electronic devices, wherein each of the plurality of partial signatures is generated using a corresponding template share of the template vector, a corresponding key share of the private key, and the challenge message; and
   generating a signature of the challenge message using the plurality of partial signatures.

9. The method of claim 8, further comprising:
generating a cryptographic program that conditionally uses a set of key shares to generate the signature when the measurement vector is within a threshold of the template vector.

10. The method of claim 9, wherein the cryptographic program includes a garbled circuit.

11. The method of claim 9, wherein the cryptographic program uses additively homomorphic encryption.

12. The method of claim 9, wherein the measurement vector and the template vector are encrypted using threshold fully homomorphic encryption, and wherein the cryptographic program determines that the measurement vector is within the threshold of the template vector by computing an inner product of the measurement vector and the template vector.

13. The method of claim 8, wherein generating the signature of the challenge message using the plurality of partial signatures includes:
adding shares of additively homomorphic encryptions of partial distances between the template shares and the measurement vector to obtain a total distance;
comparing the total distance to a threshold; and
signing the challenge message using the plurality of partial signatures when the total distance is less than the threshold.

14. A first electronic device comprising:
a computer readable medium storing instructions; and
one or more processors for executing the instructions stored on the computer readable medium to perform a method of registering the first electronic device of a user to an authentication server, the method comprising:
measuring, by a biometric sensor of the first electronic device, a first set of biometric features of the user to obtain a template vector, which comprises measured values of the first set of biometric features;
generating a private key and a public key;
generating a plurality of key shares of the private key, wherein each key share of the plurality of key shares is assigned to one of a plurality of devices of the user, the generating including storing a first key share of the plurality of key shares of the private key in the first electronic device of the user;
transmitting one or more other key shares of the plurality of key shares of the private key to one or more other electronic devices of the user, wherein the one or more other electronic devices store the one or more other key shares of the private key;
generating template shares of the template vector, wherein a first template share of the template vector is stored in the first electronic device, wherein the first electronic device is configured to generate a first partial signature using the first key share and the first template share;
transmitting, by the first electronic device, one or more other template shares of the template vector to the one or more other electronic devices of the user, wherein the one or more other electronic devices store the one or more other template shares of the template vector; and
transmitting the public key to the authentication server, wherein the authentication server is different than the first electronic device and the one or more other electronic devices of the user.

15. The first electronic device of claim 14, wherein the first electronic device is configured to generate the first partial signature using the first template share, the first key share, and a challenge message.

16. The first electronic device of claim 14, further comprising:
receiving, by the first electronic device, a challenge message from the authentication server; and
transmitting, by the first electronic device, the challenge message to the one or more other electronic devices.

17. The first electronic device of claim 14, wherein each of the one or more other electronic devices is configured to generate a partial signature using a corresponding template share, a corresponding key share, and a challenge message.

18. The first electronic device of claim 14, further comprising:
deleting, by the first electronic device, the private key and the template vector.

19. The first electronic device of claim 14, further comprising:
measuring, by the biometric sensor of the first electronic device, a second set of biometric features of the user to obtain a measurement vector, which comprises measured values of the second set of biometric features; and
sending, by the first electronic device, the measurement vector and a challenge message received from the authentication server, to the one or more other electronic devices.

20. The first electronic device of claim 19, further comprising:
receiving, by the first electronic device, a plurality of partial signatures, including one or more partial signatures from the one or more other electronic devices, wherein each of the plurality of partial signatures is generated using a corresponding template share of the template vector, a corresponding key share of the private key, and the challenge message; and
generating a signature of the challenge message using the plurality of partial signatures.

* * * * *